United States Patent
Mackin

(10) Patent No.: US 10,968,825 B2
(45) Date of Patent: Apr. 6, 2021

(54) FLOW MULTIPLIER SYSTEMS FOR AIRCRAFT

(71) Applicant: The Boeing Company, Chicago, IL (US)

(72) Inventor: Steve G. Mackin, Bellevue, WA (US)

(73) Assignee: The Boeing Company, Chicago, IL (US)

(*) Notice: Subject to any disclaimer, the term of this patent is extended or adjusted under 35 U.S.C. 154(b) by 321 days.

(21) Appl. No.: 15/957,588

(22) Filed: Apr. 19, 2018

(65) Prior Publication Data
US 2019/0323427 A1    Oct. 24, 2019

(51) Int. Cl.
*F02C 6/16* (2006.01)
*F02C 3/04* (2006.01)
(Continued)

(52) U.S. Cl.
CPC ............... *F02C 6/16* (2013.01); *B64C 1/10* (2013.01); *B64D 27/10* (2013.01); *B64D 27/24* (2013.01); *F02C 3/04* (2013.01); *F02C 6/08* (2013.01); *F02C 7/36* (2013.01); *F02C 9/16* (2013.01); *F04D 25/06* (2013.01); *B64C 21/04* (2013.01);
(Continued)

(58) Field of Classification Search
CPC .... F02C 3/305; F02C 6/12; F02C 6/14; F02C 6/16; F02C 9/16; F05D 2260/42; F05D 2270/053
See application file for complete search history.

(56) References Cited

U.S. PATENT DOCUMENTS

| 5,142,870 A | 9/1992 | Angle |
|---|---|---|
| 7,111,462 B2 | 9/2006 | Epstein |

(Continued)

FOREIGN PATENT DOCUMENTS

| DE | 102004034657 | 2/2005 |
|---|---|---|
| DE | 102013209538 | 11/2014 |

(Continued)

OTHER PUBLICATIONS

European Patent Office, "Extended European Search Report", issued in connection with application No. 19160341.4 dated Oct. 18, 2019, 9 pages.

(Continued)

*Primary Examiner* — Scott J Walthour
(74) *Attorney, Agent, or Firm* — Hanley, Flight & Zimmerman, LLC

(57) ABSTRACT

Flow multiplier systems for aircraft are described herein. A flow multiplier system includes a turbo-compressor having a compressor, a turbine, and a drive shaft coupled between the compressor and the turbine. A compressor outlet of the compressor is fluidly coupled to an ejector in a gas turbine engine. The system also includes a supply line fluidly coupling a compressed air tank and a turbine inlet and a valve coupled to the supply line. The system includes a controller configured to, based on an input signal requesting to increase output power of the gas turbine engine, send a command signal to open the valve to enable a flow of pressurized air from the compressed air tank to the turbine inlet. The turbine drives the compressor to create high pressure air at the compressor outlet, which is provided into the gas turbine engine to increase the output power.

20 Claims, 22 Drawing Sheets

(51) Int. Cl.

| | |
|---|---|
| *F02C 9/16* | (2006.01) |
| *B64C 1/10* | (2006.01) |
| *B64D 27/10* | (2006.01) |
| *B64D 27/24* | (2006.01) |
| *F02C 6/08* | (2006.01) |
| *F02C 7/36* | (2006.01) |
| *F04D 25/06* | (2006.01) |
| *B64C 21/04* | (2006.01) |
| *B64D 27/02* | (2006.01) |

(52) U.S. Cl.
CPC .... *B64C 2230/04* (2013.01); *B64D 2027/026* (2013.01); *F05D 2220/323* (2013.01); *F05D 2260/403* (2013.01); *F05D 2270/053* (2013.01); *F05D 2270/3061* (2013.01); *F05D 2270/312* (2013.01)

(56) References Cited

U.S. PATENT DOCUMENTS

| | | |
|---|---|---|
| 7,183,942 B2 | 2/2007 | Rock et al. |
| 7,421,334 B2 | 9/2008 | Dahlgren et al. |
| 7,432,800 B2 | 10/2008 | Harter, Jr. et al. |
| 7,589,643 B2 | 9/2009 | Dagci et al. |
| 8,640,439 B2 | 2/2014 | Hoffjann et al. |
| 9,810,102 B2 | 11/2017 | Ermaa et al. |
| 9,878,796 B2 | 1/2018 | Sheridan |
| 9,920,695 B2 | 3/2018 | Endres |
| 2007/0101721 A1 | 5/2007 | Dooley et al. |
| 2009/0320440 A1 | 12/2009 | Erickson et al. |
| 2010/0219779 A1 | 9/2010 | Bradbrook |
| 2012/0025032 A1 | 2/2012 | Hopdjanian et al. |
| 2013/0133332 A1* | 5/2013 | MacFarlane ............... F02C 7/36 60/773 |
| 2014/0248121 A1* | 9/2014 | Karam .................... F02C 3/305 415/1 |
| 2014/0305127 A1 | 10/2014 | Schroder et al. |
| 2015/0176489 A1* | 6/2015 | Damgen ................... F02C 6/16 60/327 |
| 2017/0016395 A1* | 1/2017 | Kim ........................ F02C 7/143 |
| 2017/0167496 A1 | 6/2017 | Klosinski et al. |
| 2017/0211474 A1 | 7/2017 | Sennoun |
| 2017/0292523 A1 | 10/2017 | Niergarth et al. |
| 2017/0320584 A1 | 11/2017 | Menheere |
| 2018/0025884 A1 | 1/2018 | Flitsch |
| 2018/0057150 A1 | 3/2018 | Cheung et al. |
| 2018/0163558 A1 | 6/2018 | Vondrell et al. |
| 2018/0170556 A1 | 6/2018 | Goodman et al. |
| 2018/0178920 A1 | 6/2018 | Swann et al. |
| 2018/0258848 A1 | 9/2018 | Karam |
| 2018/0297683 A1 | 10/2018 | Armstrong |
| 2018/0370641 A1 | 12/2018 | Dindar et al. |
| 2019/0085714 A1 | 3/2019 | Zatorski et al. |
| 2019/0322379 A1 | 10/2019 | Mackin |
| 2019/0322382 A1 | 10/2019 | Mackin |
| 2019/0323426 A1 | 10/2019 | Mackin |

FOREIGN PATENT DOCUMENTS

| | | |
|---|---|---|
| DE | 102014224637 | 6/2016 |
| EP | 0493531 | 7/1992 |
| EP | 2122139 | 11/2009 |
| EP | 2924247 | 9/2015 |
| EP | 2964945 | 1/2016 |
| EP | 3118435 | 1/2017 |
| EP | 3335995 | 6/2018 |
| EP | 3421366 | 1/2019 |
| GB | 2558228 | 7/2018 |
| JP | H0791278 | 4/1995 |

OTHER PUBLICATIONS

European Patent Office, "Extended European Search Report", issued in connection with application No. 19160326.5 dated Aug. 9, 2019, 7 pages.

European Patent Office, "Extended European Search Report", issued in connection with application No. 19166386.3 dated Aug. 19, 2019, 10 pages.

United States Patent and Trademark Office, "Non-Final Office Action", issued in connection with U.S. Appl. No. 15/957,573 dated Mar. 13, 2020, 17 pages.

United States Patent and Trademark Office, "Non-Final Office Action", issued in connection with U.S. Appl. No. 15/957,527 dated Mar. 30, 2020, 18 pages.

Schier et al., "Highly Integrated Electric Drives for Automotive Application", 2015 International Conference on Sustainable Mobility Applications, Renewables and Technology (SMART), 2015, pp. 1-6, 6 pages.

Choi, Benjamin B., "Propulsion Powertrain Simulator: Future Turboelectric Distributed-Propulsion Aircraft", IEEE Electrification Magazine, Dec. 2014, pp. 23-34, 12 pages.

Powell et al., "Dynamic Modeling and Control of Hybrid Electric Vehicle Powertrain Systems", Oct. 1998, IEEE, pp. 17-33, 17 pages.

Shaw et al., "More Electric Power System Concepts for an Environmentally Responsible Aircraft (N+2)", IEEE, 2012, pp. 1-6, 6 pages.

European Patent Office, "Extended European Search Report", issued in connection with application No. 19160347.1 dated Sep. 18, 2019, 5 pages.

United States Patent and Trademark Office, "Non-Final Office Action", issued in connection with U.S. Appl. No. 15/957,557 dated Jul. 28, 2020, 7 pages.

United States Patent and Trademark Office, "Notice of Allowance and Fee(s) Due", issued in connection with U.S. Appl. No. 15/957,527 dated Jul. 17, 2020, 8 pages.

United States Patent and Trademark Office, "Final Office Action", issued in connection with U.S. Appl. No. 15/957,573 dated Aug. 27, 2020, 8 pages.

United States Patent and Trademark Office, "Non-Final Office Action", issued in connection with U.S. Appl. No. 15/957,527 dated Aug. 25, 2020, 19 pages.

United States Patent and Trademark Office, "Non-Final Office Action", issued in connection with U.S. Appl. No. 15/957,573 dated Feb. 24, 2021, 8 pages.

* cited by examiner

FLOW MULTIPLIER SYSTEMS FOR AIRCRAFT

FIELD OF THE DISCLOSURE

This disclosure relates generally to aircraft and, more particularly, to flow multiplier systems for aircraft.

BACKGROUND

Aircraft typically include one or more engines to produce thrust. There are many different types or arrangements of engines, such as turbofan engines, turboprop engines, etc. These engines include a propulsor, such as a fan or propeller, for producing thrust and an engine core, such as a gas turbine engine, that drives the propulsor. While effective for certain flight conditions, these engines are typically limited in the altitude at which they can operate. In particular, because of the reduced air pressure at higher altitudes, the engines are only capable of climbing to certain altitudes.

Further, known aircraft generally include one or more system(s) that utilize high pressure air. The high pressure air is bled from the engines of the aircraft. This reduces the efficiency of the engines and also requires larger, heavier engines to support the demands of the aircraft system(s).

SUMMARY

Disclosed herein is a flow multiplier system for use in an aircraft. The flow multiplier system includes a turbo-compressor including a compressor, a turbine, and a drive shaft coupled between the compressor and the turbine. The turbine has a turbine inlet and a turbine outlet. The compressor has a compressor inlet and a compressor outlet. The compressor outlet is fluidly coupled to an ejector disposed in a gas turbine engine. The flow multiplier system also includes a supply line fluidly coupling a compressed air tank to the turbine inlet and a valve coupled to the supply line to control a flow of pressurized air from the compressed air tank to the turbine inlet. The flow multiplier system further includes a controller configured to, based on an input signal requesting to increase output power of the gas turbine engine, send a command signal to open the valve to enable the flow of the pressurized air from the compressed air tank to the turbine inlet. The turbine is to drive the compressor to create high pressure air at the compressor outlet. The ejector is to provide the high pressure air into the gas turbine engine to increase the output power of the gas turbine engine.

A method of increasing output power of an aircraft engine is disclosed herein. The method includes receiving, at a controller, an input signal requesting to increase output power of a gas turbine engine of an aircraft via a flow multiplier system. The flow multiplier system includes a compressed air tank containing pressurized air, a turbo-compressor having a compressor and a turbine, and a valve disposed between the compressed air tank and a turbine inlet of the turbine. A compressor outlet of the compressor is fluidly coupled to an ejector disposed in the gas turbine engine. The method also includes sending, via the controller, a command signal to open the valve based on the input signal. The valve, when opened, enables a flow of the pressurized air from the compressed air tank to the turbine inlet, which powers the turbine to drive the compressor to produce high pressure air at the compressor outlet. The high pressure air is injected via the ejector into the gas turbine engine.

An aircraft disclosed herein includes a hybrid propulsion engine having a gas turbine engine, an electric motor, and a propulsor. The gas turbine engine is to drive the propulsor during a first mode of operation and the electric motor is to drive the propulsor during a second mode of operation. The aircraft also includes a flow multiplier system to provide high pressure air into a core air intake of the gas turbine engine to increase output power of the gas turbine engine while the hybrid propulsion engine is operating in the first mode of operation. The flow multiplier system includes a compressed air tank containing pressurized air and a turbo-compressor including a compressor and a turbine. The compressor has a compressor outlet fluidly coupled to the core air intake of the gas turbine engine. The pressurized air is to power the turbine to drive the compressor to produce the high pressure air that is provided into the core air intake of the gas turbine engine.

BRIEF DESCRIPTION OF THE DRAWINGS

In FIG. 9, the example core damper is implemented in connection with the example hybrid propulsion engine of FIG. 4.

In FIG. 13, the example supercharging system is implemented in connection with the hybrid propulsion engine of FIG. 9.

In FIG. 18, the example flow multiplier system is implemented in connection with the hybrid propulsion engine of FIG. 9.

Figure 1:
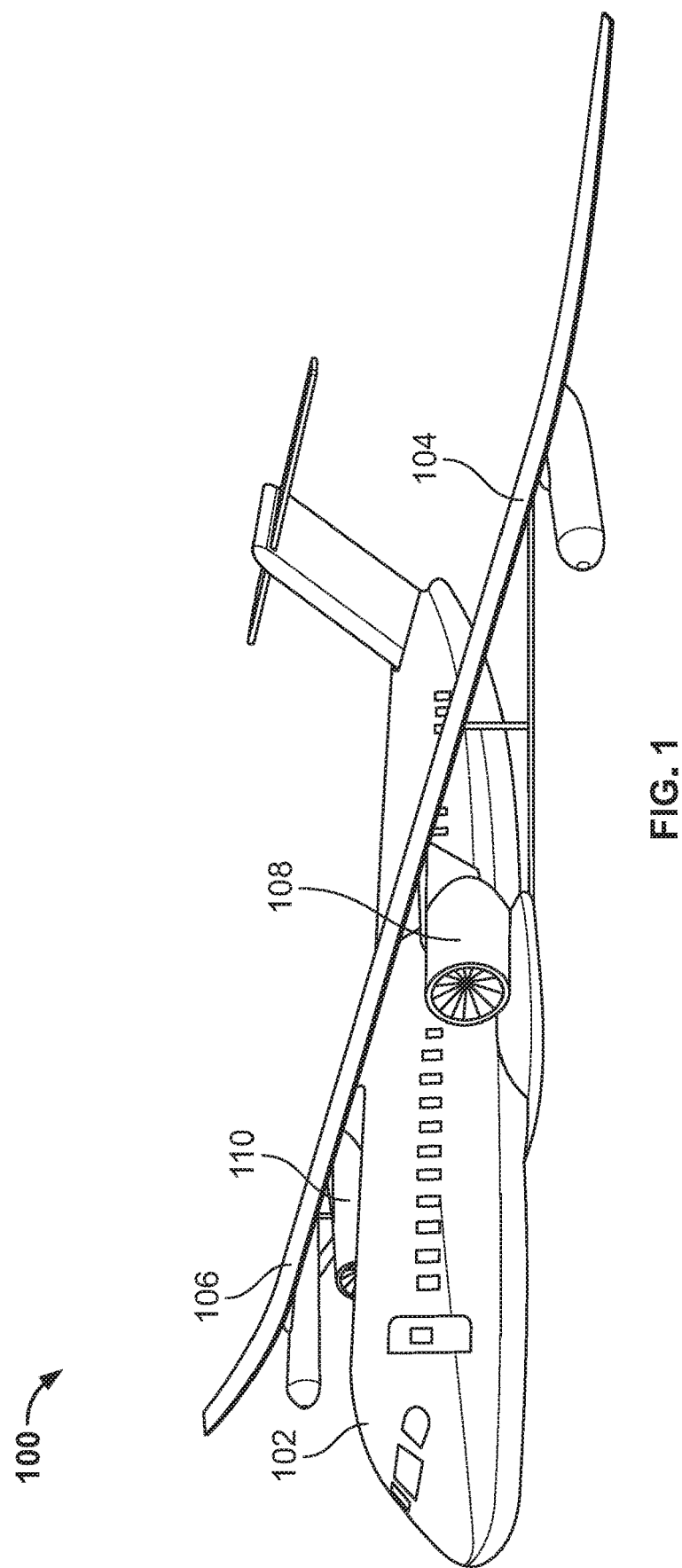
FIG. 1 illustrates an aircraft in which the examples disclosed herein can be implemented.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example hybrid propulsion engines for aircraft. The hybrid propulsion engines include an internal combustion engine, such as a gas turbine engine, and an electric motor that are coupled to a propulsor such as a fan or a propeller and operate in parallel manner to drive the propulsor. The hybrid propulsion engines described herein can operate between different modes of operation in which the gas turbine engine and/or the electric motor are used to drive the propulsor to produce forward thrust. For example, in a first mode of operation, the gas turbine engine drives the propulsor to produce forward thrust when an increased level of thrust is desired. In the first mode of operation, the electric motor can be off and/or otherwise not powering the propulsor. In a second mode of operation, the electric motor drives the propulsor to produce forward thrust (while the gas turbine engine is off and/or otherwise not powering the propulsor), as electric motors are more efficient at driving the propulsor during certain flight conditions. For example, the gas turbine engine can be used during take-off and landing when an increased level of thrust is required. Whereas the electric motor can be used during cruise, where the aircraft is at higher altitudes and subject to less drag. As such, the gas turbine engines are used for less time during the flight. As a result, less fuel is needed onboard the aircraft, thereby further decreasing the overall weight of the aircraft. Further, in some instances the electric motor may be used to supplement the gas turbine engine during take-off and/or climb and, thus, a smaller, lighter gas turbine engine can be utilized.

The example hybrid propulsion engines described herein include a clutch disposed between the gas turbine engine and the electric motor that enables the electric motor to operate independently of the gas turbine engine and without driving or rotating the output shaft of the gas turbine engine. For example, the gas turbine engine includes a first drive shaft (e.g., an output shaft), and the electric motor includes a second drive shaft. The propulsor is coupled to the second drive shaft, and the first drive shaft is coupled to the second drive shaft via a clutch, such as an overrunning clutch. As such, when the gas turbine engine is running during the first mode of operation, the first drive shaft rotates the second drive shaft and, thus, transfers power to the propulsor. During the first mode of operation, the electric motor is off and not affected by the rotating second drive shaft. In the second mode of operation, the electric motor is turned on and used to rotate the second drive shaft, which drives the propulsor and produces forward thrust. During the second mode of operation, the gas turbine engine can be turned off. The overrunning clutch enables the second drive shaft to rotate independent of the first drive shaft and, thus, does not drive or rotate the first drive shaft. In other words, the overrunning clutch enables the gas turbine engine and the electric motor to operate in a parallel manner, rather than in series, such that operation of one does not require operation of the other. In other examples, other types of clutches can be implemented to connect or disconnect the first and second drive shafts.

In some examples, while the gas turbine engine is driving the propulsor in the first mode of operation, the electric motor can be energized and used to overspeed or overdrive the gas turbine engine. This operation can be used to provide temporary bursts of power to the propulsor (e.g., in the event of an engine-out scenario), for example. In other examples, the electric motor can be operated at approximately the same rotational speed as the gas turbine engine to provide torque to the propulsor without overrunning the gas turbine engine. This operation can reduce the load on the gas turbine engine, for example.

Also disclosed herein are core dampers that can be used with aircraft engines. An example core damper disclosed herein can be used with a hybrid propulsion engine to prevent the gas turbine engine from windmilling while the electric motor is driving the propulsor and the gas turbine engine is off. In particular, although the gas turbine engine may be off during the second mode of operation, air flowing through a fan duct may flow into the core air intake and through the gas turbine engine, which can cause the compressor(s) and/or turbine(s) to spin (known as windmilling). However, because the gas turbine engine is off, this windmilling wastes the power in the accelerated air that could otherwise be used to produce thrust. As such, a core damper can be disposed in the core air intake to close off the core air intake and substantially prohibit air from entering the gas turbine engine while the gas turbine engine is not operating. In some examples, the core air intake includes a plurality of vanes. The vanes are movable (e.g., rotatable) from an open position where air flows between the vanes (and/or otherwise through the core air intake) and into the gas turbine engine and a closed position where the vanes block airflow into the gas turbine engine. By blocking the airflow through the core air intake when the gas turbine engine is not operating, less airflow is wasted and, thus, more airflow is used to produce thrust.

In some examples, the damper may be used to regulate an operational temperature of the gas turbine engine. For example, while the hybrid propulsion engine is operating in the second mode of operation (where the electric motor is driving the propulsor the gas turbine engine is off and/or otherwise not driving the propulsor), the damper can be moved from a closed state to a partially open state to enable the gas turbine engine to be turned on and operated at a low speed (e.g., idle). Running the gas turbine engine, even at low speeds, helps the gas turbine engine and other components of the hybrid propulsion engine remain warm, which enables a quicker startup. Further, operating the gas turbine engine at idle causes the oil to circulate, which helps keep the components of the hybrid propulsion engine including the damper warm to prevent ice buildup. The gas turbine engine can be turned on and off periodically to ensure no ice buildup. In other examples, rather than starting and running the gas turbine engine, the damper remains closed, and the starter of the gas turbine engine can be used to periodically drive the spools of the gas turbines engine at a low speed, which circulates the oil to keep the engine warm and, thus, keep the damper warm. Additionally or alternatively, a separate heater (e.g., an electric heating element) may be used to heat the core damper and/or the oil to prevent freezing.

Also disclosed herein are examples of supercharging systems used to temporarily increase the output power of a gas turbine engine, such as a gas turbine engine in one of the hybrid propulsion engines disclosed herein. The supercharging systems can be used when more power is desired, such as during take-off and/or for climbing to higher altitudes. For example, the supercharging system can be used to enable the gas turbine engine to produce more power during a climb from one altitude to higher altitude that may otherwise not be achievable because of the reduced air pressure at higher altitudes.

An example supercharging system disclosed herein includes a compressed air tank containing pressurized air and an ejector disposed in a core air intake of a gas turbine engine. The supercharging system includes a supply line connecting the compressed air tank and the ejector. One or more flow control members (e.g., a valve, a pressure regulator, a pressure reducing shutoff valve, etc.) can be coupled to the supply line to control the flow of high pressure air from the compressed air tank to the ejector. When the supercharging system is activated (e.g., by opening the flow control member(s)), high pressure air from the compressed air tank is supplied to the ejector and injected into the gas turbine engine (e.g., in the core air intake, upstream from the first compressor stage). The high pressure air enables the gas turbine engine to produce more power (and, thus, more thrust) than the thinner atmospheric air. The high pressure air can be at, for example, 30 pounds-per-square-inch (PSI), which is significantly higher than the atmospheric air pressure even at sea level (~14 PSI).

In some examples, the supercharging system is used in combination with the core damper disclosed above. For example, when flying at an altitude where the atmospheric air pressure is low, the core damper can be used to close off the core air intake while the supercharging system is injecting high pressure air into the gas turbine engine. This isolates the gas turbine engine from the atmospheric air and prevents the high pressure air that is being injected from escaping out of the gas turbine engine into the atmosphere.

Also disclosed herein are examples of flow multiplier systems that can be used to provide high pressure, high mass airflow to one or more system(s) of an aircraft that utilize such air. There are many systems on an aircraft that may utilize high pressure, high mass airflow. However, rather than drawing bleed air from the engine(s) of the aircraft, as known systems do, the example flow multiplier systems can produce high pressure, high mass airflow independent of the aircraft engine(s) and, thus, increase the efficiency of the aircraft.

In some examples, the high pressure, high mass airflow can be provided to a gas turbine engine to improve the performance of the gas turbine engine. For example, similar to the supercharging system described above, the high pressure air can be used to boost the output power of the gas turbine engine. The high pressure, high mass airflow can be provided into an ejector disposed in a core air intake of a gas turbine engine increase the output power produced by the gas turbine engine, which may be beneficial during take-off and/or for climbing to higher altitudes. Additionally or alternatively, the high pressure, high mass airflow from the flow multiplier system can be used for an active flow control (AFC) system. Some aircraft include an AFC system that ejects high pressure air along the control surfaces of the aircraft to decrease drag. In still other examples, aircraft include one or more other systems that may benefit from using the high pressure high mass airflow. Therefore, there are many systems that can utilize the high pressure, high mass airflow produced by the flow multiplier system.

An example flow multiplier system disclosed herein includes a flow multiplier and a compressed air tank having pressurized air and. The pressurized air is supplied from the compressed air tank to the flow multiplier, which creates high pressure, high mass airflow using the pressurized air. Therefore, rather than supplying the pressurized air directly to the system(s) that desired high pressure air, the flow multiplier uses the pressurized air to create a high mass airflow supply that is greater than the mass airflow otherwise provided by directly from the compressed air tank.

In some examples, the flow multiplier is a turbo-compressor having a compressor, a turbine, and a drive shaft coupling the compressor and the turbine. Pressurized air from the compressed air tank is provided to the turbine, which drives the turbine and, thus, drives the compressor. The compressor compresses atmospheric air from a first pressure to a second higher pressure at a compressor outlet that is fluidly coupled to the system(s) that receive high pressure air. In some examples, the air exiting the turbine is mixed with the air exiting the compressor. The combined air has a relatively high pressure, high mass flow rate, which is supplied to the one or more system(s) of the aircraft. Thus, rather than bleeding high pressure air from the engine like known systems, the flow multiplier systems described herein utilize a pressurized air supply and a turbo-compressor to create high pressure, high mass airflow that can meet the demands of the aircraft system(s).

In some examples, the flow multiplier system includes an electric motor to power the drive shaft (and, thus, the compressor) when the demand for high mass airflow is lower. For example, during periods when some high pressure, high mass airflow is desired, the electric motor can be used to drive the compressor to provide the high pressure, high mass airflow. Then, when the demand is greater, the pressurized air from the compressed air tank can be used to run the turbine, as disclosed above, which produces even higher pressure, higher mass airflow for the system(s).

FIG. 1 illustrates an aircraft 100 in which the examples disclosed herein can be implemented. The aircraft 100 includes a fuselage 102, a first wing 104 (a left wing) coupled to the fuselage 102, and a second wing 106 (a right wing) coupled to the fuselage 102. In the illustrated example, the aircraft 100 includes a first propulsion generator 108 and a second propulsion generator 110 carried by the first and second wings 104, 106, respectively. In other examples, the aircraft 100 may include only one propulsion generator or may include more than two propulsion generators. The propulsion generator(s) can be coupled to the first and second wings 104, 106 and/or another structure on the aircraft 100 (e.g., on the tail section of the fuselage 102). The aircraft 100 may be a manned or unmanned aircraft.

Figure 2:
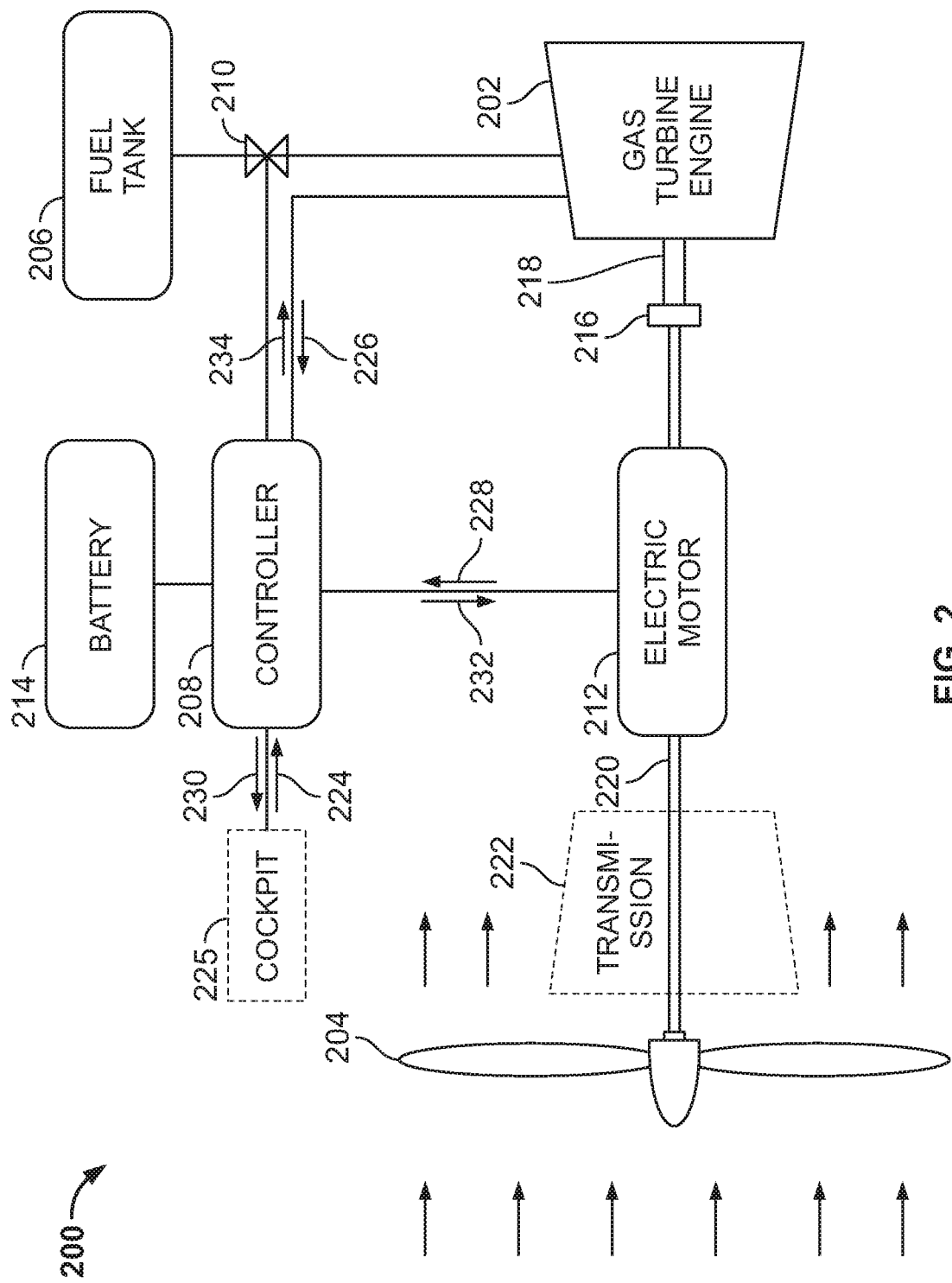
FIG. 2 is a schematic diagram of an example hybrid propulsion engine constructed in accordance with the teachings of this disclosure.

FIG. 2 is a schematic diagram of an example hybrid propulsion engine 200 constructed in accordance with the teachings of this disclosure. The hybrid propulsion engine 200 can be implemented as one or both of the propulsion generators 108, 110 of the aircraft 100 (FIG. 1). As shown in FIG. 2, the hybrid propulsion engine 200 includes an internal combustion engine 202 and a propulsor 204 that can be driven by the internal combustion engine 202 to produce forward thrust. In this example, the internal combustion engine 202 is implemented as a gas turbine engine 202. The propulsor 204 can be a fan of a turbofan engine, for example, such as in the turbofan engine shown in FIG. 4 and described in further detail herein. In other examples, the propulsor 204 can be a propeller of a turboprop engine, such as in the turboprop engine shown in FIG. 5. The propulsor 204 can be on the front of the hybrid propulsion engine 200 (known as a tractor configuration) or on the rear of the hybrid propulsion engine 200 (known as a pusher configuration). Also, the propulsor 204 can include two or more propulsors, such as two counter-rotating propellers. The gas turbine engine 202 is powered by fuel from a fuel tank 206. A controller 208 (e.g., an electronic engine controller (EEC), a processor, etc.) controls the on/off operations of the gas turbine engine 202. The controller 208 operates a valve 210 that controls the flow of fuel from the fuel tank 206 to the gas turbine engine 202 and may also control the ignition component(s) and/or a starter of the gas turbine engine 202.

The hybrid propulsion engine 200 of FIG. 2 also includes an electric motor 212 that can be used to drive the propulsor 204 in addition to or as an alternative to the gas turbine engine 202. The electric motor 212 is separate from any starter or auxiliary power unit (APU) (e.g., an electric motor, a pneumatic motor, a small gas turbine, etc.) associated with the hybrid propulsion engine 200 for starting purposes. The electric motor 212 is powered by an electrical power source 214 and controlled via the controller 208. In the illustrated embodiment, the power source 214 is a battery 214. The gas turbine engine 202 and the electric motor 212 are coupled to the propulsor 204 in a manner that enables each to drive the propulsor 204 independently of the other. In particular, the hybrid propulsion engine 200 is operable in different modes of operation where the gas turbine engine 202 and/or the electric motor 212 is used to drive the propulsor 204 to produce thrust. For example, the hybrid propulsion engine 200 is operable in a first mode of operation where the gas turbine engine 202 is running and the electric motor 212 is off. In this first mode of operation only the gas turbine engine 202 drives the propulsor 204. In a second mode of operation the electric motor 212 is running and the gas turbine engine 202 is off, such that only the electric motor 212 drives the propulsor 204. Using this arrangement and combination of the gas turbine engine 202 and the electric motor 212 enables the gas turbine engine 202 to be smaller and lighter and, thus, reduces the overall size and weight of the hybrid propulsion engine 200. For example, the gas turbine engine 202 can be used to drive the propulsor 204 during take-off and/or landing where more power and/or control is needed, and the electric motor 212 can be used to drive the propulsor 204 during cruise (which accounts for a majority of the flight time). During cruise, the aircraft 100 is generally at a higher altitude where the atmosphere is thinner and, thus, produces less drag on the aircraft 100. As such, less power is usually needed to drive the propulsor 204 to produce sufficient thrust. The electric motor 212 can be used to drive the propulsor 204 at cruise more efficiently than the gas turbine engine 202. Therefore, the gas turbine engine 202 may be used less during normal flights than conventional gas turbine engines that are used throughout the whole flight. As a result, less fuel is needed onboard the aircraft 100, which reduces the overall weight of the aircraft 100.

To enable the electric motor 212 to drive the propulsor 204 independently of the gas turbine engine 202 (and vice versa), the example hybrid propulsion engine 200 includes a clutch 216. In this example, the clutch 216 is implemented as an overrunning clutch (sometimes referred to as a free-wheel, a no-back clutch, or a one-way roller clutch). The overrunning clutch 216 is disposed between the gas turbine engine 202 and the electric motor 212. In the illustrated example, the gas turbine engine 202 includes a first drive shaft 218 (an output shaft) that is driven when the gas turbine engine 202 is running. In some examples, the gas turbine engine 202 is a multi-spool engine and the first drive shaft 218 corresponds to a low pressure compressor (LPC) shaft of the gas turbine engine 202.

The propulsor 204 is coupled, directly or indirectly, to a second drive shaft 220. In some examples, the second drive shaft 220 is formed integrally with the electric motor 212. Specifically, the second drive shaft 220 can also function as the rotor shaft of the electric motor 212. Optionally, the second drive shaft 220 can be coupled directly to an output of the electric motor 212, e.g. the second drive shaft 220 is coupled to an end of the electric motor 212 rotor. The hybrid propulsion engine 200 can include a transmission 222 (sometimes referred to as a gear box) coupled between the second drive shaft 220 and the propulsor 204. The transmission 222 changes the rotational speed between the second drive shaft 220 and the propulsor 204. Thus, the propulsor 204 is driven by rotating the second drive shaft 220.

During a first mode of operation, the gas turbine engine 202 is running and the electric motor 212 is off. The first drive shaft 218 of the gas turbine engine 202 rotates the second drive shaft 220 via the overrunning clutch 216 and, thus, rotates the propulsor 204. Therefore, in the first mode of operation, the gas turbine engine 202 drives the propulsor 204 via the overrunning clutch 216 to produce forward thrust. While the second drive shaft 220 is rotating, the electric motor 212 is off (e.g., no current is being applied to the coils of the electric motor 212). Conversely, during a second mode of operation, the electric motor 212 is running and the gas turbine engine 202 is either off or transitioning to an off-state. The electric motor 212 rotates the second drive shaft 220 and, thus, drives the propulsor 204. Thus, in the second mode of operation, the electric motor 212 is used to drive the propulsor 204 to produce forward thrust.

In the second mode of operation, the overrunning clutch 216 enables the second drive shaft 220 to rotate without rotating the first drive shaft 218. In other words, when the electric motor 212 is driving the second drive shaft 220, the gas turbine engine 202 is off and the first drive shaft 218 is approximately stationary (not rotated).

In one example, during take-off for example, the aircraft 100 can be configured to operate in the first mode of operation, i.e. the gas turbine engine 202 is driving the propulsor 204 and the electric motor 212 is off. After take-off, it may be desirable to transition from the first mode of operation to the second mode of operation wherein the electric motor 212 is driving the propulsor 204. To transition from the first mode to the second mode, the controller 208 transmits a start command to the electric motor 212 and also transmits a separate command to the gas turbine engine 202. The command to the gas turbine engine may be a stop command or a command to reduce an operational speed of the gas turbine engine 202, e.g. a command to operate the gas turbine engine 202 at idle speed.

When transitioning from the first mode of operation to the second mode of operation, the rotational speed of the gas turbine engine 202 decreases and the rotational speed of the electric motor 212 increases. When the rotational speed of the electric motor 212 is greater than the rotational speed of the gas turbine engine 202, i.e. the rotational speed of the second drive shaft 220 is greater than the rotational speed of the first drive shaft 218, the overrunning clutch 216 disengages such that the electric motor 212 is driving the propulsor 204.

Conversely, when transitioning from the second mode of operation to the first mode of operation, the rotational speed of the gas turbine engine 202 increases and the rotational speed of the electric motor 212 decreases. When the rotational speed of the gas turbine engine 202 is greater than the rotational speed of the electric motor 212, i.e. the rotational speed of the second drive shaft 220 is less than the rotational speed of the first drive shaft 218, the overrunning clutch 216 engages such that the gas turbine engine 202 is driving the propulsor 204 via the first and second drive shafts 218, 220.

As such, the overrunning clutch 216 enables the gas turbine engine 202 and the electric motor 212 to operate in a parallel manner, such that the gas turbine engine 202 and the electric motor 212 can operate to drive the propulsor 204 independent of the other. Thus, while the gas turbine engine 202 and the electric motor 212 are shown as mechanically coupled in series to the propulsor 204, the overrunning clutch 216 enables the gas turbine engine 202 and the electric motor 212 to operate in a parallel manner. The controller 208 controls the on/off operations of the gas turbine engine 202 and the electric motor 212 to switch between the first mode of operation and the second mode of operation based on pilot input (e.g., via activation of a button or switch) and/or an auto-pilot program. In other examples, other types of clutches can be used as an alternative to the overrunning clutch 216. Further, while in this example the hybrid propulsion engine 200 utilizes the gas turbine engine 202, in other examples the hybrid propulsion engine 200 can be implemented in connection with other types of internal combustion engines, such as a reciprocating piston engine or a rotary engine (e.g., a Wankel engine).

In FIG. 2, the propulsor 204, the electric motor 212, and the gas turbine engine 202 are all axially aligned. In particular, the rotational axis of the propulsor 204 is coaxial with the first drive shaft 218 and the second drive shaft 220. In other examples, the rotational axis of the first drive shaft 218 and the second drive shaft 220 remain aligned. However, the propulsor 204 can be offset from the rotational axis of the first drive shaft 218 and the second drive shaft 220.

For example, the transmission 222 can include a gear and pinion arrangement that separates the rotational axis of the propulsor 204 from the rotational axes of the first and second drive shafts 218, 220.

In some examples, the hybrid propulsion engine 200 can operate in a third mode of operation where the electric motor 212 is used to supplement the gas turbine engine 202 in driving the propulsor 204 for a period of time without powering down the gas turbine engine 202. For instance, the gas turbine engine 202 may be running and driving the propulsor 204 via the first and second drive shafts 218, 220 (e.g., in the first mode of operation). The overrunning clutch 216 is engaged, such that the gas turbine engine 202 is powering the propulsor 204. Then, the electric motor 212 can be energized. The electric motor 212 can be used to drive the second drive shaft 220 faster than the first drive shaft 218 for a period of time to produce additional thrust. For example, during taxi, the electric motor 212 can be used to add bursts of power to the propulsor 204. The overrunning clutch 216 enables the second drive shaft 220 to rotate faster than the first drive shaft 218. Then, when the electric motor 212 is turned off, the second drive shaft 220 slows down until its speed matches the speed of the first drive shaft 218, at which point the overrunning clutch 216 reengages and the gas turbine engine 202 continues to power the propulsor 204. In other examples, the electric motor 212 can be operated to rotate the second drive shaft 220 at substantially the same speed as the gas turbine engine 202, thereby adding torque to the system and reducing some of the load on the gas turbine engine 202. In other words, the gas turbine engine 202 and the electric motor 212 can both drive the propulsor 204.

In an example operation, assume the hybrid propulsion engine 200 is operating in the first mode of operation, where the gas turbine engine 202 is driving the propulsor 204 and the electric motor 212 is de-energized. The gas turbine engine 202 can be used during take-off and climb, for example, where more thrust is desired. Then, the controller 208 receives an input signal 224 requesting to switch modes from the first mode of operation to the second mode of operation. The input signal 224 can be generated by a pilot in a cockpit 225, for example. Additionally or alternatively, the input signal 224 can be generated by an auto-pilot program (e.g., based on a segment of flight). For example, once a certain altitude is reached, the auto-pilot program can request a mode change to switch to using the electric motor 212 instead of the gas turbine engine 202.

In response to the input signal 224, the controller 208 checks one or more mode-change parameters or conditions to verify whether the mode-change can occur. For example, the controller 208 receives status signals 226, 228 from the gas turbine engine 202 and the electric motor 212, respectively, regarding the operating states of the gas turbine engine 202 and the electric motor 212. The status signals 226, 228 can be generated from one or more sensors associated with the gas turbine engine 202 and/or the electric motor 212. The controller 208 can also receive information from various other flight systems. The mode-change parameter(s) can include the operational conditions of the electric motor 212 and the gas turbine engine 202, the temperature of the gas turbine engine 202, the altitude of the aircraft 100, the speed of the aircraft 100, the segment of flight of the aircraft 100 (e.g., whether the aircraft 100 is in take-off, climb, cruise, etc.), the ambient temperature, any/or any other conditions that may be of interest prior to changing the mode of operation.

The controller 208 may compare the mode-change parameter(s) to one or more threshold(s). If the mode-change parameter(s) is/are not satisfied (e.g., the parameter(s) do not meet the threshold(s)), the controller 208 generates an alert signal 230. In some examples, the controller 208 sends the alert signal 230 to the cockpit 225 to be displayed to a pilot or other aircraft personnel. In such an example, the mode-change does not occur, and the hybrid propulsion engine 200 continues to operate in the first mode of operation where the gas turbine engine 202 is driving the propulsor 204.

If the mode-change parameter(s) is/are satisfied (e.g., the parameter(s) do meet the threshold(s)), the controller 208 sends a command signal 232 (e.g., a start command) to start the electric motor 212. The controller 208 can control the flow of electrical power from the battery 214 to the electric motor 212. Once the controller 208 determines the electric motor 212 is operational and driving the propulsor 204 (e.g., based on the status signals 228 from the electric motor 212), the controller 208 sends a command signal 234 (e.g., a shut-down command) to the gas turbine engine 202 to power down. When switching from the second mode of operation to the first mode of operation, the reverse process occurs. Examples of these processes are disclosed in further detail in connection with the flowcharts in FIGS. 8A and 8B.

In some examples, while the gas turbine engine 202 is running and driving the propulsor 204, the electric motor 212 is used as a generator to charge the battery 214. In other words, while the second drive shaft 220 is rotating, the electric motor 212 generates electrical power that can be used to charge the battery 214. The battery 214 can also be recharged when the aircraft 100 is on the ground (e.g., while waiting at an airport terminal). The controller 208 manages the flow of electrical power between the electric motor 212 and the battery 214. The electrical power stored in the battery 214 is used to power the electric motor 212 at a later time and/or used to power one or more other electrical system(s) of the aircraft 100. Additionally or alternatively, the electrical power generated by the electric motor 212 can be provided directly to one or more electrical system(s) of the aircraft 100 (without going through the battery 214). In other examples, instead of using the electric motor 212 as a generator, the controller 208 can disconnect the electric motor 212 from the battery 214, such that no power is generated by the electric motor 212, which reduces torque on the second drive shaft 220 that may otherwise be caused by the electric motor 212 when operating as a generator. While in the illustrated example the battery 214 is used to store electrical power, in other examples, the battery 214 can be implemented as a fuel cell, a capacitor, and/or any other device capable of storing electrical power. Thus, the electric motor 212 can be used to drive the propulsor 204 to produce thrust during flight (e.g., during cruise), can be used when there is a failure in the gas turbine engine 202, can be used supplement the gas turbine engine 202 (e.g., to provide extra power for short periods), and/or can be used to produce electrical power for the aircraft 100.

Figure 3:
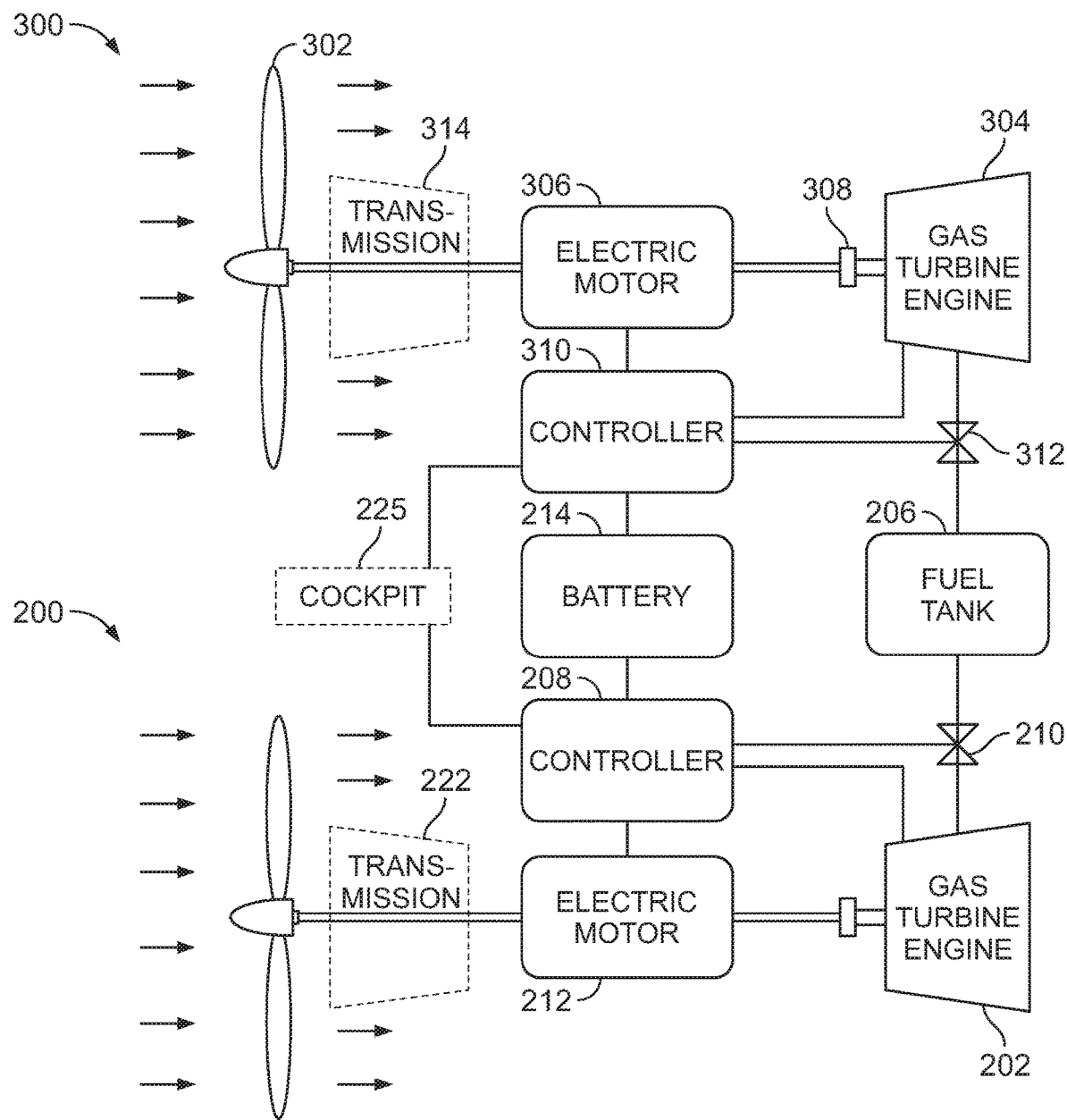
FIG. 3 is a schematic diagram of two example hybrid propulsion engines.

FIG. 3 is a schematic showing two hybrid propulsions engines, including the first hybrid propulsion engine 200 from FIG. 2 and a second hybrid propulsion engine 300. In the illustrated example, the second hybrid propulsion engine 300 is substantially the same as the first hybrid propulsion engine 200. In particular, the second hybrid propulsion engine 300 includes a second propulsor 302, a second gas turbine engine 304, a second electric motor 306, and a second overrunning clutch 308 operatively coupled between the second gas turbine engine 304 and the second electric motor 306 to enable the second electric motor 306 to drive the second propulsor 302 independent of the second gas turbine engine 304. The second hybrid propulsion engine 300 also includes a second controller 310 that controls the on/off operations of the second gas turbine engine 304 (e.g., by controlling a second valve 312) and/or the second electric motor 306. In some examples, the controllers 208, 310 are implemented by the same controller. In some examples, the second hybrid propulsion engine 300 includes a second transmission 314. The second hybrid propulsion engine 300 can operate in substantially the same modes of operation as the hybrid propulsion engine 200. Thus, to avoid redundancy, a description of the operations of the second hybrid propulsion engine 300 is not provided again in connection with FIG. 3. The first and second hybrid propulsion engines 200, 300 may correspond to the first and second propulsion generators 108, 110 (FIG. 1), respectively, of the aircraft 100.

In FIG. 3, the first and second hybrid propulsion engines 200, 300 share the battery 214 and the fuel tank 206. Thus, in some examples, two or more hybrid propulsion engines can utilize the same resources. As mentioned above, the aircraft 100 may include more than two hybrid propulsion engines, all of which can share the same resources. In other examples, the hybrid propulsion engine(s) can utilize their own dedicated resource(s) and/or may be grouped together in other arrangements (e.g., right wing engines share the same resources and left wing engines share the same resources). In still other examples, one of the hybrid propulsion engines 200, 300 can be used to power multiple propulsors on an aircraft. For example, an aircraft can include a plurality of propulsors spaced apart on a wing of the aircraft. The hybrid propulsion engine 200 can be coupled to the propulsors via a transmission, such that the hybrid propulsion engine 200 can be used to power all of the propulsors using the gas turbine engine 202 and/or the electric motor 212.

Figure 4:
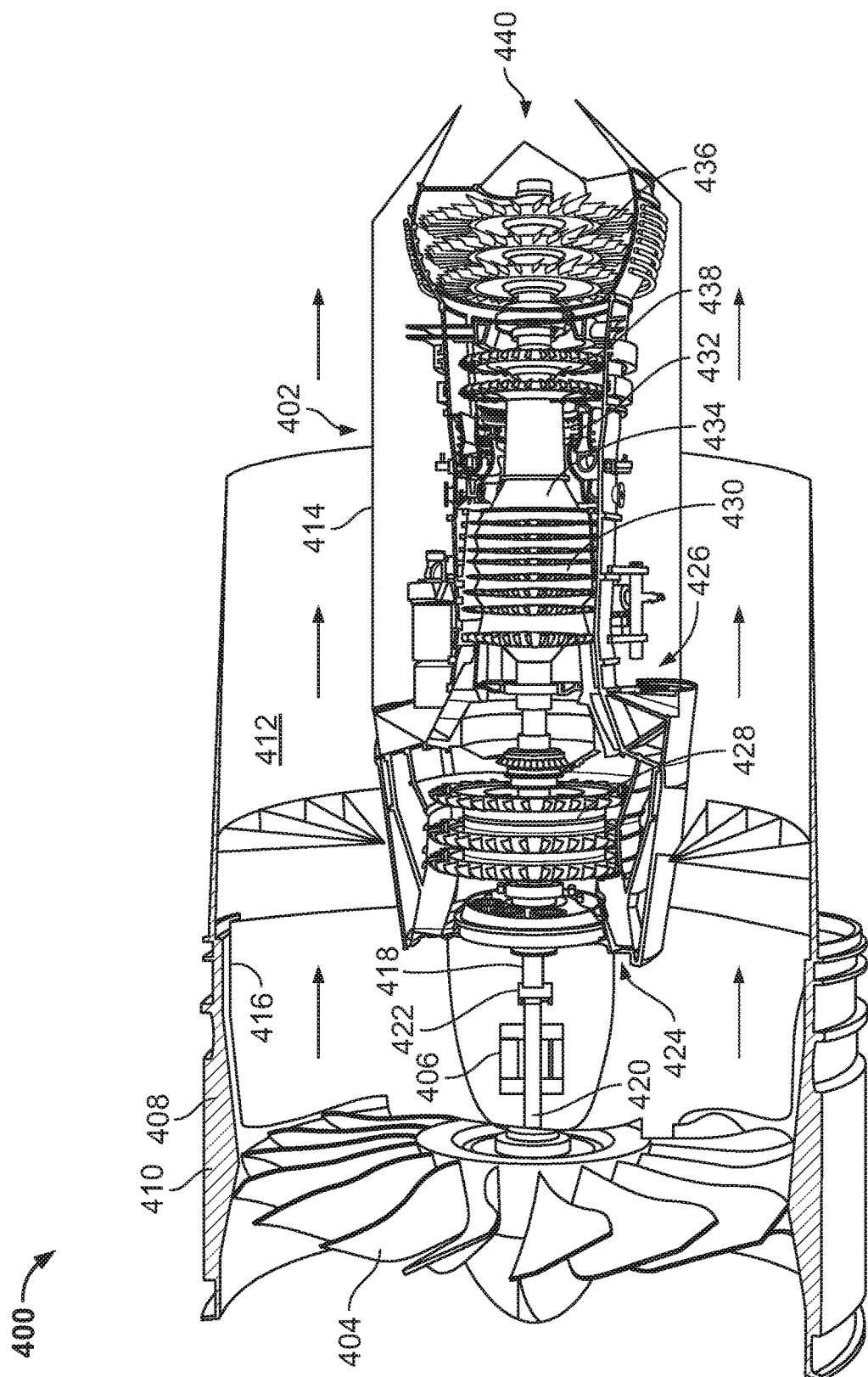
FIG. 4 is a partial cutaway view of an example hybrid propulsion engine implemented in connection with a turbofan engine including a gas turbine engine and electric motor.

FIG. 4 is a partial cutaway view of an example hybrid propulsion engine 400 that can be implemented as the hybrid propulsion engine 200 of FIGS. 2 and 3 and used as one of the propulsion generators 108, 110 on the aircraft 100. In the illustrated example, the hybrid propulsion engine 400 is implemented as a turbofan engine. The hybrid propulsion engine 400 includes a gas turbine engine 402, a fan 404, and an electric motor 406, which correspond to the gas turbine engine 202, the propulsor 204, and the electric motor 212, respectively, of the hybrid propulsion engine 200 of FIG. 2. The gas turbine engine 402 and the electric motor 406 operate in different modes to drive the fan 404 to produce thrust.

In the illustrated example, the hybrid propulsion engine 400 includes a nacelle 408. The gas turbine engine 402 and the electric motor 406 are disposed within (e.g., surrounded by) the nacelle 408. The fan 404 rotates within a fan cowl 410 (e.g., a fan frame) of the nacelle 408. A fan duct 412 (e.g., a bypass, a passageway, a channel, a nozzle duct, etc.) is defined between an outer wall 414 (sometimes referred to as a core cowl) of the gas turbine engine 402 and an inner wall 416 of the nacelle 408. As the fan 404 rotates, the fan 404 produces airflow (as shown by the arrows), at least a portion of which flows through the fan duct 412 (e.g., aft of the fan cowl 410) and produces forward thrust.

As shown in FIG. 4, the gas turbine engine 402 includes a first drive shaft 418. The fan 404 is coupled (directly or indirectly) to and driven by a second drive shaft 420. The second drive shaft 420 is the output shaft (e.g., the rotor) of the electric motor 406. The first and second drive shafts 418, 420 are coupled via an overrunning clutch 422. The first drive shaft 418, the second drive shaft 420, and the overrunning clutch 422 may correspond to the first drive shaft 218, the second drive shaft 220, and the overrunning clutch 216, respectively, of the example hybrid propulsion engine 200 of FIG. 2 and operate in substantially the same manner.

The gas turbine engine 402 operates by drawing air through a core air intake 424 (at a fore end of the gas turbine engine 402) and into a compressor 426. In particular, when the gas turbine engine 402 is running, a portion of the airflow from the fan duct 412 is diverted through the core air intake 424 and into the compressor 426 of the gas turbine engine 402. The compressor 426 can include multiple compressor sections. For example, the compressor 426 of FIG. 4 is a dual-axial compressor that includes two compressors, a first compressor 428 and a second compressor 430. Each of the first and second compressors 428, 430 includes various compressor stages that progressively increase the pressure of the air as the air flows from the core air intake 424 to a combustion chamber 432. The first compressor 428 is a low-pressure compressor (LPC) that provides relatively low pressure air and the second compressor 430 is a high-pressure compressor (HPC) that provides relatively high pressure air. The first compressor 428 is coupled to the first drive shaft 418, and the second compressor 430 is coupled to a third drive shaft 434 (e.g., a second drive shaft of the gas turbine engine 402). The first drive shaft 418 (e.g., the LPC shaft) is coupled to and driven by a first turbine 436 (e.g., a low-pressure turbine) and the third drive shaft 434 (e.g., a HPC shaft) is coupled to and driven a second turbine 438 (e.g., a high-pressure turbine). In this example, the compressor 426 is a dual-axial compressor that includes the two compressors 428, 430. However, in other examples, the compressor 426 can include more or fewer compressor sections, each coupled to a turbine via a respective shaft.

After exiting the second compressor 430 (the HPC), the highly pressurized air is provided to the combustion chamber 432, where fuel (e.g., from the fuel tank 206 of FIG. 2) is injected and mixed with the highly pressurized air and ignited. The high energy airflow exiting the combustion chamber 432 turns the blades of the first and second turbines 436, 438, which are coupled to respective ones of the first and third drive shafts 418, 434. The first drive shaft 418 extends through and rotates independently of the third drive shaft 434. As such, rotation of the first and third drive shafts 418, 434 turns the blades of the first and second compressors 428, 430, respectively. The heated air is exhausted via a nozzle 440, aftward, where it mixes with the accelerated airflow provided by the fan 404 in the fan duct 412 to produce forward thrust that propels the aircraft 100 in a forward direction.

In this example, the rotational axis of the fan 404 is coaxial with the first drive shaft 418 and the second drive shaft 420. In other words, the fan 404, the first drive shaft 418, and the second drive shaft 420 are axially aligned. In other examples, the rotational axis of the fan 404 is parallel to and offset from the first and second drive shafts 418, 420.

In a first mode of operation, the gas turbine engine 402 is running and the electric motor 406 is off. The gas turbine engine 402 produces rotation in the first drive shaft 418, which rotates the second drive shaft 420 via the overrunning clutch 422 and, thus, rotates the fan 404. In a second mode of operation, the electric motor 406 is running and the gas turbine engine 402 is off. The electric motor 406 operates to rotate the second drive shaft 420, thereby rotating the fan 404. The overrunning clutch 422 enables the second drive shaft 420 to rotate independently of the first drive shaft 418. In some examples, a transmission is disposed between the second drive shaft 420 and the fan 404 to change the rotational speed between the second drive shaft 420 and the fan 404.

Figure 6:
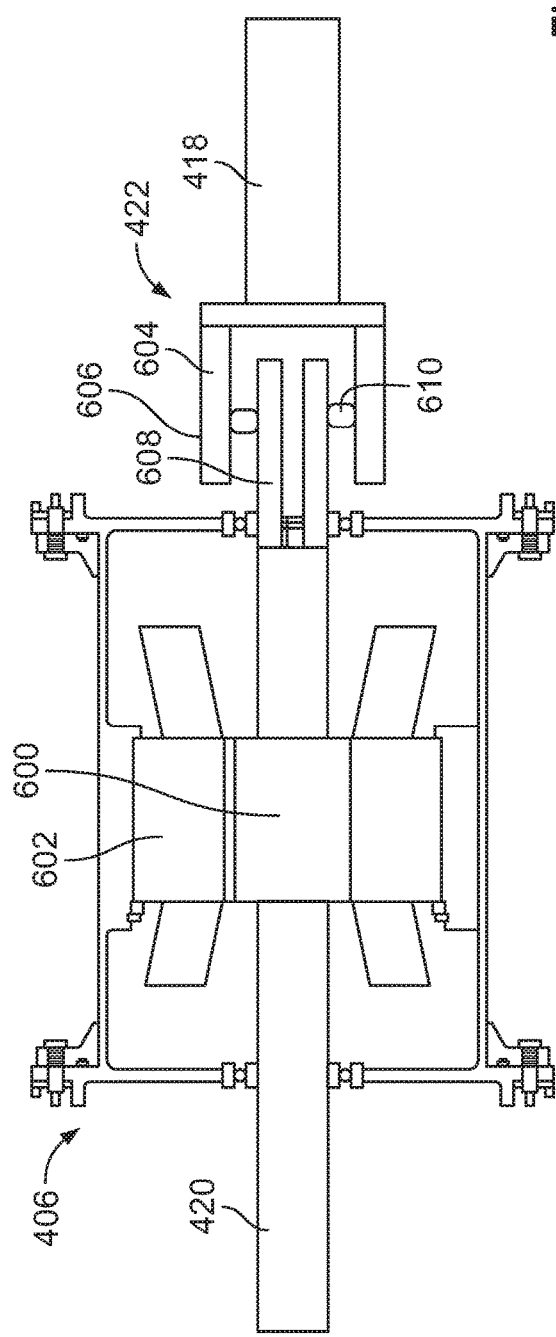
FIG. 6 is an enlarged view of the electric motor of the hybrid propulsion engine of FIG. 4.
Figures 7A, 7B:
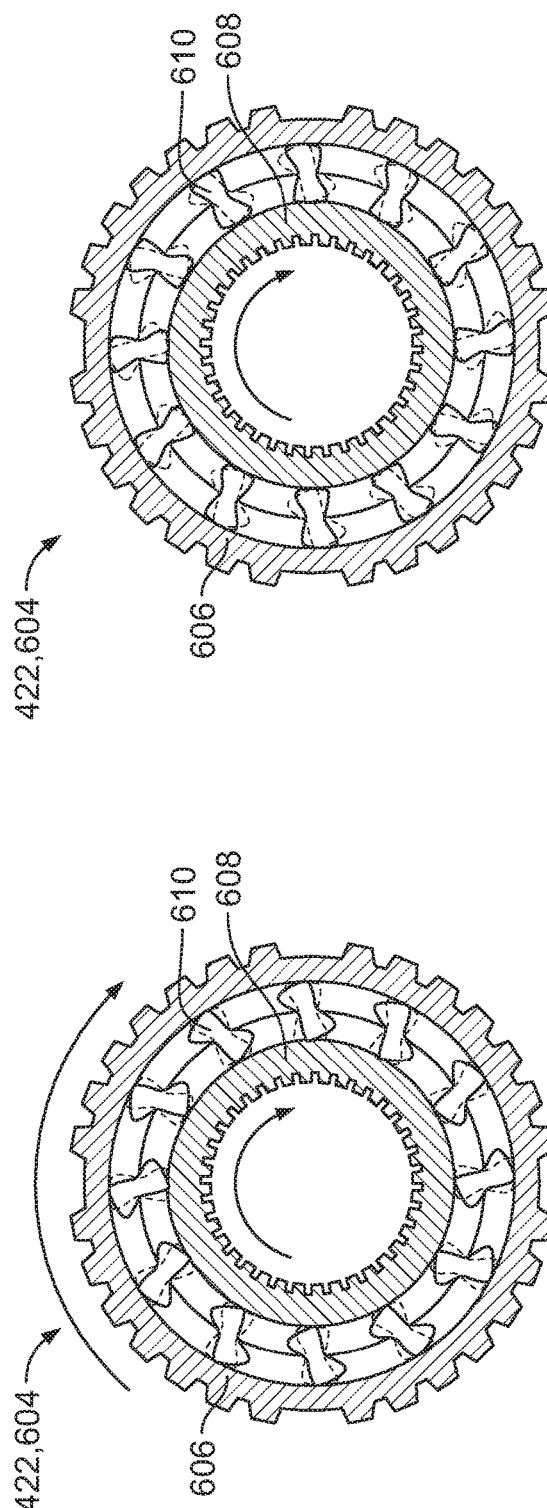
FIGS. 7A and 7B are cross-sectional views of an overrunning clutch from FIG. 6.

Turning briefly to FIGS. 6, 7A, and 7B, FIG. 6 shows an enlarged view of the electric motor 406, the first drive shaft 418, the second drive shaft 420, and the overrunning clutch 422. In the illustrated example, the electric motor 406 includes an armature 600 coupled to the second drive shaft 420 and a stator 602 surrounding the armature 600. The armature 600 may be formed unitarily with the second drive shaft 420. The armature 600 may include coils and the stator 602 may include magnets (or electromagnets), or vice versa. When the electric motor 406 is energized (e.g., via the controller 208 of FIG. 2), the armature 600 rotates, thereby rotating the second drive shaft 420. When the electric motor 406 is de-energized the armature 600 no longer functions as the primary driver of the fan 404. However, the armature 600 and therefore, the second drive shaft 420 are still free to rotate within the stator 602. In some examples, the electric motor 406 operates as a generator to charge a battery (e.g., the battery 214 of FIG. 2) and/or provide electrical power directly to one or more electrical system(s) of the aircraft 100. The electric motor 406 can be implemented as any type of electric motor (e.g., an induction motor, a DC/AC permanent magnet motor, etc.) and is not limited to the example electric motor 406 shown in FIG. 6. Instead, it is understood that other types of electric motors can be similarly used, and the armature, stator, commutator, etc. may be arranged differently depending on the type of motor.

In the illustrated example, the overrunning clutch 422 is implemented as a sprag clutch 604. The sprag clutch 604 includes an outer race 606, an inner race 608, and a plurality of movable sprags 610 disposed between the outer race 606 and the inner race 608. In this example, the first drive shaft 418 (which is powered by the gas turbine engine 402 (FIG. 4)) is coupled to the outer race 606 and the second drive shaft 420 (which is coupled to the fan 404 (FIG. 4)) is coupled to the inner race 608. FIGS. 7A and 7B are cross-sectional views of the example overrunning clutch 422. The sprags 610 (one of which is referenced in each figure) are pivotable about their centers (extending into the page). In FIG. 7A, the outer race 606 is rotating in the clockwise direction. This occurs, for example, during the first mode of operation when the gas turbine engine 402 is on and the electric motor 406 is off. The interaction between the outer race 606 and the sprags 610 causes the sprags 610 to pivot into and engage the inner race 608. As a result, the outer race 606, the sprags 610, and the inner race 608 all rotate together, in the clockwise direction. Therefore, when the first drive shaft 418 rotates the outer race 606, the outer race 606 rotates the inner race 608 and, thus, rotates the second drive shaft 420 in the same direction. In FIG. 7B, the inner race 608 is rotating in the clockwise direction independent of the outer race 606. This occurs, for example, during the second mode of operation when the gas turbine engine 402 is off and the electric motor 406 is instead driving the second drive shaft 420. As shown in FIG. 7B, the inner race 608 slides along the inner surfaces of the sprags 610. However, this interaction does not cause the sprags 610 to frictionally engage the outer race 606. As such, the inner race 608 rotates in the clockwise direction without causing rotation of the outer race 606. If the outer race 606 is rotated up to match the rotational speed of the inner race 608, the sprags 610 are rotated into the inner race 608 and the outer race 606 eventually overdrives the inner race 608. As such, the inner race 608 rotates at least as fast as the outer race 606. Conversely, while the outer race 606 is rotating, the inner race 608 can be rotated independently at a faster rotational speed, which does not affect the outer race 606. The overrunning clutch 422 advantageously enables the gas turbine engine 402 and the electric motor 406 to independently drive the propulsor 204 without additional actuating components that are found in other types of clutches. Thus, no power is needed to operate the clutch.

While in this example the first drive shaft 418 is coupled to the outer race 606 and the second drive shaft 420 is coupled to the inner race 608, in other examples, the first and second drive shafts 418, 420 may be coupled to other of the outer and inner races 606, 608 and the direction of rotation may be switched, which results in the same effect. Also, while in this example the overrunning clutch 422 is implemented as the sprag clutch 604, in other examples, the overrunning clutch 422 cab be implemented by another type of overrunning clutch, such as a roller ramp clutch, a wrap spring clutch, or a wedge style clutch.

Figure 5:
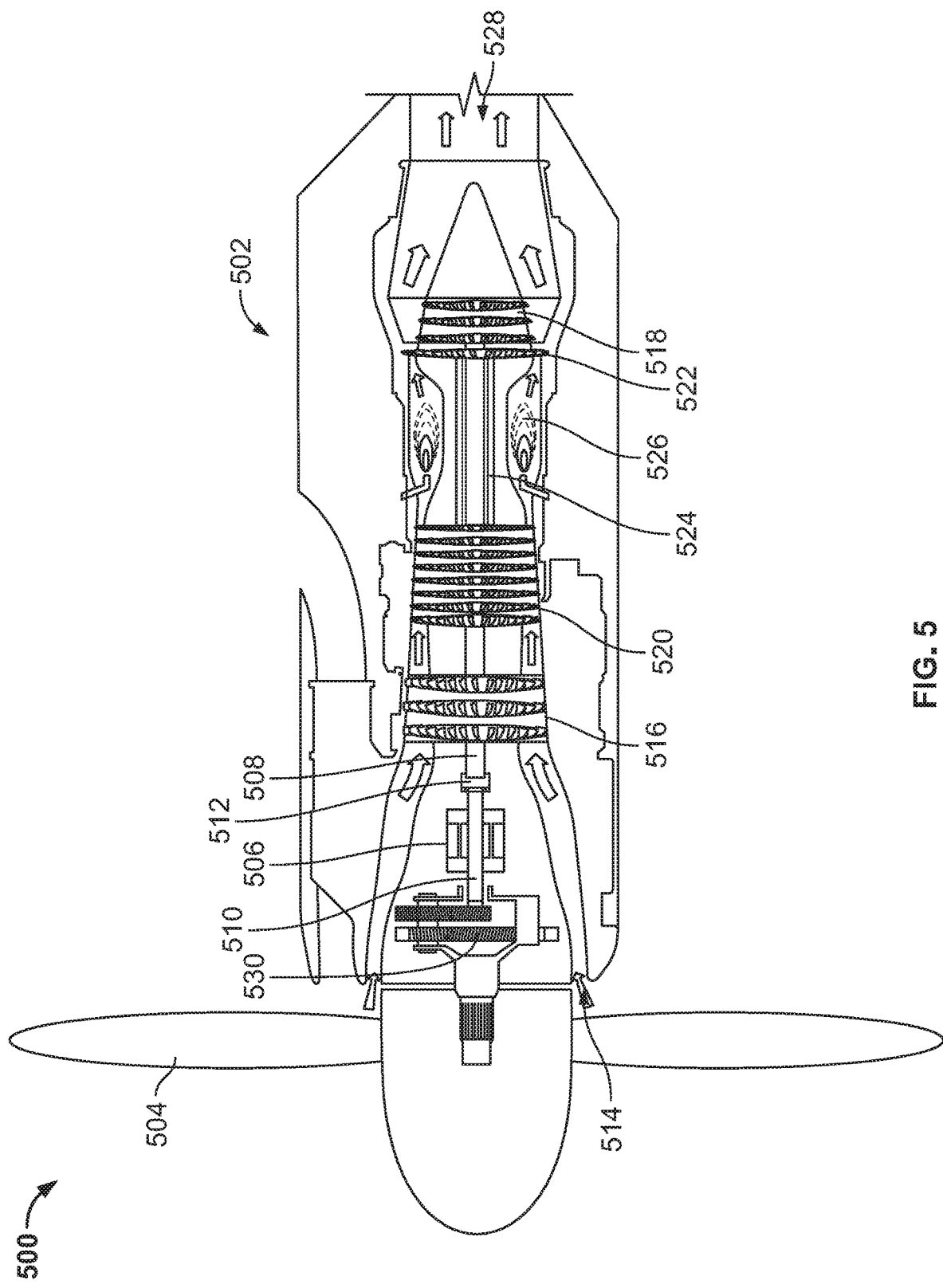
FIG. 5 is a partial cutaway view of an example hybrid propulsion engine implemented in connection with a turboprop engine including a gas turbine engine and electric motor.

Now referring to FIG. 5, FIG. 5 shows a partial cutaway view of another hybrid propulsion engine 500 that can be implemented as the hybrid propulsion engine 200 of FIGS. 2 and 3 and used as one of the propulsion generators 108, 110 on the aircraft 100. In this example, the hybrid propulsion engine 500 is implemented as a turboprop engine. The hybrid propulsion engine 500 includes a gas turbine engine 502, a propeller 504, and an electric motor 506, which correspond, respectively, to the gas turbine engine 202, the propulsor 204, and the electric motor 212 of the hybrid propulsion engine 200 of FIG. 2. Similar to the hybrid propulsion engine 400 of FIG. 4, the gas turbine engine 502 includes a first drive shaft 508, the propeller 504 is coupled (directly or indirectly) to and driven by a second drive shaft 510, the electric motor 506 includes the second drive shaft 510, and the first and second drive shafts 508, 510 are coupled via an overrunning clutch 512. Similar to the examples disclosed above, the gas turbine engine 502 and the electric motor 506 operate in different modes to drive the propeller 504 to produce thrust. Thus, to avoid redundancy, a description of the mode operations is not provided again in connection with FIG. 5. Instead, the interested reader is referred back to description above in connection with FIGS. 2-4 for a full written description of the operations.

Unlike the turbofan engine of FIG. 4, the turboprop engine of FIG. 5 does not include a nacelle or cowl around the propeller 504. Instead, the propeller 504 is an open-air propulsor. Turboprop engines are typically used for lower altitudes and shorter flights compared to turbofan engines. The gas turbine engine 502 of FIG. 5 is substantially similar to the gas turbine engine 402 of FIG. 4 and includes a core air intake 514, a first compressor 516 (a LPC) coupled to a first turbine 518 (a LPT) via the first drive shaft 508, a second compressor 520 (an HPC) coupled to a second turbine 522 (an HPT) via a third drive shaft 524, a combustion chamber 526, and a nozzle 528. In other examples, the gas turbine engine 502 can be arranged differently and/or have more or fewer compressor/turbine sections. Further, the hybrid propulsion engine 500 of FIG. 5 is arranged as a tractor configuration with the propeller 504 on the front of the hybrid propulsion engine 500. However, in other examples, the hybrid propulsion engine 500 can be arranged as a pusher configuration with the propeller 504 in the rear.

As shown in FIG. 5, the hybrid propulsion engine 500 includes a transmission 530 (e.g., a planetary gear system) that couples the second drive shaft 510 to the propeller 504. The transmission 530 is arranged such that the rotational axis of the propeller 504 is coaxial with the first drive shaft 508 and the second drive shaft 510. In other words, the propeller 504, the first drive shaft 508, and the second drive shaft 510 are axially aligned. In other examples, the rotational axis of the propeller 504 is parallel to and offset from the first and second drive shafts 508, 510. For instance, some turboprop engines utilize a transmission that offsets the propeller from the longitudinal axis of the associated turbine gas engine. In other examples, no transmission is included and the second drive shaft 510 is coupled directly to the propeller 504.

Figure 8A:
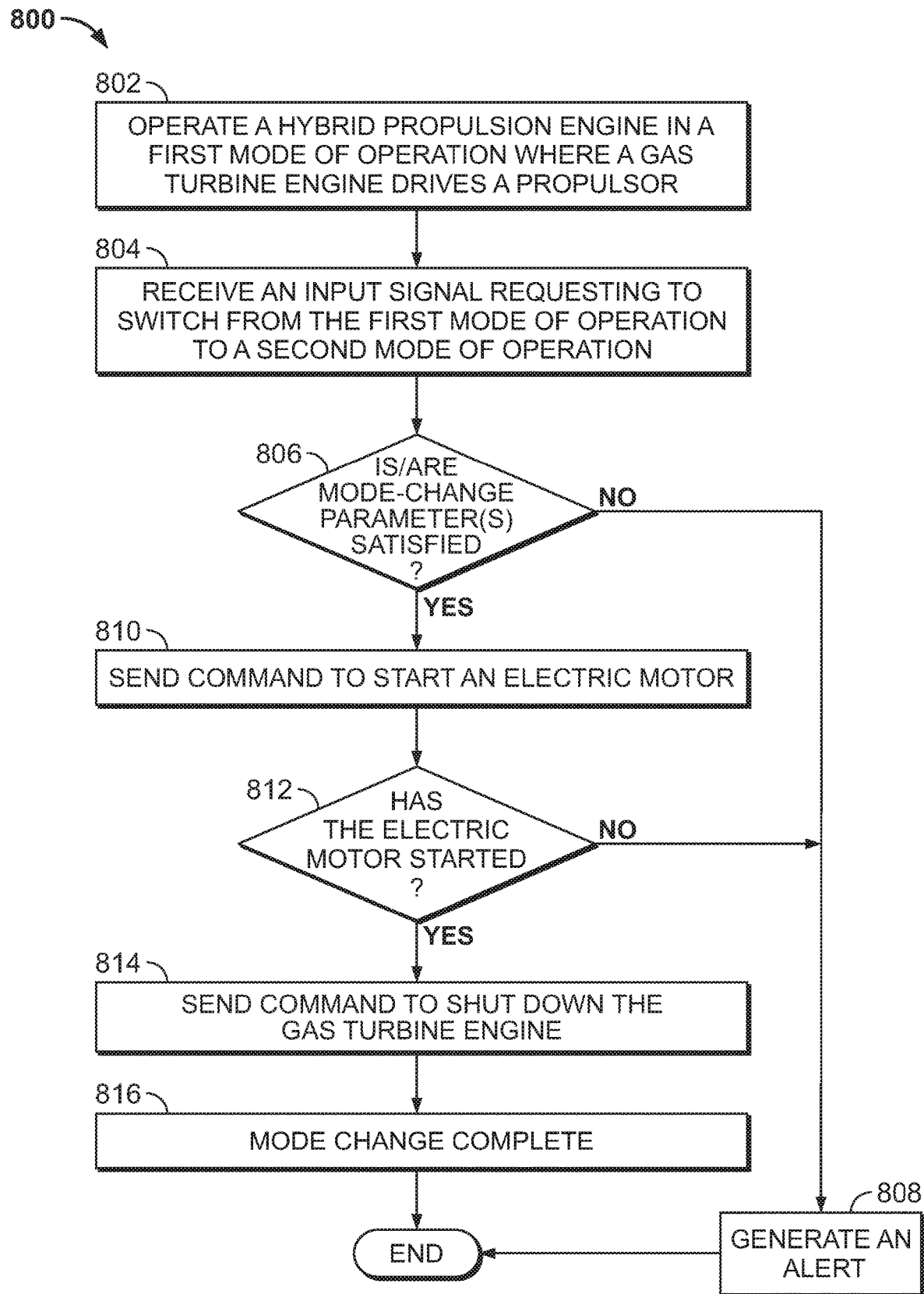
FIG. 8A is a flowchart representative of an example method of changing a hybrid propulsion engine from a first mode of operation to a second mode of operation.

FIG. 8A is a flowchart of an example method 800 of changing an operating-mode of a hybrid propulsion engine from a first mode of operation to a second mode of operation. The method 800 is described in connection with the hybrid propulsion engine 200 of FIG. 2, which can be implemented as a turbofan type of hybrid propulsion engine, such as the hybrid propulsion engine 400 of FIG. 4, or a turboprop type of hybrid propulsion engine, such as the hybrid propulsion engine 500 of FIG. 5. The method 800 is performed at least in part by the controller 208 of FIG. 2, which controls the on/off operations and/or speed control of the gas turbine engine 202 and the electric motor 212.

At block 802, the hybrid propulsion engine 200 is operating in a first mode of operation where the gas turbine engine 202 is driving the propulsor 204. In the first mode of operation, the electric motor 212 is de-energized and/or otherwise not providing power to the propulsor 204. The gas turbine engine 202 drives the first drive shaft 218, which rotates the second drive shaft 220 via the overrunning clutch 216 and, thus, drives the propulsor 204 to produce forward thrust. In some examples, during the first mode of operation, the electric motor 212 operates as a generator to charge the battery 214 and/or provide electrical power directly to one or more system(s) of the aircraft 100.

At block 804, the controller 208 receives the input signal 224 requesting to switch from the first mode of operation to the second mode of operation. The input signal 224 can be generated by a pilot in the cockpit 225, for example. In other examples, the input signal 224 can be generated by an auto-pilot program based on a flight condition. For example, once a certain altitude is reached, the auto-pilot program may request the hybrid propulsion engine 200 to switch modes so the electric motor 212 can be used to more efficiently power the aircraft 100.

At block 806, the controller 208 determines whether one or more mode-change parameter(s) is/are satisfied. The mode-change parameter(s) can include one or more of the operational conditions of the electric motor 212 and the gas turbine engine 202, the temperature of the gas turbine engine 202, the altitude of the aircraft 100, the speed of the aircraft 100, the segment of flight of the aircraft 100 (e.g., whether the aircraft 100 is in cruise or climb), the ambient temperature, etc. The mode-change parameter(s) can be based on information received via the status signals 226, 228 from the gas turbine engine 202 and the electric motor 212.

If the mode-change parameter(s) is/are not satisfied (determined at block 806), the controller 208 generates the alert signal 230 at block 808, and the example method 800 ends. The alert signal 230 can be sent back to the cockpit 225, for example, and displayed to the pilot or another aircraft personnel. In this event, the hybrid propulsion engine 200 does not change modes of operation. For example, if the controller 208 determines the mode-change should not occur because the aircraft 100 is still climbing, the controller generates an alert (block 808) and continues to operate the hybrid propulsion engine 200 in the first mode of operation.

If the mode-change parameter(s) is/are satisfied (determined at block 806), the controller 208 sends the command signal 232 (e.g., a first command signal) to start and/or otherwise energize the electric motor 212 at block 810. For example, if a certain altitude is reached, the controller 208 may determine the mode-change parameter(s) is/are satisfied. The controller 208 can supply power to the electric motor 212 from the battery 214. The electric motor 212 begins driving the second drive shaft 220.

At block 812, the controller 208 verifies that the electric motor 212 has started and is driving the propulsor 204, which may be based on the status signals 228 from the electric motor 212. If the electric motor 212 has not started or is otherwise not operating correctly, the controller 208 generates the alert signal 230, which may be displayed to the pilot, and the example method 800 ends.

If the controller 208 determines the electric motor 212 has started and is powering the propulsor 204, the controller 208, at block 814, sends the command signal 234 (e.g., a second command signal) to the gas turbine engine 202 to shut down and/or otherwise reduce power. The command signal 234 may shut off ignition and/or stop fuel supply (e.g., via the valve 210 of FIG. 2) to the gas turbine engine 402. Thus, the controller 208 ensures the electric motor 212 is powered up prior to shutting down the gas turbine engine 202 to ensure no lapse in power occurs. This transition period can occur over a period of time, such as 30 seconds. Once the electric motor 212 is driving the propulsor 204 and the gas turbine engine 202 is shut down and/or otherwise not providing power to the propulsor 204, the hybrid propulsion engine 200 is operating in the second mode of operation and the mode change is complete (block 816). The example method 800 may then end or proceed to FIG. 8B, which is an example method of switching back to the first mode of operation.

Figure 8B:
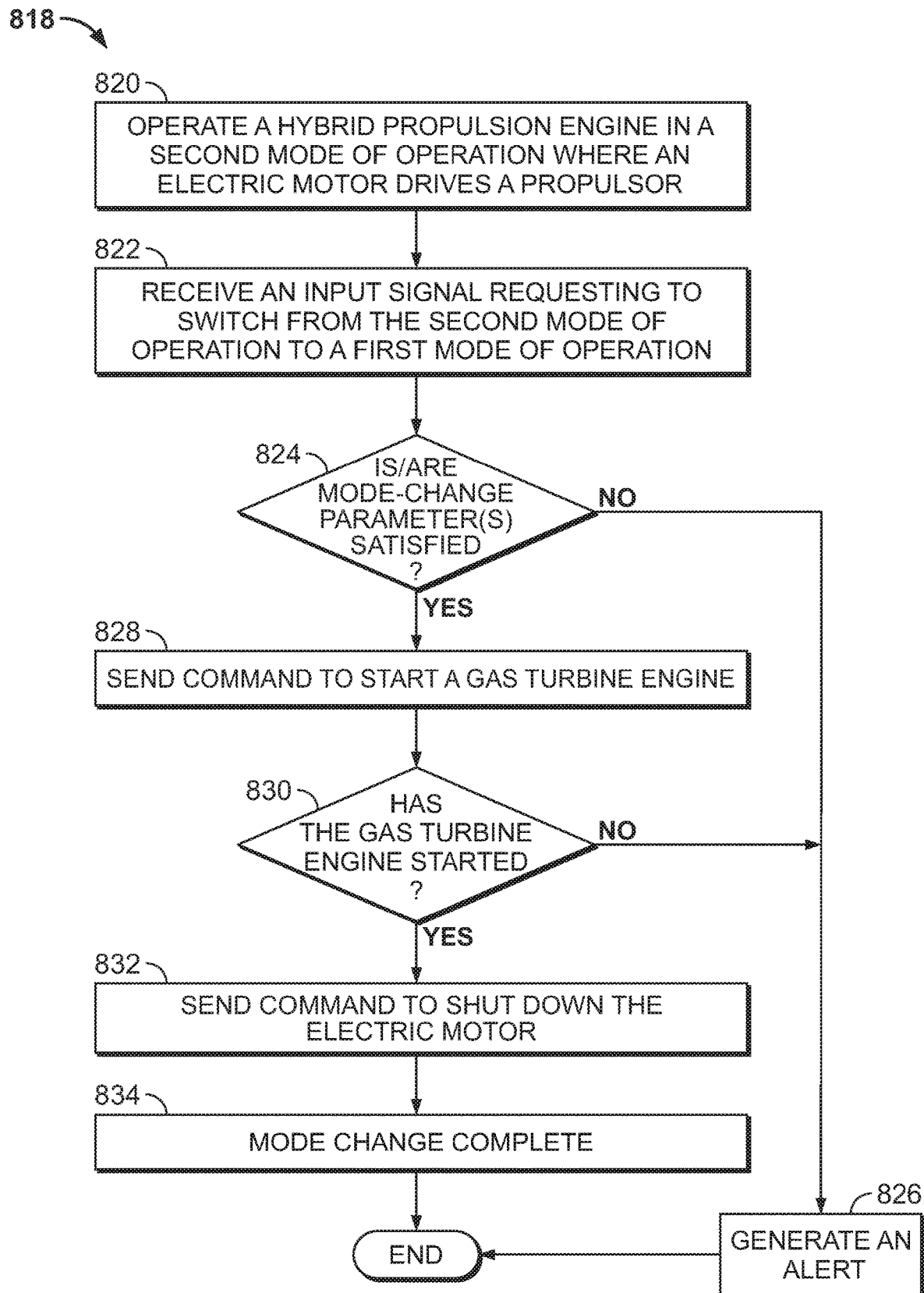
FIG. 8B is a flowchart representative of an example method of changing a hybrid propulsion engine from the second mode of operation to the first mode of operation.

FIG. 8B is a flowchart of an example method 818 of changing an operating-mode of a hybrid propulsion engine from a second mode of operation to a first mode of operation. The method 818 is described in connection with the hybrid propulsion engine 200 of FIG. 2, which can be implemented as a turbofan type of hybrid propulsion engine, such as the hybrid propulsion engine 400 of FIG. 4, or a turbo-prop type of hybrid propulsion engine, such as the hybrid propulsion engine 500 of FIG. 5, for example. The method 818 is performed at least in part by the controller 208 of FIG. 2, which controls the on/off operations and/or speed control of the related gas turbine engine and electric motor.

At block 820, the hybrid propulsion engine 200 is operating in the second mode of operation where the electric motor 212 is driving the propulsor 204. In the second mode of operation, the gas turbine engine 202 is off and/or otherwise not providing power to the propulsor 204 (e.g., operating at idle). The electric motor 212 drives the propulsor 204 via the second drive shaft 220. The overrunning clutch 216 enables the electric motor 212 to drive the second drive shaft 220 (and, thus, the propulsor 204) independent of the gas turbine engine 202.

At block 822, the controller 208 receives the input signal 224 requesting to switch from the second mode of operation to the first mode of operation. Similar to block 804 above, the input signal 224 can be generated by a pilot in the cockpit 225 and/or an auto-pilot program.

At block 824, the controller 208 determines whether one or more mode-change parameter(s) are satisfied. The mode-change parameter(s) can include one or more of the operational conditions of the electric motor 212 and the gas turbine engine 202, the temperature of the gas turbine engine 202, the altitude of the aircraft 100, the speed of the aircraft 100, the segment of flight of the aircraft 100 (e.g., whether the aircraft 100 is in cruise or climb), the ambient temperature, etc.

If the mode-change parameter(s) is/are not satisfied (determined at block 824), the controller 208 generates the alert signal 230 at block 826, and the example method 818 ends. The alert signal 230 can be sent back to the cockpit 225, for example, and displayed to the pilot or another aircraft personnel. In this event, the hybrid propulsion engine 200 does not change modes of operation.

If the mode-change parameter(s) is/are satisfied (determined at block 824), the controller 208 sends the command signal 234 (e.g., a third command signal) to start and/or otherwise power-up the gas turbine engine 202 at block 828. Once the first drive shaft 218 is rotating faster than the second drive shaft 220, the overrunning clutch 216 engages such that the first drive shaft 218 is powering the second drive shaft 220 and, thus, powering the propulsor 204.

At block 830, the controller 208 verifies that the gas turbine engine 212 has started and is driving the propulsor 204, which may be based on the status signals 226 from the gas turbine engine 202. If the gas turbine engine 202 has not started or is otherwise not operating correctly, the controller 208 generates the alert signal 230, which may be displayed to the pilot, and the example method 818 ends.

If the controller 208 determines the gas turbine engine 202 has started and is powering the propulsor 204, the controller 208, at block 832, sends the command signal 232 (e.g., a fourth command signal) to the electric motor 212 to shut down and/or otherwise reduce power. The controller 208 may cut-off electric power from the battery 214, for example. Once the gas turbine engine 202 is driving the propulsor 204 and the electric motor 212 is de-energized and/or otherwise not providing power to the propulsor 204, the hybrid propulsion engine 200 is operating in the first mode of operation and the mode change is complete (block 834). The example method 818 may then end or proceed to FIG. 8A, which is an example method of switching back to the second mode of operation.

The example methods 800, 818 can be repeated any number of times to switch between using the gas turbine engine 202 and the electric motor 212. The hybrid propulsion engine 200 can operate between the first mode of operation and the second mode of operation during different flight segments or conditions. For example, the gas turbine engine 202 can be used to drive the propulsor 204 in the first mode of operation during a first segment of flight, such as take-off and/or landing, and the electric motor 212 can be used to drive the propulsor 204 in the second mode of operation during a second segment of flight, such as cruise. As such, the gas turbine engine 202 is used when more power is typically needed, and then the electric motor 212 is used where less power is needed to improve efficiency. The gas turbine engine 202 and the electric motor 212 can be used in other segments of flight as desired.

Figure 9:
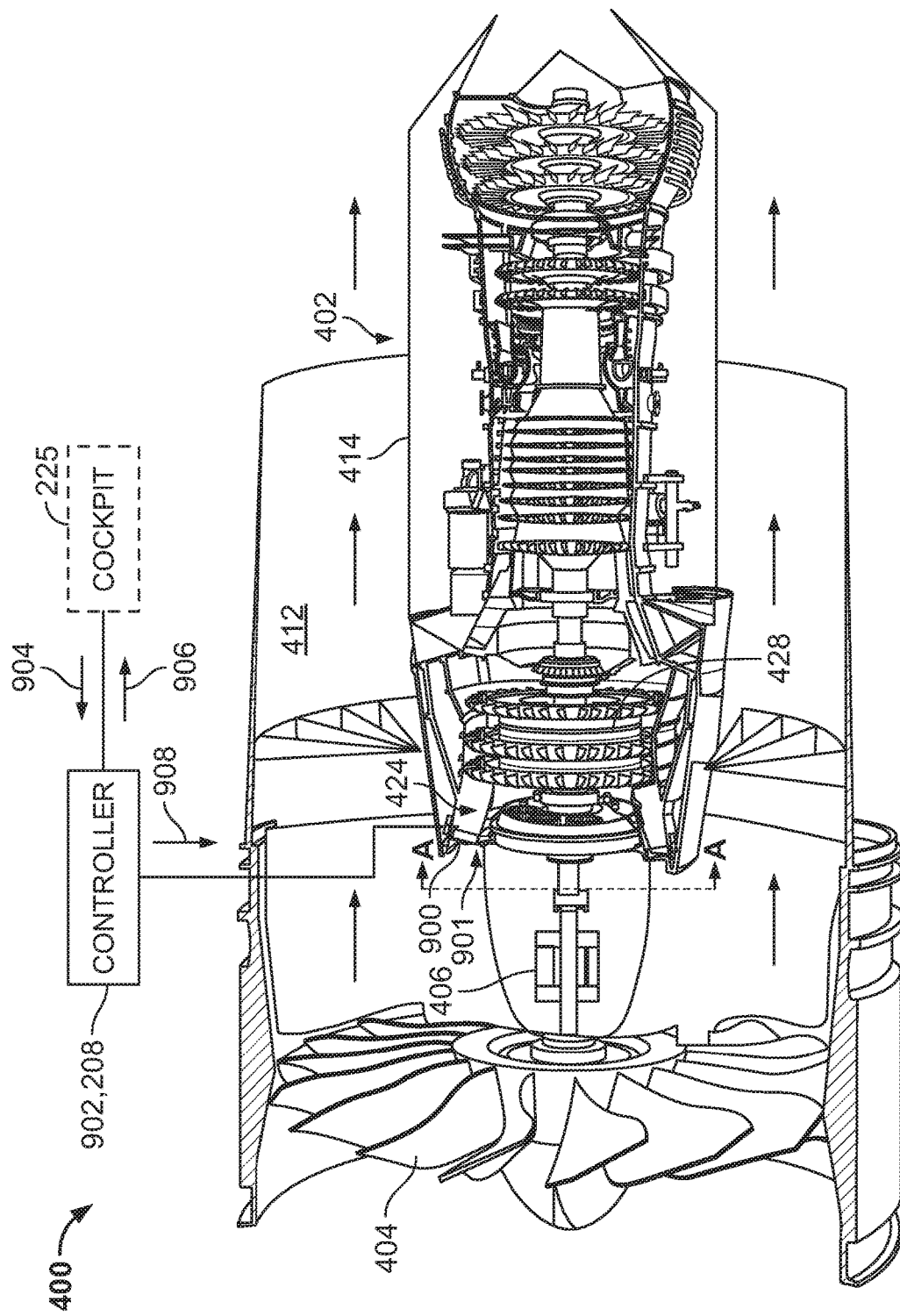
FIG. 9 illustrates an example core damper constructed in accordance with the teachings of this disclosure.

FIG. 9 illustrates an example of the hybrid propulsion engine 400 having a core damper 900 (referred to herein as the damper 900). The damper 900 is used to block airflow into the gas turbine engine 402 when the gas turbine engine 402 is not being used to drive the fan 404. For instance, when hybrid propulsion engine 400 is operating in the second mode of operation, where the gas turbine engine 402 is off (and/or otherwise not driving the fan 404) and the electric motor 406 is driving the fan 404, the airflow in the fan duct 412 can flow through the core air intake 424 and into the first compressor 428, which can cause the first compressor 428 (and/or other sections of the gas turbine engine 402) to windmill. This effect reduces the efficiency of the hybrid propulsion engine 400 by wasting the accelerated airflow in the fan duct 412 that could otherwise be used to produce forward thrust.

Therefore, in the example shown in FIG. 9, the hybrid propulsion engine 400 includes the damper 900. The damper 900 is disposed within the core air intake 424. The core air intake 424 is a passageway or channel between an opening 901 in the outer wall 414 of the gas turbine engine 402 and the first compressor 428. The damper 900 operates between an open state and a closed state. If the gas turbine engine 402 includes inlet guide vanes, the damper 900 is preferably disposed upstream of the inlet guide vanes (which do not close). In the open state, the damper 900 allows airflow through the core air intake 424 and into the first compressor 428. Thus, while the gas turbine engine 402 is running, the damper 900 is in the open state, which allows airflow into the gas turbine engine 402. In the closed state, the damper 900 blocks airflow through the core air intake 424 and into the gas turbine engine 402. As such, the damper 900 isolates the gas turbine engine 402 and prevents the first compressor 428 (and/or other compressor/turbine section(s) of the gas turbine engine 402) from windmilling. The hybrid propulsion engine 400 includes a controller 902 (e.g., a processor) for controlling the core damper 900. If the damper 900 is implemented in connection with the hybrid propulsion engine 400 (corresponding to the hybrid propulsion engine 200 of FIG. 2), the controller 902 can implemented by the controller 208 (FIG. 2), which also controls the on/off operations and/or speeds of the gas turbine engine 402 and the electric motor 406. In other words, the same controller can be used control the mode change operations of the hybrid propulsion engine as well as the operations of the damper 900. However, in other examples the controllers may be separate and in communication with each other.

Figure 11A:
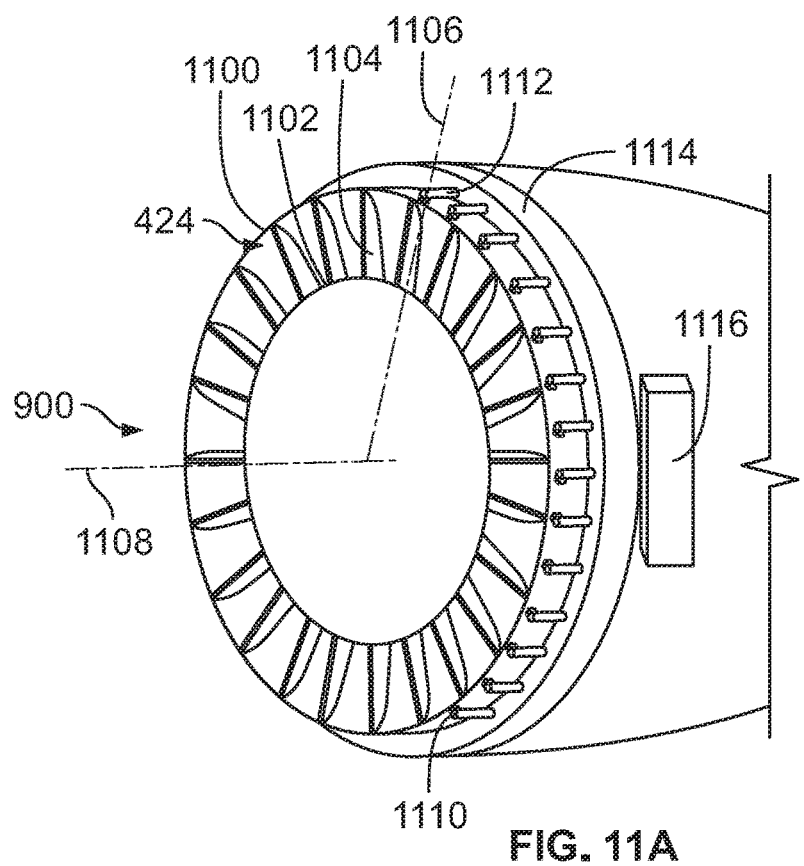
FIGS. 11A and 11B are perspective views of the example core damper of FIG. 9 in an open state and a closed state, respectively.
Figure 11B:
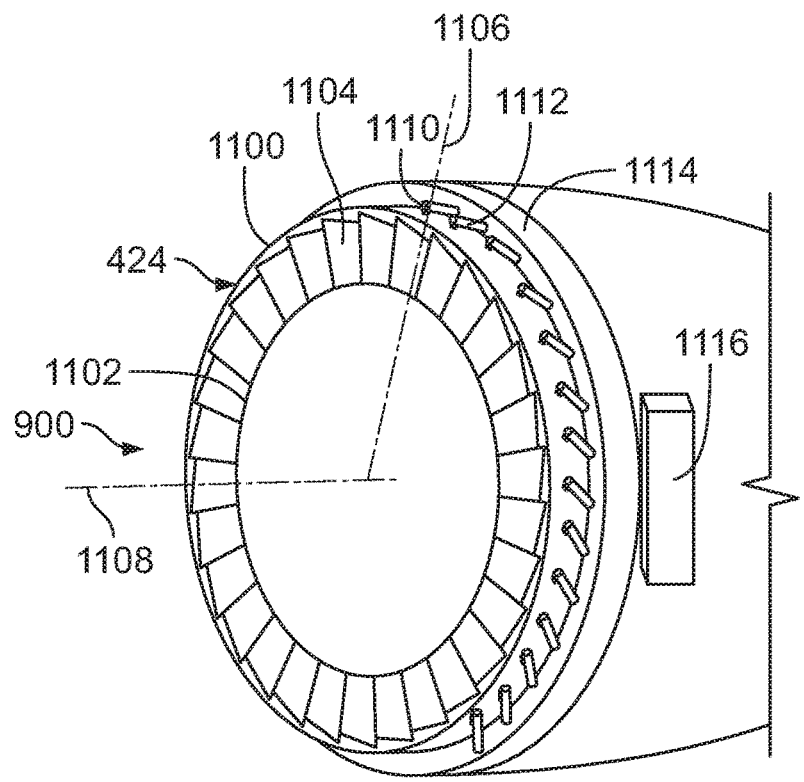

Turning briefly to FIGS. 11A and 11B, FIGS. 11A and 11B are perspective views of the gas turbine engine 402 taken along line A-A from FIG. 9 showing the damper 900 in the core air intake 424. FIG. 11A shows the damper 900 in the open state and FIG. 11B shows the damper 900 in the closed state. The core air intake 424 is defined by an outer radial wall 1100 and an inner radial wall 1102 concentric with the outer radial wall 1100 that form a passageway to direct airflow to the first compressor 428 (FIG. 9). In the illustrated example, the damper 900 includes a plurality of rotatable vanes 1104 (only one of which is referenced in FIGS. 11A and 11B) disposed in the core air intake 424. In particular, the vanes 1104 are radially spaced around the core air intake 424 (e.g., radially substantially equidistant from each other) and extend between the outer radial wall 1100 and the inner radial wall 1102. In this example, the vanes 1104 are rotatable about axes 1106 (one of which is referenced in FIGS. 11A and 11B) that extend radially from a center axis 1108 of the core air intake 424. The vanes 1104 are rotatable between an open position (corresponding to the open state) and a closed position (corresponding to the closed state). In FIG. 11A, the vanes 1104 are in the open position. In the open position, the vanes 1104 are in an orientation that is substantially parallel to the airflow or otherwise reduces the amount of drag/resistance caused by the vanes 1104 through the core air intake 424. As such, air can flow between the vanes 1104 and through the core air intake 424 to the first compressor 428 (FIG. 9). In FIG. 11B, the vanes 1104 have been rotated (e.g., about 90°) to the closed position. In the closed position, the faces of the vanes 1104 are substantially perpendicular to the incoming airflow. In the exemplary embodiment, the vanes 1104 overlap or touch, such that the vanes 1104 substantially block airflow through the core air intake 424 (between the opening 901 (FIG. 9) and the first compressor 428). Any number of vanes 1104 may be used (e.g., 40 vanes).

In the illustrated example of FIGS. 11A and 11B, each of the vanes 1104 has a journal 1110 (one of which is referenced in FIGS. 11A and 11B) that extends through the outer radial wall 1100. The damper 900 further includes a plurality of arms 1112 coupled between respective ones of the vanes 1104 (e.g., at the journals 1110) and an actuation ring 1114. The actuation ring 1114 is disposed around the outside of the outer radial wall 1100. The arms 1112 are pivotably coupled to the actuation ring 1114. When the actuation ring 1114 rotates (e.g., spins around the outer radial wall 1100), the arms 1112 rotate the respective vanes 1104 and, thus, all of the vanes 1104 are rotated simultaneously. As shown in FIGS. 11A and 11B, the damper 900 includes an actuator 1116 coupled to the actuation ring 1114. The actuator 1116, when activated, rotates the actuation ring 1114 in one direction or the opposite direction to rotate the vanes 1104 between the open position (FIG. 11A) and the closed position (FIG. 11B). Thus, the vanes 1104 are movable between the open and closed positions simultaneously by the actuator 1116. In some examples, the actuator 1116 is a hydraulic actuator. The hydraulic actuator may use the aircraft fuel as working fluid, for example. In other examples, the actuator 1116 can be implemented as another type of actuator, such as an electric actuator. The actuator 1116 is controlled by the controller 902 (FIG. 9).

While in the illustrated example one actuator is used to simultaneously move all of the vanes 1104, in other examples, multiple actuators may be used to move the vanes 1104 individually or in subsets. Also, in other examples, the vanes can be hingeably coupled at their tops or bottoms to the outer radial wall 1100 or the inner radial wall 1102. In such examples, the vanes are pivoted by an actuator into the passageway between the outer radial wall 1100 and the inner radial wall 1102 to block the core air intake 424.

Referring back to FIG. 9, in an example operation, the controller 902 receives an input signal 904 requesting to close the damper 900. The input signal 904 can be from a pilot in the cockpit 225, for example. For instance, after the hybrid propulsion engine 400 changes from the first mode of operation to the second mode of operation, the pilot may input a command or request to close the damper 900 (which increases the efficiency of the electric motor 406). In other examples, once the hybrid propulsion engine 400 has successfully changed from the first mode of operation to the second mode of operation, the controller 902 may automatically attempt to close the damper 900.

Before closing the damper 900, the controller 902 checks one or more state-change parameters to verify whether the state change can occur. The controller 902 may compare the state-change parameter(s) to one or more threshold(s). For example, one state-change parameter can be based on the revolutions-per-minute (RPM) of the gas turbine engine 402 (e.g., the RPM of first drive shaft 418). If the RPMs are above a threshold RPM, the controller 902 prohibits closing the damper 900. In some instances, this prevents surging that may otherwise occur if the damper 900 is closed too early. Another state-change parameter can include a temperature of the gas turbine engine 402. For example, the controller 902 can prohibit closing the damper 900 if the engine temperature is above a threshold temperature. Another state-change parameter can be a time limit. In other words, the controller 902 ensures the gas turbine engine 402 is shut down for a period of time before closing the damper 900.

This allows sufficient time for the internal components of the gas turbine engine 402 (e.g., the compressor(s), the turbine (s), etc.) to slow down and cool before closing the damper 900. In still other examples, the state-change parameter(s) may include one or more other parameters (e.g., whether fuel supply is off, whether sufficient power is being supplied by the electric motor 406, etc.).

If the state-change parameter(s) is/are not satisfied (e.g., the parameter(s) do not meet the threshold(s)), the controller 902 generates an alert signal 906, which can be sent to the cockpit 225 to be displayed to a pilot or other aircraft personnel. In such an example, the state-change does not occur and the damper 900 remains in the open state (and, thus, the core air intake 424 remains open). If the state-change parameter(s) is/are satisfied (e.g., the parameter(s) do meet the threshold(s)), the controller 902 sends a command signal 908 (e.g., a close command) to the actuator 1116 to close the vanes 1104.

Conversely, before switching from the second mode of operation to the first mode of operation, the damper 900 is required to be opened. The controller 902 verifies that one or more state-change parameters are satisfied before sending a command to the actuator 1116 to open the damper 900. In some examples, prior to starting the gas turbine engine 402, the damper 900 is opened to enable the core (e.g., the compressor(s), the turbine(s), etc.) to start windmilling. Then, fuel is provided to the gas turbines engine 402 and ignition occurs. Therefore, in some examples, the windmilling can be used in an engine-start operation to start the rotation of the core. This windmilling technique can be used in addition to or as an alternative to the starter.

In some examples, the damper 900 can be moved to a partially open state, which is between the closed state and the open state. For example, in some instances, the gas turbine engine 402 may not be completely turned off while in the second mode of operation. Instead, the gas turbine engine 402 can be operated (e.g., periodically) at a low speed, such as idle. In such an example, the damper 900 can be partially opened. For example, the vanes 1104 can be rotated to a partially opened position (e.g., about 45°) between the opened position (FIG. 11A) and the closed position (FIG. 11B). In the partially opened position, the damper 900 prevents some airflow from entering the core air intake 424, but also allows sufficient airflow to enter the core air intake 424 for combustion in the gas turbine engine 402. Operating the gas turbine engine 402, even at idle, can help decrease ice buildup on the hybrid propulsion engine 400 (including the damper 900) by circulating oil through the gas turbine engine 402. With the gas turbine engine 402 running, the oil in in the gas turbine engine 402 continues to circulate, which keeps the oil warm and, thus, helps keep the components of the gas turbines engine 402 and/or the damper 900 warm. The gas turbine engine 402 can be turned on and off as desired to prevent ice buildup. The gas turbines engine 402 can be turned on at a set time interval (e.g., every 20 minutes), for example, or can be turned on based on one or more triggers (e.g., based on a temperature of the oil, based on a determination that ice is accumulating, based on a need for additional power, etc.). Also, by allowing the gas turbine engine 402 to operate (even at a low speeds), the gas turbine engine 402 can continue to be used for powering one or more systems of the aircraft, such as for providing air to the cabin (e.g., via an environmental control system (ECS), for producing electrical power (e.g., for charging the battery 214 (FIG. 2)), for producing hydraulic pressure, etc. Further, with the gas turbines engine 402 operating, the gas turbine engine 402 is ready for quicker power-up should higher power be desired. In an example flight, the gas turbine engine 402 may be operated during the beginning part of cruise until the battery 214 (FIG. 2) is fully charged. Then, the gas turbine engine 402 may be shut down. Then, near the end of cruise, the gas turbine engine 402 is started to enable the gas turbine engine 402 to warm up and prepare for full power, should more power be desired.

In other examples, instead of starting the engine, the damper 900 remains in the closed state and a starter or auxiliary motor can be used to rotate the spool(s) (e.g., the first drive shaft 418) of the gas turbine engine 402, which helps circulate oil to keep the engine warm. Additionally or alternatively, a separate heater (e.g., an electric heater) can be provided to heat the oil and/or the damper. While the damper 900 is shown and described in connection with hybrid propulsion engine 400, it is understood that the damper 900 may be used with other types of aircraft engines.

Figure 10:
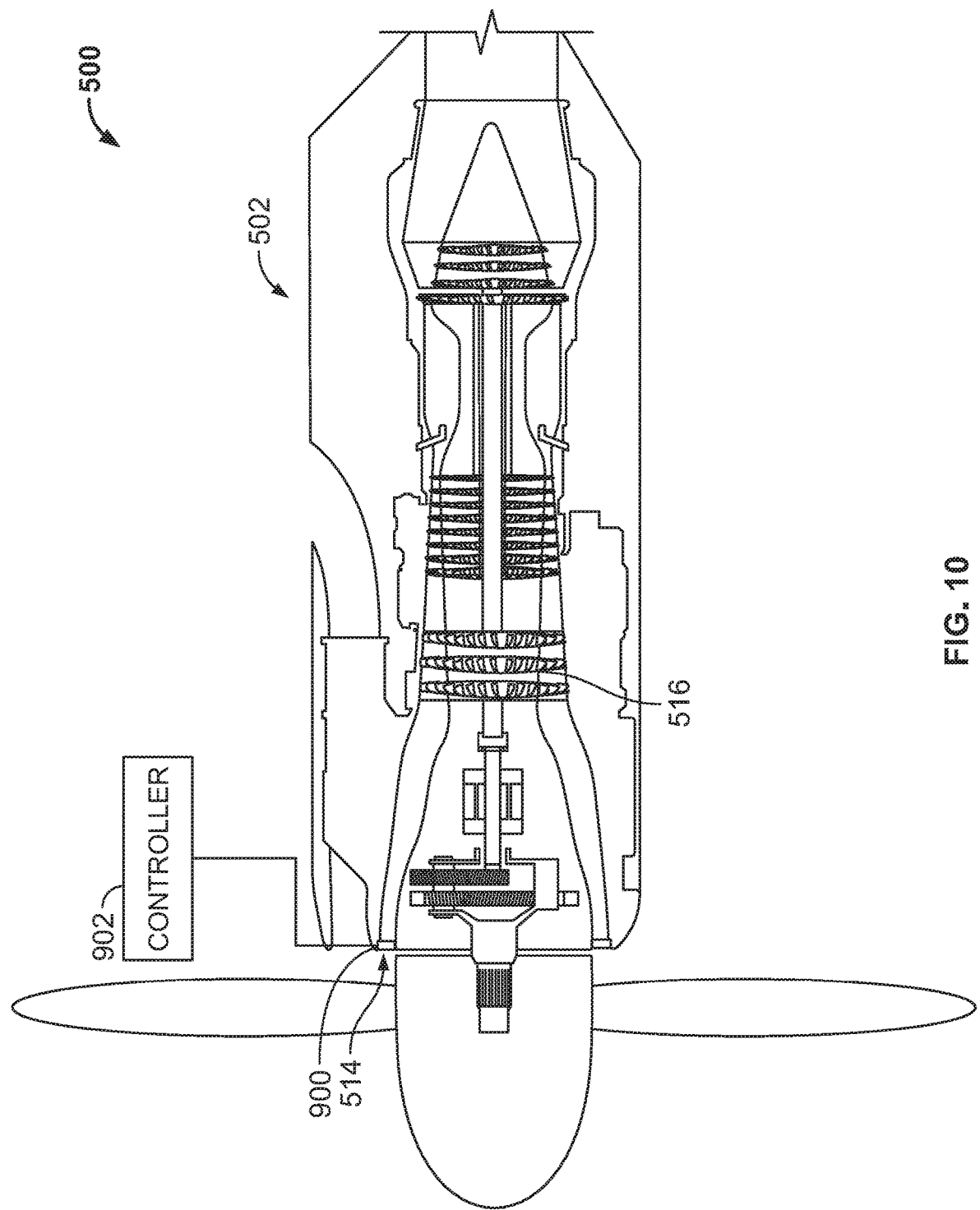
FIG. 10 illustrates the example core damper of FIG. 9 implemented in connection with the example hybrid propulsion engine of FIG. 5.

Now referring to FIG. 10, FIG. 10 shows an example of the core damper 900 being used with the hybrid propulsion engine 500 (the turboprop engine). The core damper 900 is disposed within the core air intake 514 of the gas turbine engine 502 and operates substantially the same as disclosed above to allow or block airflow through the core air intake 514 to the first compressor 516. Thus, to avoid redundancy, a description of the operations is not provided again in connection with FIG. 10. Instead, the interested reader is referred back to description above in connection with FIG. 9 for a full written description of the operations.

Figure 12A:
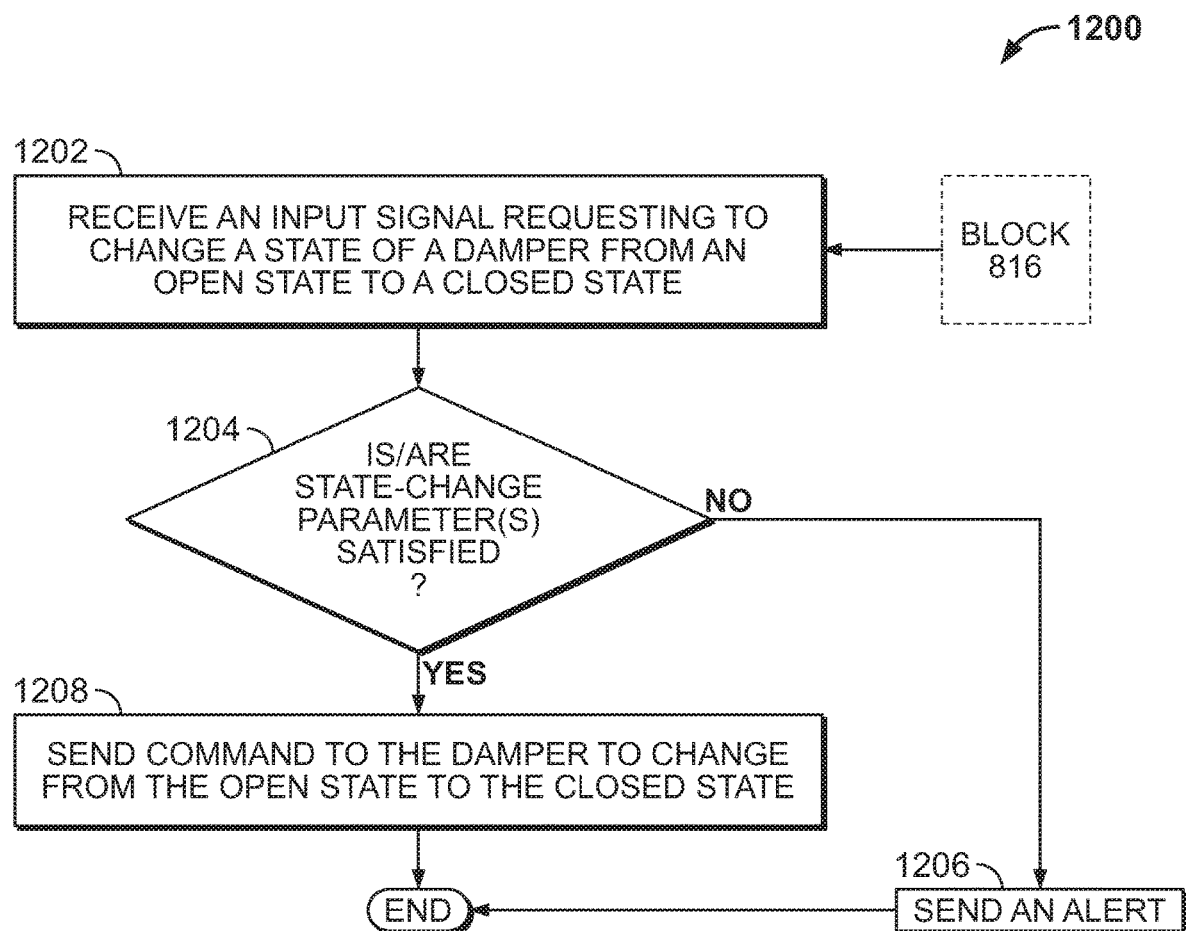
FIG. 12A is a flowchart representative of an example method of operating a core damper from an open state to a closed state and which can be implemented by the hybrid propulsion engines of FIGS. 9 and 10.

FIG. 12A is a flowchart of an example method 1200 of changing a state of a core damper from an open state to a closed state. The method 1200 is described in connection with the hybrid propulsion engine 400 of FIG. 9, which is a turbofan type of hybrid propulsion engine. However, it is understood that the method 1200 can be similarly implemented using other types of hybrid propulsion engines having core dampers, such as the hybrid propulsion engine 500 of FIG. 10. The method 1200 can be performed at least in part by the controller 208 (FIG. 2) and/or the controller 902 (FIG. 9).

At block 1202, the controller 902 receives the input signal 904 (e.g., a first input signal) requesting to change the state of the damper 900 from the open state (FIG. 11A) to the closed state (FIG. 11B). The input signal 904 can be generated by a pilot in the cockpit 225 (e.g., by operating a button or switch). In other examples, the input signal 904 is generated by an auto-pilot program. In some examples, after block 816 from FIG. 8A, the controller 902 receives the request to close the damper 900 from the pilot or an auto-pilot program. In other words, after the mode change occurs from the first mode of operation to the second mode of operation, a request can be generated to close the damper 900.

At block 1204, the controller 902 determines whether one or more state-change parameter(s) is/are satisfied. The state-change parameter(s) can include one or more of the temperature of the gas turbine engine 402, the RPM of the gas turbine engine 402, the temperature of the core, a specified time limit, etc. The state-change parameter(s) can be based on information received from the status signals 226, 228 (FIG. 2), for example.

If the state-change parameter(s) is/are not satisfied (determined at block 1204), the controller 208 generates the alert signal 906 at block 1206, and the example method 1200 ends. The alert signal 906 can be sent back to the cockpit 225, for example, and displayed to the pilot or another aircraft personnel. In this event, the damper 900 does not change states. Instead, the damper 900 remains open. For example, if the controller 902 determines the RPM of the gas turbine engine 402 is above an RPM threshold, the controller 902 generates an alert and the damper 900 remains open. The controller 902 may recheck the state-change parameter(s) after a period of time (e.g., one minute).

If the state-change parameter(s) is/are satisfied, the controller 902, at block 1208, sends the command signal 908 (e.g., a first command signal) to the damper 900 to change from the open state to the closed state. For example, the controller 902 activates the actuator 1116 to rotate the vanes 1104 from the open position to the closed position. Once the damper 900 is closed, airflow from the fan duct 412 is blocked from flowing through the core air intake 424 and into the core, which prevents windmilling and reduces or eliminates wasted airflow. In other words, more airflow remains in the fan duct 412 for producing forward thrust and is not wasted by windmilling the components of the gas turbine engine 402. The change from the open state other closed state occurs while the hybrid propulsion engine 400 is operating in in the second mode of operation, where the gas turbine engine 402 is off and/or otherwise not driving the fan 404 to produce thrust. After block 1208, the example method 1200 ends.

Figure 12B:
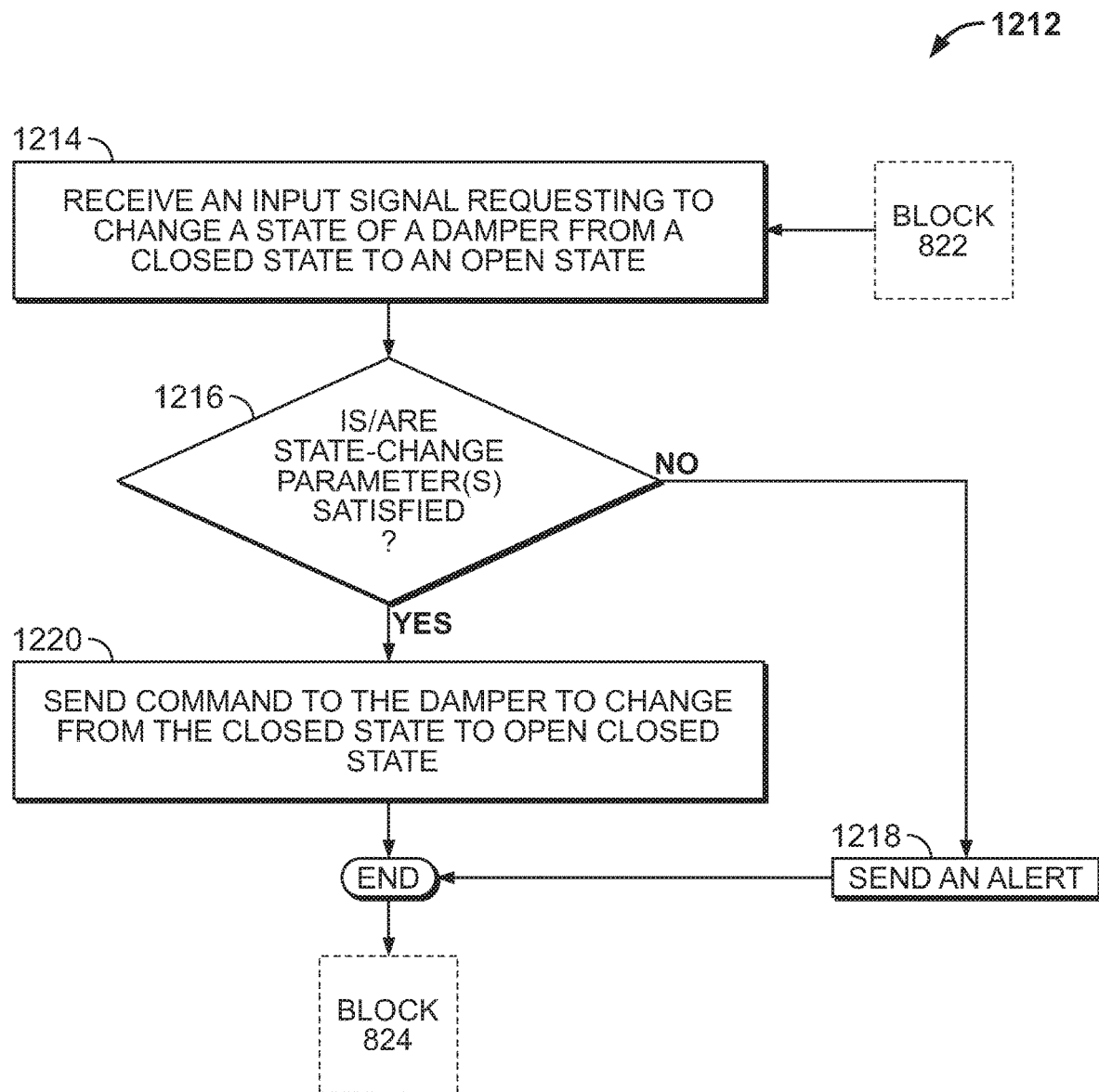
FIG. 12B is a flowchart representative of an example method of operating a core damper from a closed state to an open state and which can be implemented by the hybrid propulsion engines of FIGS. 9 and 10.

FIG. 12B is a flowchart of an example method 1212 of operating a core damper from an open state to a closed state. The method 1200 is described in connection with the hybrid propulsion engine 400 of FIG. 9, which is a turbofan type of hybrid propulsion engine. However, it is understood that the method 1200 can be similarly implemented using other types of hybrid propulsion engines having core dampers, such as the hybrid propulsion engine 500 of FIG. 10. The method 1212 can be performed at least in part by the controller 208 (FIG. 2) and/or the controller 902 (FIG. 9).

At block 1214, the controller 902 receives the input signal 904 (e.g., a second input signal) requesting to change the state of the damper 900 from the closed state (FIG. 11B) to the closed state (FIG. 11A). The input signal 904 can be generated by a pilot in the cockpit 225 (e.g., by operating a button or switch) and/or by an auto-pilot program. In some examples, after block 822 from FIG. 8B, the controller 902 receives the request to close the damper 900. In other words, after the controller 208 receives the request to switch from the second mode of operation back to the first mode of operation, the controller 902 receives a request to open the damper 900 (prior to starting the gas turbine engine 402).

At block 1216, the controller 902 determines whether one or more state-change parameter(s) is/are satisfied. The state-change parameter(s) can be based on information received from the status signals 226, 228 (FIG. 2), for example.

If the state-change parameter(s) is/are not satisfied (determined at block 1216), the controller 208 generates the alert signal 906 at block 1218, and the example method 1212 ends. The alert signal 906 can be sent back to the cockpit 225, for example, and displayed to the pilot or another aircraft personnel. In this event, the damper 900 does not change states. Instead, the damper 900 remains closed.

If the state-change parameter(s) is/are satisfied, the controller 902, at block 1220, sends the command signal 908 to the damper 900 to change from the closed state to the open state. For example, the controller 902 activates the actuator 1116 to rotate the vanes 1104 from the closed position to the open position. Once the damper 900 is open, air from the fan duct 412 flows through the core air intake 424 and into the core. The change from the closed state to the open state occurs while the hybrid propulsion engine 400 is operating in the second mode of operation, in which the gas turbine engine 402 is off and/or otherwise not driving the fan 404 to produce thrust.

After block 1208, the example method 1200 ends or continues to block 824 of FIG. 8B, where the controller 208 continues to verify whether the mode-change parameter(s) are satisfied before starting the gas turbines engine. In some examples, one of the mode-change parameter(s) is the state of the damper 900. For example, if the damper 900 is not opened, the controller 208 may prevent the gas turbine engine from starting. Otherwise, if the damper 900 is opened, the controller 208 may send a command signal (e.g., a third command signal) to start the gas turbine engine 402.

In some examples, as disclosed above, the damper 900 can be moved to a partially open state, and the gas turbine engine 402 can be operated at a low power or speed while the electric motor 406 is still driving the fan 404. By operating the gas turbine engine 402, even at a low speed, the gas turbine engine 402 can be used for producing heat (e.g., reducing ice buildup), producing air for the cabin, for producing electrical power, for preparing the gas turbine engine 402 to be powered-up, etc. For example, while operating in the second mode of operation during cruise, the controller 902 can send a command signal to the damper 900 to move to a partially open state. Then, the controller 902 can send a command signal to start the gas turbine engine 402, which can then be used to help produce heat and/or provide power to one or more aircraft systems. Alternatively, the damper 900 can remain closed, and the controller 902 may control a starter of the gas turbines engine 402 to periodically drive the spools (e.g., the first and/or third drive shafts 418, 434) of the gas turbine engine 402 to keep the oil moving and remain warm. In still other examples, the controller 902 may operate an electric heater to keep the oil and/or the damper warm. For example, an electric heater may be disposed on or adjacent the damper 900.

Figure 13:
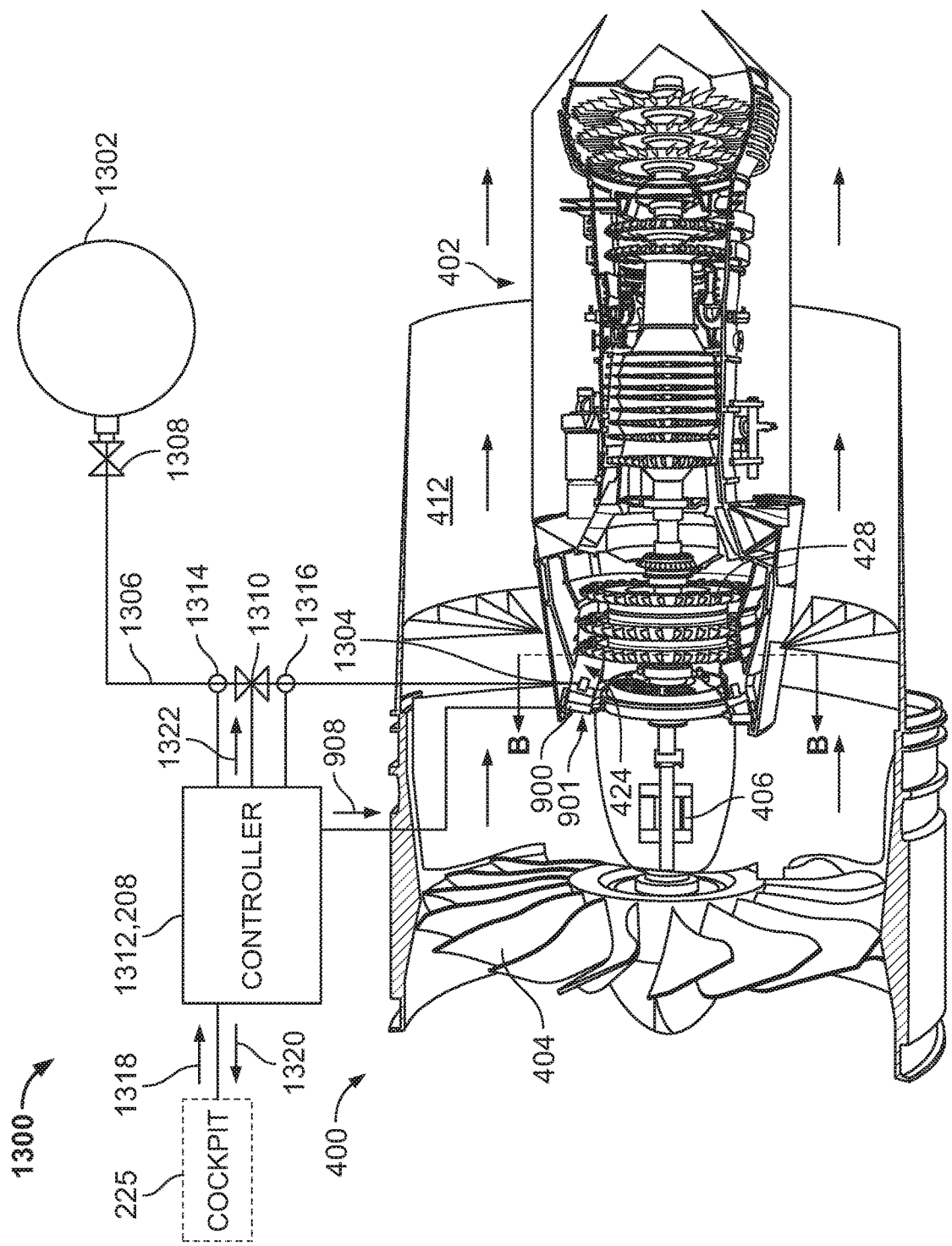
FIG. 13 illustrates an example supercharging system constructed in accordance with the teachings of this disclosure.

FIG. 13 illustrates an example supercharging system 1300 constructed in accordance with the teachings of this disclosure and which may be used to increase output power of an aircraft engine. The example supercharging system 1300 is shown and described in connection with the hybrid propulsion engine 400 from FIG. 9. The supercharging system 1300 enables improved performance of the gas turbine engine 402 (e.g., increased output power), which is beneficial for take-off and/or climbing to higher altitudes, for instance.

Figure 16:
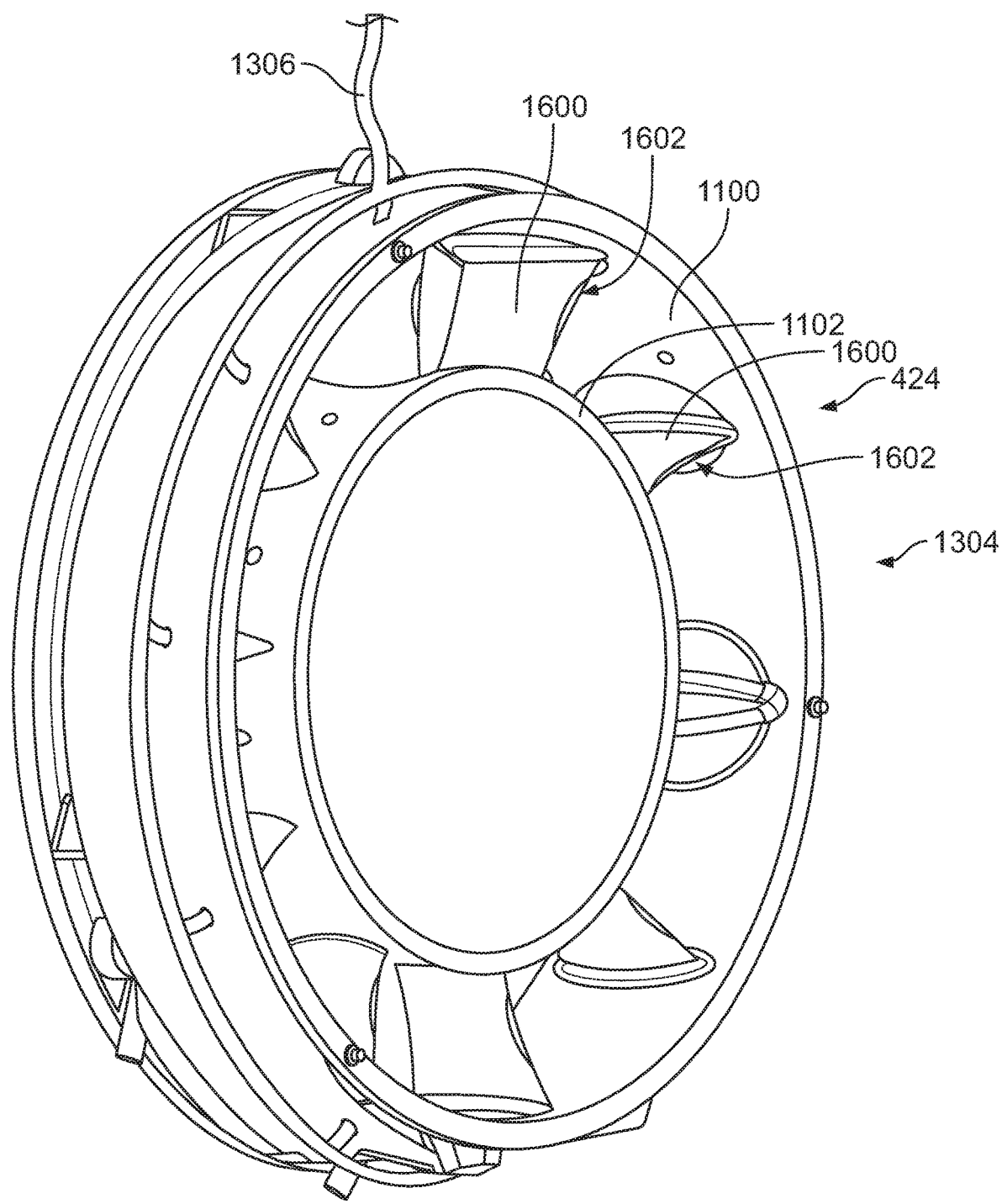
FIG. 16 is a perspective view of an example ejector of the example supercharging system of FIG. 13.

In the illustrated example, the supercharging system 1300 includes a compressed air tank 1302 that contains pressurized air and an ejector 1304 for injecting the pressurized air from the compressed air tank 1302 into the gas turbine engine 402. The compressed air tank 1302 is fluidly coupled to the ejector 1304 via a supply line 1306 (e.g., a hose, a tube, etc.). In FIG. 13, the ejector 1304 is disposed in the core air intake 424 upstream from the first compressor 428. Thus, when the pressurized air is supplied to the ejector 1304, the ejector 1304 directs the pressurized air directly into the gas turbine engine 402 (e.g., directly into the first compressor stage). The ejector 1304 can include one or more openings or nozzles spaced around the core air intake 424. An example of the ejector 1304 is shown in FIG. 16 and disclosed in further detail below.

As shown in FIG. 13, the compressed air tank 1302 includes a regulator 1308 (e.g., a mechanical regulator) for regulating the pressure of the air provided to the supply line 1306. For example, the pressurized air can be stored in the compressed air tank 1302 at 3,000 pounds-per-square-inch (PSI), and the regulator 1308 can reduce the pressurized air to 100 PSI. In other examples, the regulator 1308 can be set to another pressure.

In the illustrated example, the supercharging system 1300 includes a valve 1310 coupled to the supply line 1306 between the compressed air tank 1302 and the ejector 1304. The valve 1310 operates between an open state that allows the pressurized air to flow from the compressed air tank 1302 to the ejector 1304 and a closed state that blocks the flow of the pressurized air to the ejector 1304. The supercharging system 1300 includes a controller 1312 (e.g., a processor) configured to operate the valve 1310. In particular, the controller 1312 operates to open and close the valve 1310 when instructed. The controller 1312 can receive commands from a pilot and/or an autopilot program, as disclosed in further detail below. If the supercharging system 1300 is used in connection with the hybrid propulsion engine 400 (corresponding to the hybrid propulsion engine 200 of FIG. 2), the controller 1312 can implemented by the controller 208 (FIG. 2), which also controls the on/off operations and/or speeds of the gas turbine engine 402 and the electric motor 406. In other words, the same controller can be used control the mode change operations of the hybrid propulsion engine 400 as well as the operations of the supercharging system 1300. Further, the same controller can be used to operate the damper 900. However, in other examples the controllers may be separate and in communication with each other.

In some examples, the valve 1310 is implemented as a pressure reducing shutoff valve, which enables the valve 1310 to regulate the pressure (e.g., reduce the pressure) in addition to providing shutoff capabilities. For example, while the pressurized air exiting the regulator 1308 can be at 100 PSI, the valve 1310 can further reduce the pressure to 20 PSI, which is still significantly higher than the pressure of the air flowing through the fan duct 412. As shown in FIG. 13, a first pressure sensor 1314 is disposed upstream of the valve 1310 and a second pressure sensor 1316 is disposed downstream of the valve 1310. In other examples, only one pressure sensor is used (e.g., only the second pressure sensor 1316). The pressure measurement(s) from the first and/or second pressure sensors 1314, 1316 are communicated to the controller 1312. The controller 1312 controls the valve 1310 to reduce the pressure to a target pressure value based on the pressure measurement(s). The target pressure value can be preset or can be set by a pilot and/or an autopilot program. In some examples, the target pressure value is based on a desired output power level. For example, depending on the desired output power level of the gas turbine engine 402, the controller 1312 can control the valve 1310 to provide different pressures of air to the gas turbine engine 402. Additionally or alternatively, the target pressure value can be based on other conditions, such as the current altitude of the aircraft 100, the desired altitude of the aircraft 100, the weather conditions, the weight of the aircraft, etc. In other examples, the valve 1310 does not have pressure reducing capabilities. In FIG. 13, the pressurized air supply is stored in one compressed air tank 1302. However, in other examples, the pressurized air supply can be stored in multiple compressed air tanks that are operatively coupled to the ejector 1304.

In the illustrated example of FIG. 13, the compressed air tank 1302 is spherical, which is an ideal shape for a vessel for resisting internal pressure. The compressed air tank 1302 can be constructed of a relatively strong material, such as a composite material (e.g., fiberglass, carbon fiber, etc.). In some examples, the compressed air tank 1302 forms part of a bulkhead in the fuselage 102 (FIG. 1) of the aircraft 100. For example, referring briefly to FIG. 15, at least a portion (e.g., the rear half) of the compressed air tank 1302 forms the aft pressure bulkhead in the rear of the fuselage 102 of the aircraft 100. Therefore, the compressed air tank 1302 can serve multiple purposes. In other examples, the compressed air tank 1302 can have a different shape (e.g., a cylinder).

The supercharging system 1300 is used to increase the output power of the gas turbine engine 402 for a certain time duration. In general, when an aircraft is flying at higher altitudes, the power produced by a gas turbine engine, such as the gas turbine engine 402, is significantly less than produced when the aircraft is on the ground or closer to sea level due to the lower atmospheric air pressure. For example, a typical gas turbine engine can be capable of producing about 21,000 pounds of force (lbf) of thrust at sea level (e.g., on the ground) where the air pressure is about 14 PSI. However, when the aircraft is at 20,000 ft, the air pressure is about 7 PSI, the same gas turbine engine only produces about 6,000 lbf of thrust. At higher altitudes, the air is less dense. As such, the gas turbine engine produces significantly less power at higher altitudes. Thus, after reaching a maximum altitude for the type of engine being used, the aircraft typically levels off and remains at or around the altitude during cruise for the remainder of the flight. While it is beneficial to fly at a higher altitude during cruise where the drag on the aircraft is even lower, the gas turbine engine may not be able to provide adequate power to reach such high altitudes and/or operate for extended periods of time once such a high altitude is reached.

Thus, the supercharging system 1300 can be used to supplement and/or increase the power generated by the gas turbine engine 402 to enable the aircraft 100 to climb to higher altitudes by providing higher pressure air to the gas turbine engine 402 than can otherwise be provided by the atmospheric air at altitude. This higher pressure air enables the gas turbine engine 402 to create higher output power (and, thus, thrust), similar to operating the gas turbine engine 402 on the ground (sea level) where the air pressure is higher as compared to operating the gas turbine engine 402 at 20,000 ft, where the air pressure is lower. For example, at 20,000 ft, the supercharging system 1300 can be used to increase the thrust of the gas turbine engine 402 to 10,000-15,000 lbf or higher, which is significantly more than the 6,000 lbf of thrust typically generated by the gas turbine engine 402 at this altitude.

In some embodiments, if the supercharging system 1300 is installed in an aircraft having a hybrid propulsion system, such as the hybrid propulsion engine 400 shown in FIG. 9, the electric motor 406 can be activated to drive the fan 404 during cruise after the supercharging system 1300 is activated and the aircraft has achieved a higher cruising altitude. For instance, in example operation, assume the aircraft 100 reaches a typical cruising altitude of 20,000 ft, which is at or near the maximum altitude for the type and size of the gas turbine engine 402. The controller 1312 receives an input signal 1318 requesting to activate the supercharging system 1300 for producing more power from the gas turbine engine 402. The input signal 1318 can be from a pilot in the cockpit 225. For example, the pilot may press a button or activate a switch to request increased power. In some examples, the controller 1312 then checks one or more parameter(s) to verify whether the supercharging system 1300 can be used. The one or more parameter(s) may include the operating conditions (e.g., temperature) of the gas turbine engine 402, the current altitude of the aircraft 100, the desired altitude of the aircraft 100, the weather conditions, the speed of the aircraft 100, the atmospheric temperature and/or pressure, etc. If the one or more parameter(s) are not satisfied, the controller 1312 generates an alert signal 1320, which can be sent to the cockpit 225 to be displayed to a pilot or other aircraft personnel. In such an example, the supercharging system 1300 is not used.

If the one or more parameter(s) is/are satisfied (e.g., the parameter(s) do meet the threshold(s)), the controller 1312 can activate the supercharging system 1300 for a period of time. For example, based on the input signal 1318 and a determination that the parameter(s) is/are satisfied, the controller 1312 sends a command signal 1322 (e.g., an open command) to open the valve 1310. In some examples, the command signal 1322 also includes a target pressure value to which the valve 1310 is to regulate the air to. The target pressure value may be based on the desired output power level for the gas turbine engine 402 (e.g., higher output power level means high pressure air is needed, whereas lower output power level means lower pressure air is needed). When the valve 1310 is opened, the high pressure air from the compressed air tank 1302 is injected, via the ejector 1304, into the first compressor 428 of the gas turbine engine 402. The air injected into the core has a higher pressure than the air flowing through the fan duct 412. As a result, the output power of the gas turbine engine 402 increases and, thus, increases the thrust created by the gas turbine engine 402. The increased thrust produced by the gas turbine engine 402 can be used to climb to a higher altitude, such as 35,000 ft, which otherwise may not be achievable with the gas turbine engine 402 (or may take significant time to reach).

Also, the pressurized air being supplied from the compressed air tank 1302 is significantly cooler than the outside air, which further helps to increase the output power of the gas turbine engine 402. In some examples, using the pressurized air for its temperature alone can help increase flow through the gas turbine engine 402 and increase thrust. For example, the bypass ratio (the ratio of the airflow bypassing the gas turbine engine 402 versus the airflow through the gas turbine engine 402) can be decreased, which increases the flow through the gas turbine engine 402. Then, the pressurized air from the compressed air tank 1302 can be injected into the gas turbine engine 402. Even at a slightly higher pressure than ambient, this cold air reduces the overall temperature of the airflow into the gas turbine engine 402, which increases the output power level. In some such examples, the damper 900 can be opened or in a partially opened state.

Once the higher altitude is reached and/or use of the supercharging system 1300 is no longer desired, the controller 1312 receives another input signal requesting to close the valve 1310 and deactivate the supercharging system 1300. The input signal can be from a pilot in the cockpit 225 and/or an auto-pilot program, for example. The controller 1312 can check one or more parameter(s) (e.g., temperature, altitude, state of the damper 900, etc.) before deactivating the supercharging system 1300. If the parameter(s) are satisfied, the controller 1312 sends the command signal 1322 (e.g., a close command) to close the valve 1310 in response to the input signal 1318, and the supercharging system 1300 is deactivated. The gas turbine engine 402 may continue to operate using atmospheric air from the fan duct 412.

In some examples, after the higher altitude is reached and the supercharging system 1300 is deactivated, the hybrid propulsion engine 400 may be instructed to transition from the first mode of operation to the second mode of operation where the gas turbine engine 402 is powered down and the electric motor 406 is turned on and used to drive the fan 404 for producing thrust. As mentioned above, the drag on the aircraft 100 at higher altitudes is less, and the electric motor 406 can be used to produce thrust more efficiently while using less energy. Therefore, the supercharging system 1300 enables the use of a smaller gas turbine engine to propel the aircraft to higher altitudes that may otherwise not be possible with the gas turbine engine. In particular, while a small gas turbine engine may not be able to operate at such a high altitude, the supercharging system 1300 can be used to boost an engine to enable an aircraft to the climb from one altitude (e.g., 20,000 ft) to a higher altitude (e.g., 35,000 ft), where the electric motor 406 can then be used for more efficient flight at cruise. However, while the supercharging system 1300 of FIG. 13 is shown in connection with the hybrid propulsion engine 400, the supercharging system 1300 can be similarly used with other types of engines that do not include electric motors.

In some examples, the core damper 900 is included in the gas turbine engine 402. While the core damper 900 is not necessary for using the supercharging system 1300, in some instances, the core damper 900 helps prevent the highly pressurized air from flowing backward into the fan duct 412. In the illustrated example, the damper 900 is disposed upstream from the ejector 1304 in the core air intake 424 (i.e., the damper 900 is closer to the opening 901 than the ejector 1304). After the controller 1312 sends the command signal 1322 to open the valve 1310 and supply the pressurized air to the gas turbine engine 402, the controller 1312 (which may include the controller 902 for the damper 900), sends the command signal 908 (e.g., a second command signal) to close the damper 900, which prevents the high pressure air from flowing back out of the core air intake 424 and into the fan duct 412. In some examples, this transition occurs slowly to ensure the gas turbine engine 402 is not deprived of air. Therefore, in some instances, the pressurized air from the compressed air tank 1302 is the only source of air supply to the gas turbine engine 402. In other examples, the pressurized air can be supplemented with other air, such as fan air (e.g., by moving the damper 900 to the partially open state, mixing the fan air with the pressurized air using a jet pump, etc.). Before the valve 1310 is closed, the damper 900 is opened to enable airflow back into the gas turbine engine 402 from the fan duct 412. The controller 1312 can check to determine whether the damper 900 has opened prior to deactivating the supercharging system 1300.

The supercharging system 1300 can also be used to provide boost during take-off or another segment of flight, for example. For example, during take-off, a pilot may request activation of the supercharging stem 1300, which can be used to inject pressurized air that is at a higher pressure than atmospheric pressure, thereby increasing the thrust output by the gas turbine engine 402 during take-off.

In some examples, the compressed air tank 1302 contains a sufficient quantity of air to enable the aircraft to perform at least one climb (e.g., from 20,000 ft to 51,000 ft). In other examples, the compressed air tank 1302 contains enough air to be used multiple times during flight (e.g., during multiple climbs, during take-off, etc.). In some instances, the compressed air tank 1302 is refilled when the aircraft is on the ground and refueling. Additionally or alternatively, in some instances, such as with longer ranger aircraft, a device (e.g., a scuba type compressor) can be used to refill the compressed air tank 1302 while in flight.

FIG. 16 is a perspective view of the core air intake 424 taken along line B-B of FIG. 13 and showing the ejector

1304. As disclosed above, the core air intake 424 is formed by the outer radial wall 1100 and the inner radial wall 1102. In this example, the ejector 1304 includes a plurality of struts 1600 (two of which is referenced in FIG. 16) coupled between the outer radial wall 1100 and the inner radial wall 1102. Each strut 1600 includes an opening 1602 (two of which are referenced in FIG. 16) in the aft or downstream end of the respective strut 1600. As such, the openings 1602 face downstream toward the first compressor 428 (FIG. 13). The supply line 1306 provides the high pressure air into the struts 1600, which is then ejected outward through the openings 1602 in the rearward direction (toward the first compressor 428). The struts 1600 are radially equidistant from each other to provide the high pressure air around the core air intake 424. The struts 1600 may be implemented as support struts and, thus, serve a dual purpose. While in the illustrated example ten struts 1600 are depicted, in other examples, more or fewer struts can be used. In some examples, only one strut is used. In other examples, the ejector 1304 can be formed by one or more nozzle(s) disposed in the core air intake 424 (e.g., openings in the outer radial wall 1100).

Figure 14:
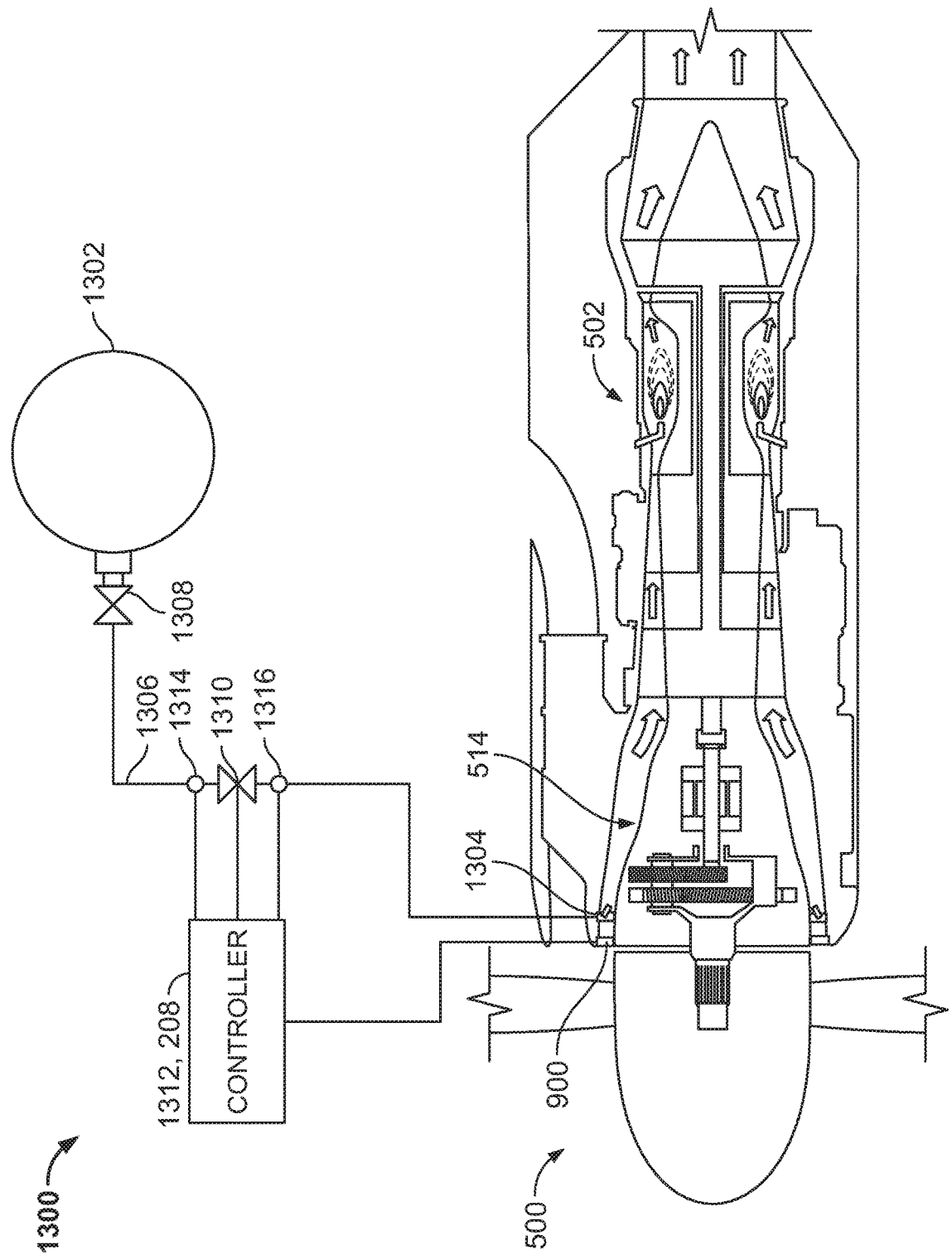
FIG. 14 illustrates the example supercharging system of FIG. 13 implemented in connection with the hybrid propulsion engine of FIG. 10.

Now referring back to FIG. 14, FIG. 14 shows the supercharging system 1300 implemented in connection with the hybrid propulsion engine 500 (the turboprop engine) from FIG. 10. The supercharging system 1300 includes the compressed air tank 1302, the ejector 1304 (which is disposed in the core air intake 514 downstream of the damper 900), the supply line 1306, the regulator 1308, the valve 1310, the controller 1312 (which may be implemented by the controller 208), and the first and second pressure sensors 1314, 1316. The supercharging system 1300 may operate substantially the same as disclosed above in connection with FIG. 13 to increase the output power of the gas turbine engine 502. Thus, to avoid redundancy, a description of the operations is not provided again in connection with FIG. 14. Instead, the interested reader is referred back to description above in connection with FIG. 13 for a full written description of the operations.

Figure 17A:
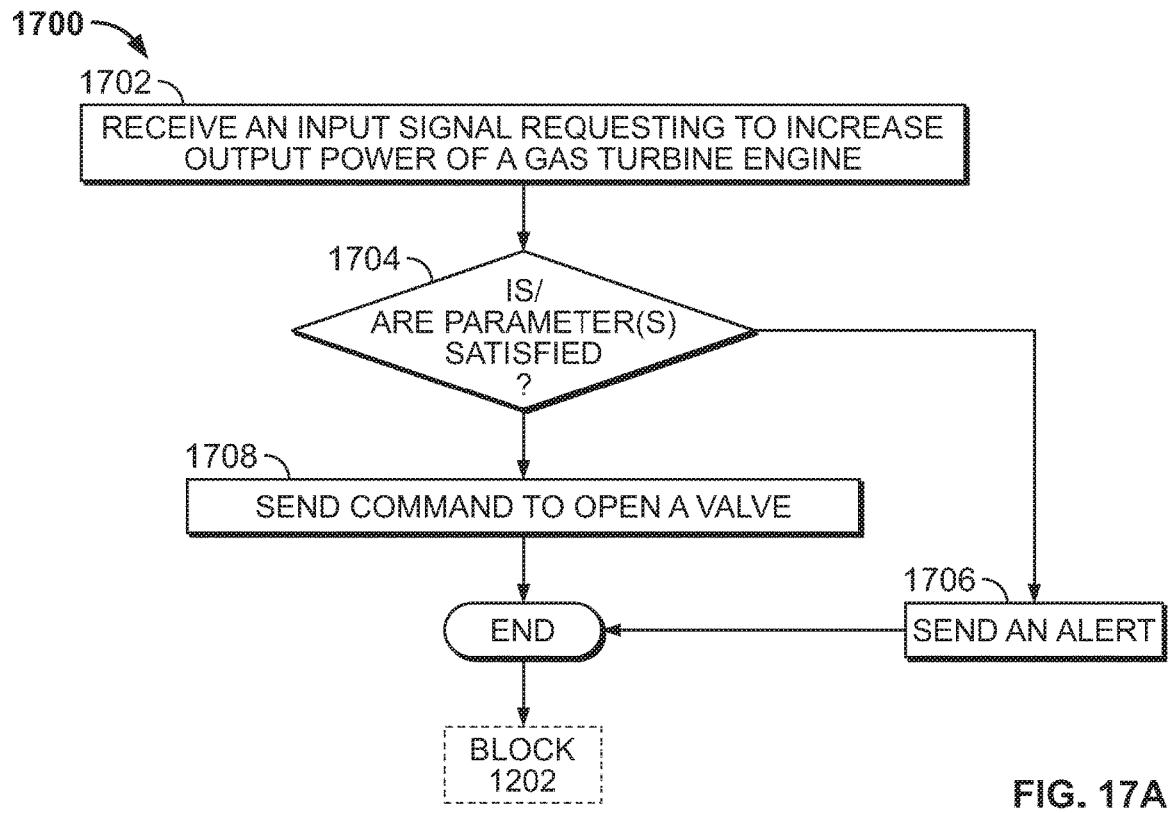
FIG. 17A is a flowchart representative of an example method of activating a supercharging system to increase output power of an aircraft engine that can be implemented by the supercharging system of FIGS. 13 and 14.

FIG. 17A is a flowchart of an example method 1700 of using the example supercharging system 1300 to increase output power of a gas turbine engine. The method 1700 is described in connection with the hybrid propulsion engine 400 of FIG. 13, which is a turbofan type of hybrid propulsion engine. However, it is understood that the method 1700 can be similarly implemented using other types of hybrid propulsion engines, such as the hybrid propulsion engine 500 of FIG. 14. Further, the method 1700 can be performed in connection with other types of non-hybrid engines. The method 1700 can be performed at least in part by the controller 208 (FIG. 2), the controller 902 (FIG. 13), and/or the controller 1312 (FIG. 13).

At block 1702, the controller 1312 receives the input signal 1318 requesting to use the supercharging system 1300 to increase output power of the gas turbine engine 402. The input signal 1318 may be received when more power is desired during take-off or during a climb from a first altitude to a second higher altitude, for example. The input signal 1318 can be generated by a pilot in the cockpit 225 (e.g., by operating a button or switch). In other examples, the input signal 1318 is generated by an auto-pilot program (e.g., when planning to climb to a higher altitude).

At block 1704, the controller 1312 determines whether one or more parameter(s) is/are satisfied before activating the supercharging system 1300. The one or more parameter(s) may include the operating conditions (e.g., temperature) of the gas turbine engine 402, the current altitude of the aircraft 100, the desired altitude of the aircraft 100, the weather conditions, the speed of the aircraft 100, the atmospheric temperature and/or pressure, etc. If the parameter(s) is/are not satisfied (determined at block 1704), the controller 1312 generates the alert signal 1320 at block 1706, and the example method 1700 ends. The alert signal 1320 can be sent back to the cockpit 225, for example, and displayed to the pilot or another aircraft personnel. In this event, the supercharging system 1300 is not used and the pressurized air from the compressed air tank 1302 is not injected into the gas turbine engine 402.

If the parameter(s) is/are satisfied, the controller 1312, at block 1708, sends the command signal 1322 (e.g., a first command signal) to open the valve 1310. Once the valve 1310 is opened, the high pressure air from the compressed air tank 1302 flows to the ejector 1304. The ejector 1304 is disposed in the core air intake 424, which injects the pressurized air into the first compressor 428 of the gas turbine engine 402. This increased pressure immediately boosts the output power of the gas turbine engine 402. In some examples, the controller 1312 controls the valve 1310 to regulate the high pressure air to a target pressure level (e.g., 60 PSI). The controller 1312 receives pressure measurements from the first and second pressure sensors 1314, 1316 and, based on the pressure measurements, controls the valve 1310 to regulate the pressure to the desired pressure. The target pressure level may be set by the pilot. In general, the higher the pressure of the air, the more output power can be produced. Therefore, depending on the amount of desired output power level for the gas turbine engine 402, the pressure can be increased or decreased. The target pressure level can also be based on one or more other conditions, such as the current altitude of the aircraft 100, the desired altitude of the aircraft, the speed of the aircraft 100, the weight of the aircraft 100, the ambient temperature, weather conditions, the type and size of the gas turbine engine 402, etc. The supercharging system 1300 can provide the pressurized air to the gas turbine engine 402 for any period of time (e.g., a short burst such as 3 seconds, a long burn such as 2 minutes, etc.) until the supercharging system 1300 is deactivated and/or the compressed air tank 1302 is depleted.

After block 1708, the example supercharging system 1300 is activated and the example method 1700 ends. In some examples, the method 1700 continues to block 1202 of FIG. 12A, where the controller 902 receives a request to close the damper 900. The request may be generated automatically after the valve 1310 is opened, or may be generated manually via pilot request. In some instances, such as when flying at higher altitudes, closing the damper 900 helps prevent the high pressure air from flowing backward through the core air intake 424 and into the fan duct 412. Therefore, if the one or more state-change parameter(s) are satisfied, the controller 902 sends the command signal 908 to close the damper 900.

Figure 17B:
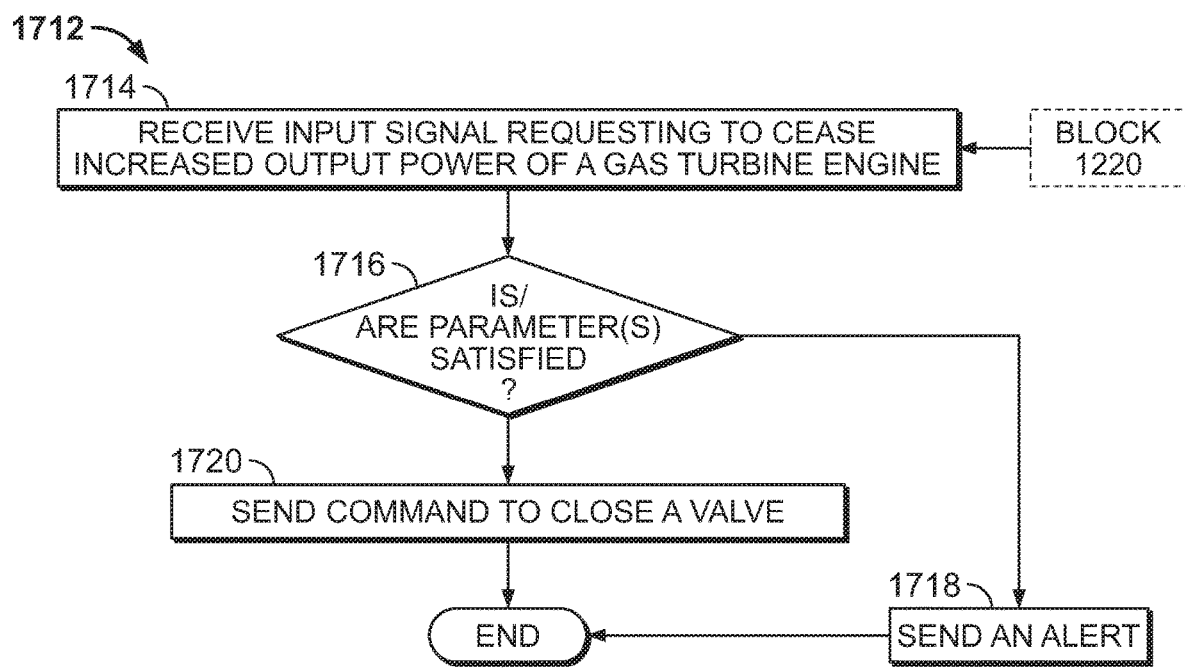
FIG. 17B is a flowchart representative of an example method of deactivating a supercharging system that can be implemented by the supercharging system of FIGS. 13 and 14.

FIG. 17B is a flowchart of an example method 1712 of deactivating the example supercharging system 1300 to cease increased output power of a gas turbine engine. The method 1712 is described in connection with the hybrid propulsion engine 400 of FIG. 13, which is a turbofan type of hybrid propulsion engine. However, it is understood that the method 1712 can be similarly implemented using other types of hybrid propulsion engines, such as the hybrid propulsion engine 500 of FIG. 14. Further, the method 1712 can be performed in connection with other types of non-hybrid engines. The method 1712 can be performed at least in part by the controller 208 (FIG. 2), the controller 902 (FIG. 13), and/or the controller 1312 (FIG. 13).

Assuming the valve 1310 is opened, at block 1714, the controller 1312 receives the input signal 1318 requesting to deactivate the supercharging system 1300 and cease injecting pressurized air into the gas turbine engine 402. The input signal 1318 can be generated by a pilot in the cockpit 225, for example. For instance, after take-off or climb when the increased output power is no longer desired, the pilot can request to deactivate the supercharging system 1300. In other examples, the input signal 1318 can be generated by an auto-pilot program after a desired altitude is reached.

In some examples, the request is generated after block 1220 from FIG. 12B. For example, assuming the damper 900 was previously closed, the damper 900 may be opened first before deactivating the supercharging system 1300 to ensure no lapse in air supply occurs. Therefore, prior to ceasing the injection of the pressurized air, the controller 902 reopens the damper 900 to allow the air from the fan duct 412 to flow into the core air intake 424.

At block 1716, the controller 1312 determines whether one or more parameter(s) is/are satisfied. If the parameter(s) is/are not satisfied (determined at block 1716), the controller 1312 generates the alert signal 1320 at block 1718, and the example method 1712 ends. The alert signal 1320 can be sent back to the cockpit 225, for example, and displayed to the pilot or another aircraft personnel. The controller 1312 may re-check the parameter(s) after a period of time (e.g., 30 seconds). An example parameter may be the state or condition of the damper 900. For example, the controller 1312 can determine whether the damper has been opened (or at least partially opened). If the damper 900 is not opened (or at least partially opened), the controller 1312 can prohibit deactivation of the supercharging system 1300 so that air continues to be supplied to the gas turbine engine 402. Other example parameter(s) include the operating conditions (e.g., temperature) of the gas turbine engine 402, the current altitude of the aircraft 100, the desired altitude of the aircraft 100, the weather conditions, the speed of the aircraft 100, the atmospheric temperature and/or pressure, etc.

If the parameter(s) is/are satisfied, the controller 1312, at block 1720, sends the command signal 1322 (e.g., a second command signal) to close the valve 1310, which stops the flow of pressurized air to the gas turbine engine 402. After block 1720, the example supercharging system 1300 is deactivated and the example method 1712 ends. The example methods 1700 and 1712 can be repeated any number of times depending on the amount and pressure of the pressurized air supply remaining in the compressed air tank 1302. The supercharging system 1300 can be used on engines without the damper 900.

In some examples, after deactivation of the supercharging system 1300, the controller 1312 may send commands to start the electric motor 406 and shut down the gas turbine engine 402 to switch the hybrid propulsion engine 400 from the first mode of operation to the second mode of operation. For example, while the hybrid propulsion engine 400 is operating in the first mode of operation, the supercharging system 1300 may be used to produce increased thrust during a first segment of flight, such as during a climb from a first altitude (e.g., 20,000 ft) to a second altitude (e.g., 35,000 ft) where the boosted performance is desired. Then, the hybrid propulsion engine 400 can be switched to the second mode of operation, and the electric motor 406 is used to drive the fan 404 during a second segment of flight, such as cruise at the second altitude. The example supercharging system 1300 enables the user of smaller, less powerful gas turbine engines to be used in climbing to higher altitudes.

Figure 18:
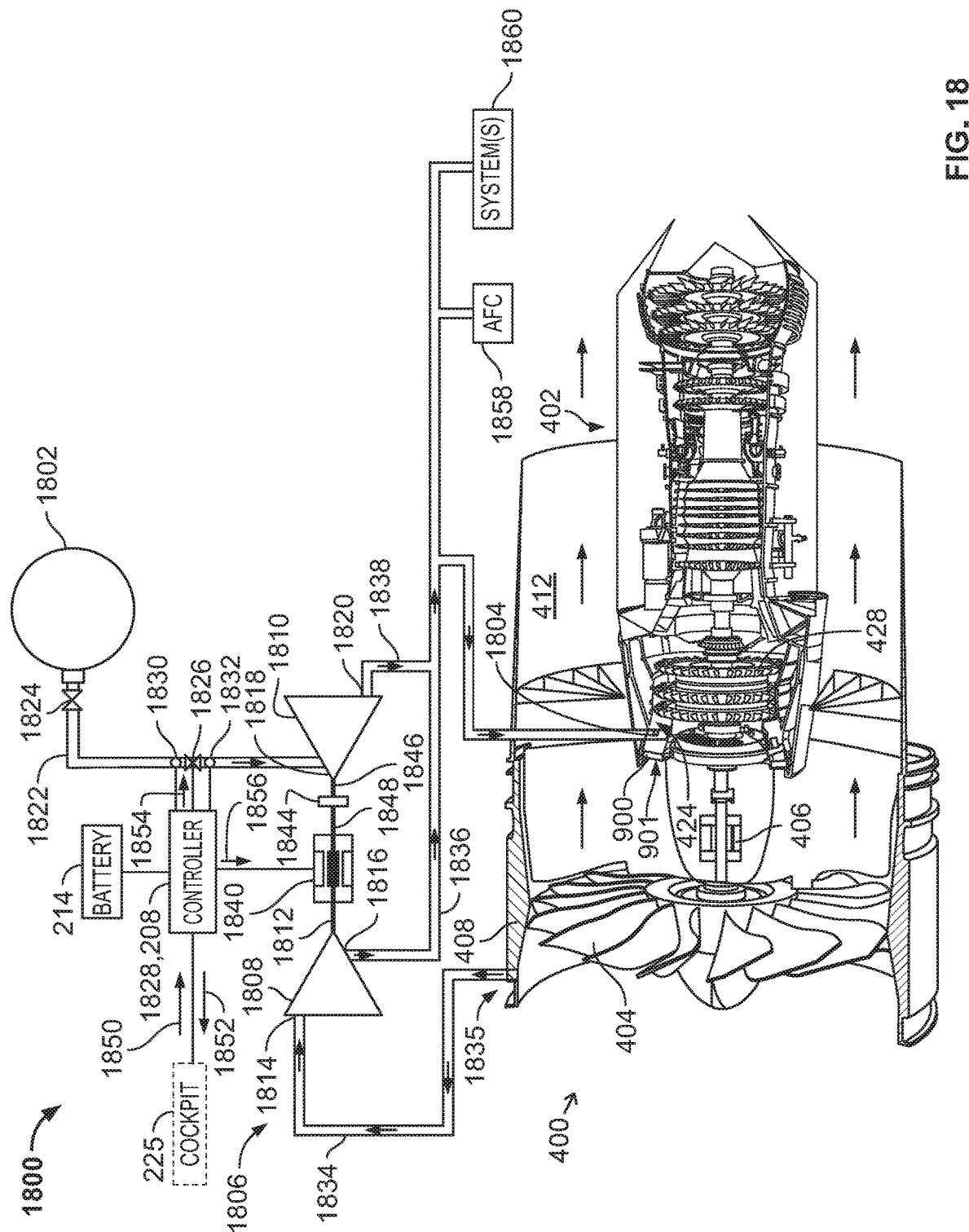
FIG. 18 illustrates an example flow multiplier system constructed in accordance with the teachings of this disclosure.

FIG. 18 illustrates an example flow multiplier system 1800 constructed in accordance with the teachings of this disclosure and which may be used to produce high pressure, high mass airflow for use in one or more system(s) of an aircraft (e.g., the aircraft 100 of FIG. 1) that receive and utilize such high pressure air. The example flow multiplier system 1800 is shown and described in connection with the hybrid propulsion engine 400 from FIG. 9. The flow multiplier system 1800 can be used in addition to or as an alternative to the supercharging system 1300 of FIG. 13 for supplying temporary bursts of high pressurize air to the gas turbine engine 402 while the hybrid propulsion engine 400 is operating in the first mode of operation. Similar to the supercharging system 1300, the flow multiplier system 1800 includes a compressed air tank 1802 containing pressurized air and an ejector 1804 disposed in the core air intake 424 of the gas turbine engine 402. The ejector 1804 may be substantially the same as the ejector 1304 disclosed above. However, rather than supplying the pressurized air from the compressed air tank 1802 to the ejector 1804, the example flow multiplier system 1800 includes a flow multiplier 1806 that uses the pressurized air to produce an even higher mass airflow, than can be achieved by use of the compressed air tank 108 alone, which may then be supplied to the ejector 1804 and/or one or more other system(s) of the aircraft 100. The example flow multiplier system 1800 may produce this high pressure, high mass airflow without having to extract power from the aircraft engine(s), as performed in other known systems.

In the illustrated example, the flow multiplier 1806 is implemented as a turbo-compressor 1806. The turbo-compressor 1806 includes a compressor 1808, a turbine 1810, and a drive shaft 1812 coupled between the compressor 1808 and the turbine 1810. The compressor 1808 includes a compressor inlet 1814 and a compressor outlet 1816. The turbine 1810 includes a turbine inlet 1818 and a turbine outlet 1820. As shown in FIG. 18, the compressed air tank 1802 is fluidly coupled to the turbine inlet 1818 via a first supply line 1822 (e.g., a hose, a tube, etc.). The compressed air tank 1802 includes a regulator 1824 (e.g., a mechanical regulator) for regulating the pressure of the air provided to the first supply line 1822. For example, the pressurized air supply in the compressed air tank 1802 can be stored at 3,000 PSI, and the regulator 1824 can reduce the pressurized air down to 100 PSI. In other examples, the regulator 1824 can be set to other pressures.

In the illustrated example, the flow multiplier system 1800 includes a valve 1826 coupled to the first supply line 1822 between the compressed air tank 1802 and the turbine inlet 1818. The valve 1826 operates between an open state that allows the pressurized air to flow from the compressed air tank 1802 to the turbine inlet 1818 and a closed state that blocks the flow of pressurized air to turbine inlet 1818. The flow multiplier system 1800 includes a controller 1828 (e.g., a processor) configured to operate the valve 1826. In particular, the controller 1828 operates to open and close the valve 1826 when instructed. The controller 1828 can receive commands from a pilot and/or an autopilot program, as disclosed in further detail below. If the flow multiplier system 1800 is used in connection with the hybrid propulsion engine 400 (corresponding to the hybrid propulsion engine 200 of FIG. 2), the controller 1828 can implemented by the controller 208 (FIG. 2), which also controls the on/off operations and/or speeds of the gas turbine engine 402 and the electric motor 406. In other words, the same controller can be used control the mode change operations of the hybrid propulsion engine 400 as well as the operations of the flow multiplier system 1800. Further, the same controller can be used to operate the damper 900. However, in other examples the controllers may be separate and in communication with each other.

In some examples, the valve 1826 is implemented as a pressure reducing shutoff valve, which enables the valve 1826 to regulate the pressure (e.g., reduce the pressure) in addition to providing shutoff capabilities. For example, while the pressurized air exiting the regulator 1824 can be at 100 PSI, the valve 1826 can further reduce the pressure to 60 PSI. As shown in FIG. 18, a first pressure sensor 1830 is coupled to the first supply line 1822 upstream of the valve 1826 and a second pressure sensor 1832 is coupled to the first supply line 1822 downstream of the valve 1826. In other examples, only one pressure sensor may be implemented (e.g., only the second pressure sensor 1832). The pressure measurements from the first and second pressure sensors 1830, 1832 are communicated to the controller 1828. The controller 1828 controls the valve 1826 to reduce the pressure of the pressurized air to a target pressure value based on the pressure measurement(s). The target pressure value can be preset or can be set by a pilot and/or an autopilot program. In some examples, the target pressure value is based on a mass airflow demand level (at the compressor outlet 1816) to produce a certain output power level. For example, depending on the desired output power level of the gas turbine engine 402, the controller 1828 can control the valve 1826 to provide different pressure of air to the turbine inlet 1818. Higher pressure air provided to the turbine inlet 1818 means greater mass airflow is produced by the turbo-compressor 1816, whereas lower pressure air provided to the turbine intel 1818 means lower mass airflow is produced by the turbo-compressor 1816. Additionally or alternatively, the target pressure value can be based on other conditions, such as the current altitude of the aircraft 100, the desired altitude of the aircraft 100, the weather conditions, the weight of the aircraft, etc. In other examples, the valve 1826 does not have pressure reducing capabilities. In FIG. 18, the pressurized air supply is stored in one compressed air tank 1802. However, in other examples, the pressurized air supply can be stored in multiple compressed air tanks that are operatively coupled to the turbine inlet 1818.

When the valve 1826 is opened, high pressure air from the compressed air tank 1802 enters the turbine inlet 1818 and drives the turbine 1810, which rotates the drive shaft 1812 and powers the compressor 1808. In this example, the compressor inlet 1814 receives ambient air from outside of the aircraft 100 via a second supply line 1834. For example, the supply line 1834 can receive ambient air from a port 1835 in the nacelle 408 that receives ambient airflow. While the port 1835 is shown on the nacelle 408, in other examples the port 1835 may be located on another part of the aircraft 100, such as on the fuselage 102 (FIG. 1). The port 1835 may be a scoop on the aircraft 100, a flush port, or a pitot. The compressor 1808 increases the pressure of the ambient air from the compressor inlet 1814 to the compressor outlet 1816. The compressor outlet 1816 is fluidly coupled to the ejector 1804 (and/or one or more other systems that receive air, as disclosed in further detail herein). In this example, a third supply line 1836 fluidly couples the compressor outlet 1816 and the ejector 804. As such, air exiting the compressor outlet 1816 flow to the ejector 1804 in the gas turbine engine 402. Additionally, as shown in FIG. 18, the turbine outlet 1820 is fluidly coupled via a fourth supply line 1838 to the third supply line 1836. Thus, the air exiting the turbine outlet 1820 is mixed with the compressed air from the compressor outlet 1816 and supplied to the ejector 1804. In some examples, one or more check valves are coupled to the third supply line 1836 and/or the fourth supply line 1838 to prevent high pressure air from flowing back toward the compressor outlet 1816 and/or the turbine outlet 1820.

As an example operation, the controller 1828 opens the valve 1826 to supply pressurized air to the turbine inlet 1818. The air supplied to the turbine inlet 1818 can be at 45 PSI (e.g., as regulated by the regulator 1824 and/or the valve 1826). After flowing through the turbine 1810, the air exiting the turbine outlet 1820 is at a lower pressure, such as 30 PSI. The turbine 1810 drives the compressor 1808 to increase the atmospheric air at the compressor inlet 1814 to a higher pressure, such as 30 PSI, at the compressor outlet 1816. The air exiting the turbine outlet 1820 mixes with the air exiting the compressor outlet 1816 and is supplied to the ejector 1804 (and/or one or more other system(s) of the aircraft). The combined air is still at a relatively high pressure, such as 30 PSI. However, using the compressor 1808 produces a much higher mass flow rate compared to only supplying the pressurized air from the compressed air tank 1802. Thus, while the pressure of the air flowing through the turbine 1810 is reduced (and used to power the compressor 1808), the increase in mass airflow from the compressor 1808 creates a higher overall airflow with relatively high pressure. This high pressure, high mass airflow is injected into the gas turbine engine 402 to increase the power of the gas turbine engine 402, as disclosed above in connection with the supercharging system 1300. Further, while the compressed air exiting the compressor outlet 1816 is relatively warm, the air exiting the turbine outlet 1820 (which has been expanded from exiting the compressed air tank 1802 and the turbine 1810) is relatively cold. As such, the turbo-compressor 1806 can supply cold, high pressure, high flow air to the gas turbine engine 402 (and/or any other system of the aircraft 100). This cold air is beneficial for boosting the gas turbine engine 402. The controller 1828 can control the valve 1826 to allow more or less pressure to the turbine 1810, thereby controlling the pressure and mass airflow produced by the turbo-compressor 1806 and supplied to the ejector 1804.

While in the illustrated example of FIG. 18 the compressor inlet 1814 receives ambient air, in other examples, air from other locations may be provided to the compressor inlet 1814. For example, the compressor inlet 1814 may receive air from the fan duct 412 (e.g., via a port in the nacelle 408 downstream of the fan 404). In other examples, the compressor inlet 1814 can receive compressor bleed air from one or more offtakes of the gas turbine engine 402 (e.g., off a high-pressure compressor (HPC) low port, an HPC high port, a booster discharge, etc.).

In some examples, the flow multiplier system 1800 includes an electric motor 1840 that can be used to run the compressor 1808 during periods of lower mass airflow demand. Thus, rather than using the pressurized air supply from the compressed air tank 1802 to run the turbo-compressor 1806, the electric motor 1840 can be used to run the compressor 1808 when demand is lower. As shown in FIG. 18, the electric motor 1840 is coupled to the drive shaft 1812. The electric motor 1840 is powered by the battery 214. When the electric motor 1840 is activated, the electric motor 1840 rotates the drive shaft 1812, thereby driving the compressor 1808 and producing compressed air for supercharging the gas turbine engine 302 (and/or to be provided to one or more other systems of the aircraft). To disconnect the drive shaft 1812 from the turbine 1810 while the electric motor 1840 is running, the turbo-compressor 1806 includes a clutch 1844 disposed between the electric motor 1840 and the turbine 1810. In this example, the clutch 1844 is implemented as an overrunning clutch. In other examples, other types of clutches can be implemented. The drive shaft 1812 is divided into a first drive shaft 1846 associated with the turbine 1810 and a second drive shaft 1848 associated with the electric motor 1840 and the compressor 1808. In some examples, the second drive shaft 1848 is formed integrally with the electric motor 1840. Specifically, the second drive shaft 1848 can also function as the rotor shaft of the electric motor 1840. The first drive shaft 1846 is coupled to the second drive shaft 1848 via the overrunning clutch 1844. The overrunning clutch 1844 can be a sprag clutch, for example, which operates substantially the same as the overrunning clutch 422 disclosed above in connection with FIGS. 4, 6, 7A, and 7B. The overrunning clutch 1844 enables the first drive shaft 1846 to rotate the second drive shaft 1848 when the turbine 1810 is operating to drive the compressor 1808, and enables the second drive shaft 1848 to rotate independent of the first drive shaft 1846 when the electric motor 1840 is operating to drive the compressor 1808. Thus, the overrunning clutch 1844 enables the electric motor 1840 to drive the compressor 1808 independent of the turbine 1810. For example, the turbine 1810 can be used to drive the compressor 1808 during a higher airflow demand period (while the electric motor 1840 is off) and the electric motor 1840 can drive the compressor 1808 during a lower airflow demand period (while the turbine 1810 is not operating). Depending on the amount of airflow and pressure of airflow desired to supercharge the gas turbine engine 402 (and/or be provided to one or more other systems), the controller 1828 can switch between using the compressed air tank 1802 and the electric motor 1840 to drive the compressor 1808.

Similar to the operations disclosed above in connection with the supercharging system 1300, the example flow multiplier system 1800 can be activated to supply high pressure air to the gas turbine engine 402, while the hybrid propulsion engine 400 is operating in the first mode of operation, to increase the output power of the gas turbine engine 402, such as during take-off or during a climb. For example, the controller 1828 receives an input signal 1850 requesting to activate the flow multiplier system 1800 for producing more power from the gas turbine engine 402. The input signal 1850 can be from a pilot in the cockpit 225. For example, the pilot may press a button or activate a switch to request increased power. In some examples, the controller 1828 then checks one or more parameter(s) to verify whether the flow multiplier system 1800 can be used. The one or more parameter(s) may include the operating conditions (e.g., temperature) of the gas turbine engine 402, the current altitude of the aircraft 100, the desired altitude of the aircraft 100, the weather conditions, the speed of the aircraft 100, the atmospheric temperature and/or pressure, etc. If the one or more parameter(s) are not satisfied, the controller 1828 generates an alert signal 1852, which can be sent to the cockpit 225 to be displayed to a pilot or other aircraft personnel. In such an example, the flow multiplier system 1800 is not used.

If the one or more parameter(s) is/are satisfied (e.g., the parameter(s) do meet the threshold(s)), the controller 1828 can activate the flow multiplier system 1800 for a period of time. In some examples, the controller 1828 determines whether to use the high pressure air from the compressed air tank 1802 or use the electric motor 1840 to drive the compressor 1808 based on a mass airflow demand level. The mass airflow demand level may be based on the amount of output power from the gas turbine engine 402 that is desired. The controller 1828 may compare the mass airflow demand level to a threshold. If the demand value is greater than the threshold, the controller 1828 sends a command signal 1854 (e.g., an open command) to open the valve 1826. In some examples, the command signal 1854 also includes a target pressure value to which the valve 1826 is to regulate the air to. The target pressure value may be based on the desired output power level for the gas turbine engine 402 (e.g., higher output power level means high pressure air is needed, whereas lower output power level means lower pressure air is needed). When the valve 1826 is opened, the high pressure air from the compressed air tank 1302 drives the turbine 1810, which drives the compressor 1808. The air exiting the compressor outlet 1816 and the turbine outlet 1820 is mixed and flows to the ejector 1804 and, thus, into the gas turbine engine 402. As a result, the output power of the gas turbine engine 402 increases and, thus, increases the thrust created by the gas turbine engine 402. The increased thrust produced by the gas turbine engine 402 can be used to climb to a higher altitude, such as 35,000 ft, which otherwise may not be achievable with the gas turbine engine 402 (or may take significant time to reach).

Otherwise, if the mass airflow demand level is lower than the threshold, the controller 1828 can instead send a command signal 1856 to start the electric motor 1840. The controller 1828 can control the electric motor 1840 by controlling the supply of electrical power from the battery 214 to the electric motor 1840. In this instance, the electric motor 1840 drives the compressor 1808. The air exiting the compressor outlet 1816 is supplied (via the third supply line 1836) to the ejector 1804 and, thus, into the gas turbine engine 402.

Once the flow multiplier system 1800 is no longer desired (e.g., after take-off, after the higher altitude is reached, etc.), the controller 1828 receives another input signal to deactivate the flow multiplier system 1800. The input signal can be from a pilot in the cockpit 225 and/or an auto-pilot program, for example. The controller 1828 can check one or more parameter(s) (e.g., temperature, altitude, state of the damper 900, etc.) before deactivating the flow multiplier system 1800. If the parameter(s) are satisfied, the controller 1828 sends the command signal 1854 (e.g., a close command) to close the valve 1826 and/or the command signal 1856 to stop the electric motor 1840 and, thus, the flow multiplier system 1800 is deactivated. The gas turbine engine 402 may continue to operate using atmospheric air from the fan duct 412.

In some examples, the core damper 900 is included in the gas turbine engine 402. While the core damper 900 is not necessary for using the flow multiplier system 1800, in some instances, the core damper 900 helps prevent the highly pressurized air from flowing backward into the fan duct 412. In the illustrated example, the damper 900 is disposed upstream from the ejector 1804 in the core air intake 424 (i.e., the damper 900 is closer to the opening 901 than the ejector 1804). After the controller 1828 opens the valve 1826 or activates the electric motor 1840 (thereby supplying high pressure air to the ejector 1804), the controller 1828 (which may include the controller 902 for the damper 900) sends a command signal (e.g., a second command signal) to close the damper 900, which prevents the high pressure air from flowing back out of the core air intake 424 and into the fan duct 412. In some examples, this transition occurs slowly to ensure the gas turbine engine 402 is not deprived of air. Before the valve 1826 is closed or the electric motor 1840 is shut down, the damper 900 is opened to enable airflow back into the gas turbine engine 402 from the fan duct 412.

The controller 1828 can check to determine whether the damper 900 has opened prior to deactivating the flow multiplier system 1800.

In addition to or as an alternative to supplying air for supercharging the gas turbine engine 402, the example flow multiplier system 1800 can be used to supply high pressure, high mass airflow one or more other systems of the aircraft 100. For instance, as shown in FIG. 18, the aircraft 100 can include an active flow control (AFC) system 1858. AFC systems generally require significant mass airflow. AFC systems are used for reducing airflow separation across a control surface and/or reducing turbulence in the wake of the control surface. AFC systems are commonly used during take-off and landing. Some AFC systems eject high pressure air in a streamwise direction from across the control surface. The high pressure air imparts momentum into the wake or area along the upper surface the control surface, which typically has relatively low velocity. However, known aircraft extract bleed air from the gas turbine engine to supply the AFC, which results in a need for a larger, more powerful engines. Larger engines result in weight, which leads to an increase in gross weight and a decrease in flight efficiency. Therefore, the example flow multiplier system 1800 can be used to supply high pressure, high mass airflow to the AFC 1858 without drawing power from the gas turbine engine 402. In the illustrated example, the third supply line 1836 is fluidly coupled to the AFC 1858. The AFC 1858 may generate one or more input signals (e.g., the input signal 1850) requesting to activate the flow multiplier system 1800 to supply air. Depending on the demand, the controller 1828 may operate the valve 1826 or the electric motor 1840. In some examples, one or more valves may be coupled to the third supply line 1836 to control where the high pressure, high mass airflow is routed (e.g., to the ejector 1804, the AFC 1858, both, etc.).

In some examples, the aircraft 100 may be implemented as a vertical take-off and landing (VTOL) aircraft. The example flow multiplier system 1800 may be beneficial on for such an aircraft, because the flow multiplier system 1800 can be used to supercharge the gas turbine engine 402 for increased take-off power and also provide high mass airflow for the AFC 1858, which helps reduce turbulence during take-off.

Additionally or alternatively, the flow multiplier system 1800 can be used to supply high pressure, high mass airflow to one or more other system(s) 1860 that utilize high pressure air, such as an environmental control system (ECS), a wing anti-icing system, etc. As shown in FIG. 18, the third supply line 1836 can fluidly couple the compressor outlet 1816 to the system(s) 1860. These system(s) 1860 may similarly request use of the flow multiplier system 1800 to produce high pressure, high mass airflow.

Figure 15:
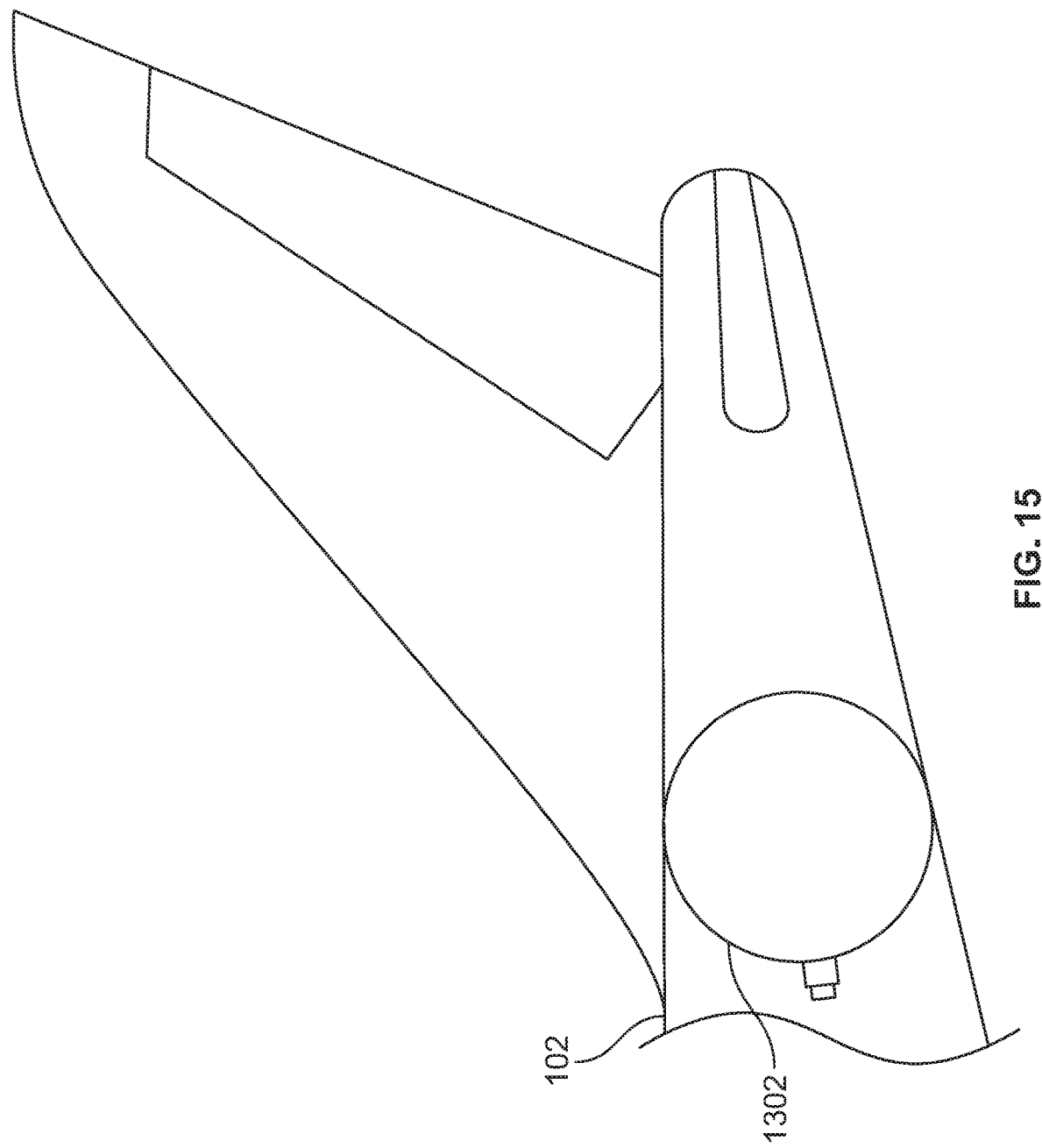
FIG. 15 shows an example compressed air tank of the supercharging system of FIG. 13 used as an aft pressure bulkhead in a fuselage of the aircraft of FIG. 1.

In the illustrated example of FIG. 18, the compressed air tank 1802 is spherical. However, in other examples, the compressed air tank 1802 can have a different shape (e.g., a cylinder). The compressed air tank 1802 can be constructed of a relatively strong material, such as a composite material (e.g., fiber glass). Further, similar to the compressed air tank 1302 of FIG. 13, the compressed air tank 1802 can form at least a part of a bulkhead in a fuselage of an aircraft, such as the aft pressure bulkhead in the fuselage 102 of the aircraft 100 as shown in FIG. 15. Therefore, the compressed air tank 1802 can serve multiple purposes. In some instances, the compressed air tank 1802 is refilled when the aircraft is on the ground and refueling. Additionally or alternatively, in some instances, such as with longer ranger aircraft, a device (e.g., a scuba type compressor) can be used to refill the compressed air tank 1802 while in flight. While the example flow multiplier system 1800 of FIG. 18 is shown in connection with the hybrid propulsion engine 400, it is understood that the flow multiplier system 1800 may be similarly used in connection with aircraft having any other type of hybrid or non-hybrid type engines.

Figure 19:
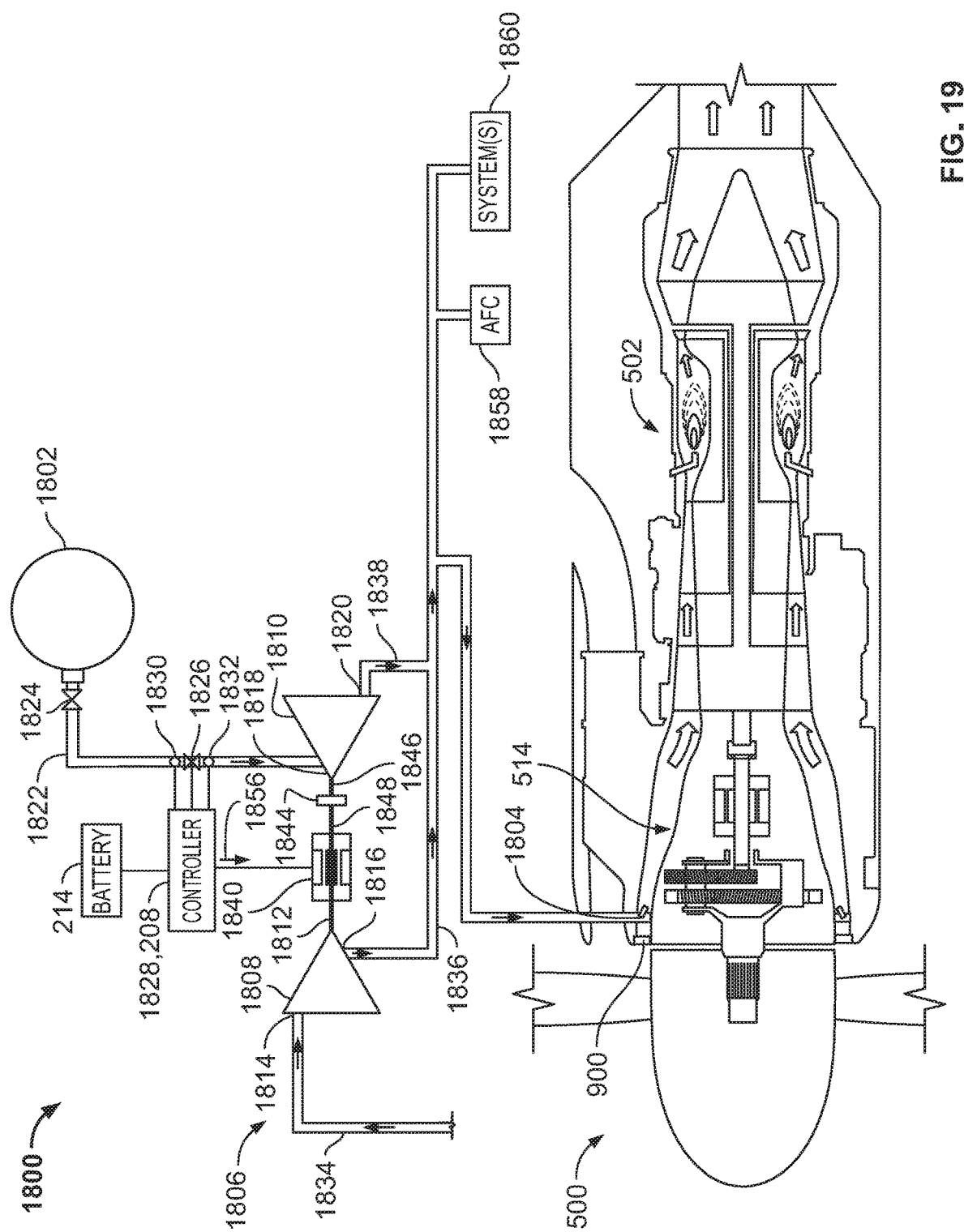
FIG. 19 illustrates the example flow multiplier system of FIG. 18 implemented in connection with the hybrid propulsion engine of FIG. 10.

FIG. 19 shows the flow multiplier system 1800 implemented in connection with the hybrid propulsion engine 500 (the turboprop engine) from FIG. 10. The flow multiplier system 1800 may be used to supply air to the ejector 1804, disposed in the core air intake 514, to the AFC 1858, and/or to one or more other system(s) 1860 of the aircraft. The parts or components of the flow multiplier system 1800 have been labeled in FIG. 19. The flow multiplier system 1800 may operate substantially the same as disclosed above in connection with FIG. 18. Thus, to avoid redundancy, a description of the operations is not provided again in connection with FIG. 19. Instead, the interested reader is referred back to description above in connection with FIG. 18 for a full written description of the operations.

Figure 20A:
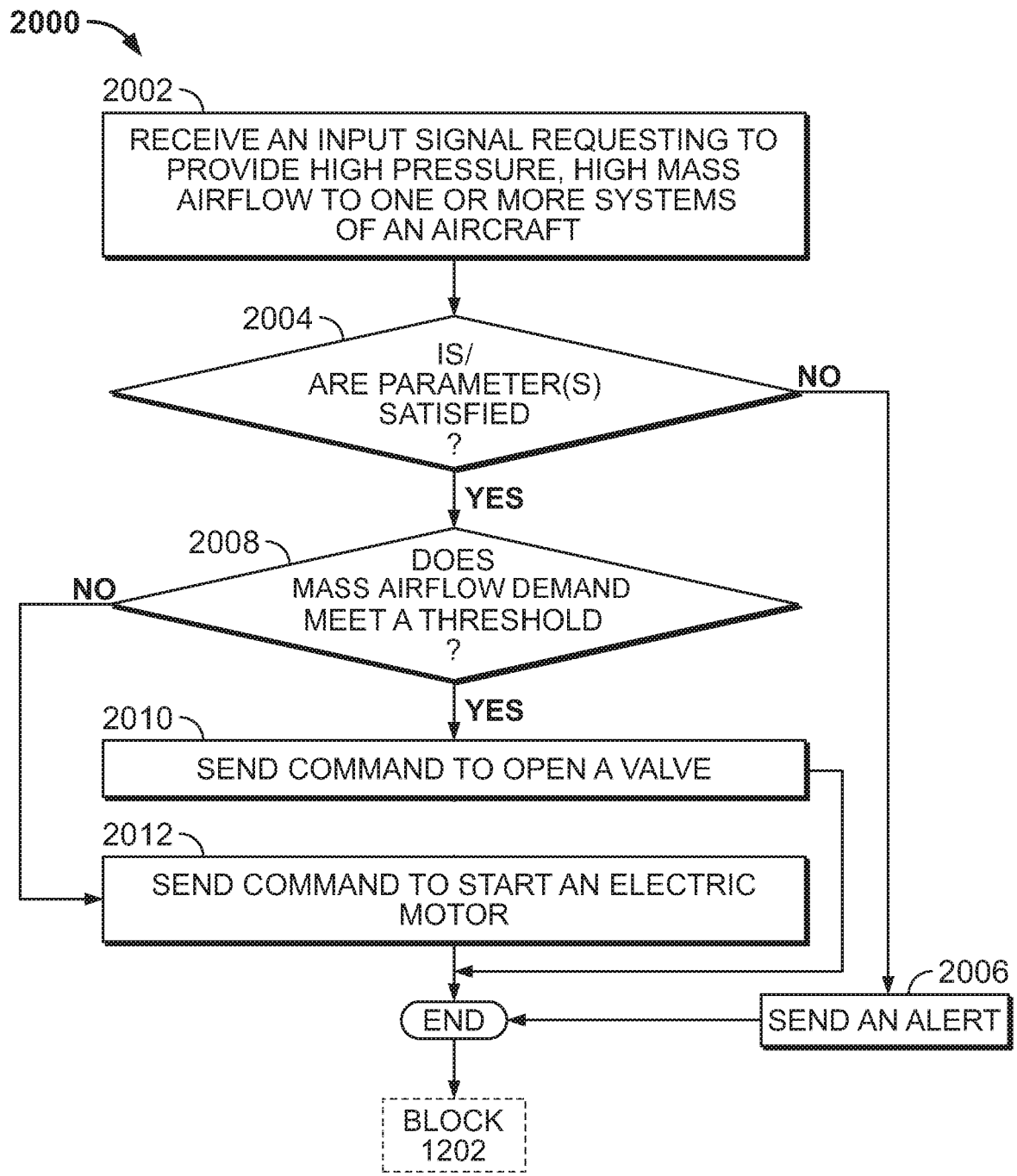
FIG. 20A is a flowchart representative of an example method of activating a flow multiplier system to provide high pressure, high mass airflow to one or more systems of an aircraft that can be implemented by the flow multiplier system of FIGS. 18 and 19.

FIG. 20A is a flowchart of an example method 2000 of using the example flow multiplier system 1800 to supply high pressure, high mass airflow to one or more system(s) of an aircraft. The method 2000 can be performed to increase output power of a gas turbine engine, for example. The method 1700 is described in connection with the hybrid propulsion engine 400 of FIG. 18, which is a turbofan type of hybrid propulsion engine. However, it is understood that the method 2000 can be similarly implemented using other types of hybrid propulsion engines, such as the hybrid propulsion engine 500 of FIG. 19. Further, the method 2000 can be performed in connection with other types of non-hybrid engines. The method 2000 can be performed at least in part by the controller 208 (FIG. 2), the controller 902 (FIG. 13), and/or the controller 1828 (FIG. 18).

At block 2002, the controller 1828 receives the input signal 1850 requesting to use the flow multiplier system 1800 to provide high pressure, high mass airflow to one or more systems of the aircraft 100. For example, the input signal 1850 may be generated when it is desired to supercharge the gas turbine engine 402, such as when more power is desired during take-off or during a climb from a first altitude to a second higher altitude. Additionally or alternatively, the input signal 1850 can be generated when the AFC 1858 desires air (e.g., during take-off). The input signal 1850 can be generated by a pilot in the cockpit 225 (e.g., by operating a button or switch). In other examples, the input signal 1850 is generated by an auto-pilot program (e.g., during take-off, when planning to climb to a higher altitude).

At block 2004, the controller 1828 determines whether one or more parameter(s) is/are satisfied before activating the flow multiplier system 1800. The one or more parameter(s) may include the operating conditions (e.g., temperature) of the gas turbine engine 402, the current altitude of the aircraft 100, the desired altitude of the aircraft 100, the weather conditions, the speed of the aircraft 100, the atmospheric temperature and/or pressure, etc. If the parameter(s) is/are not satisfied (determined at block 2004), the controller 1828 generates the alert signal 1852 at block 2006, and the example method 2000 ends. The alert signal 1852 can be sent back to the cockpit 225, for example, and displayed to the pilot or another aircraft personnel. In this event, the flow multiplier system 1800 is not used.

If the parameter(s) is/are satisfied, the controller 1828 then determines whether to use the turbine 1810 or the electric motor 1840 to drive the compressor 1808 based on a mass airflow demand level. The mass airflow demand level may be provided in the input signal 1850. The mass airflow demand level is the level of mass airflow that is requested by the one or more system(s) that may use the high pressure, high mass airflow from the turbo-compressor 1806. At block 2008, the controller 1828 determines whether the mass airflow demand level meets a threshold. For example, the controller 1828 can compare the mass airflow demand level to a threshold. If the mass airflow demand level meets the threshold (e.g., is higher than the threshold), the mass airflow demand level is considered a higher mass airflow demand level and the controller 1828, at block 2010, sends the command signal 1854 to open the valve 1826. Once the valve 1826 is opened, the high pressure air from the compressed air tank 1802 flows to the turbine 1810. In this case, the turbine 1810 powers the drive shaft 1812, which drives the compressor 1808. The air exiting the compressor outlet 1816 and the turbine outlet 1820 are mixed in the third supply line 1836. This high pressure, high mass airflow is provided to the system(s) of the aircraft 100. In some examples, the controller 1828 controls the valve 1826 to regulate the pressurized air flowing to the turbine 1810 to a target pressure level (e.g., 60 PSI), which may be based on the mass airflow demand level. The controller 1828 receives pressure measurements from the first and second pressure sensors 1830, 1832 and, based on the pressure measurements, controls the valve 1826 to regulate the pressure to the desired pressure. The target pressure level may be set by the pilot. In general, the higher the pressure of the air, the more mass airflow can be produced. Therefore, depending on the demand for high mass airflow, the pressure can be increased or decreased. The target pressure level can also be based on one or more other conditions, such as the current altitude of the aircraft 100, the desired altitude of the aircraft 100, the speed of the aircraft 100, the weight of the aircraft 100, the ambient temperature, weather conditions, the type and size of the gas turbine engine 402, etc.

If the mass airflow demand level does not meet the threshold (e.g., is lower than the threshold), the mass airflow demand level is a lower mass airflow demand level and the controller 1828, at block 2012, sends the command signal 1856 to start the electric motor 1840. In this case, the electric motor 1840 drives the compressor 1808, which produces high pressure, high mass airflow in the third supply line 1836. The controller 1828 can control the speed of the electric motor 1840 to drive the compressor 1808 faster or slower to meet the desired amount of mass airflow. The pressure and mass airflow produced when using the electric motor 1840 may be less than the pressure and mass airflow produced when using the compressed air tank 1802 to drive the turbine 1810. Therefore, the turbine 1810 may be used to drive the compressor 1808 based on higher mass airflow demand levels whereas the electric motor 1840 may be used to drive the compressor 1808 based on lower mass airflow demand levels.

This high pressure, high mass airflow produced by the turbo-compressor 1806 in the third supply line 1836 can be used by one or more systems of the aircraft 100. For example, when being used to supercharge the gas turbine engine 402, the high mass airflow is supplied to the ejector 1804, which is disposed in the core air intake 424. The ejector 1804 injects the high pressure air into the first compressor 428 of the gas turbine engine 402. This increased pressure immediately boosts the output power of the gas turbine engine 402. The flow multiplier system 1800 can provide the high pressure air to the gas turbine engine 402 for any period of time (e.g., a short burst such as 3 seconds, a long burn such as 2 minutes, etc.) until the flow multiplier system 1800 is deactivated and/or the compressed air tank 1802 is depleted. Additionally or alternatively, the high pressure, high mass airflow can be provided to the AFC 1858 and/or one or more other systems 1860. For example, during take-off, the AFC 1858 may desire high mass airflow to be used in reducing turbulence along the wings of the aircraft 100.

If the demand for mass airflow level changes (e.g., because one or more additional systems desire airflow, or one or more systems no longer desire airflow), the controller 1828 can switch between using the electric motor 1840 and operating the valve 1826. For example, if the mass airflow demand level increases above the threshold (determined at block 2008), the controller 1828 can deactivate the electric motor 1840 and instead open the valve 1826, which enables the pressurized air from the compressed air tank 1802 to drive the turbine 1810.

After block 2012, the example flow multiplier system 1800 is activated and the example method 2000 ends. If the flow multiplier system 1800 is being used as a supercharger, the method 2000 may continue to block 1202 of FIG. 12A, where the controller 902 receives a request to close the damper 900. The request may be generated automatically after the high pressure, high mass airflow is being injected into the gas turbine engine 402, or may be generated manually via pilot request. In some instances, such as when flying at higher altitudes, closing the damper 900 helps prevent the high pressure air from flowing backward through the core air intake 424 and into the fan duct 412. Therefore, if the one or more state-change parameter(s) are satisfied, the controller 902 sends the command signal 908 to close the damper 900.

Figure 20B:
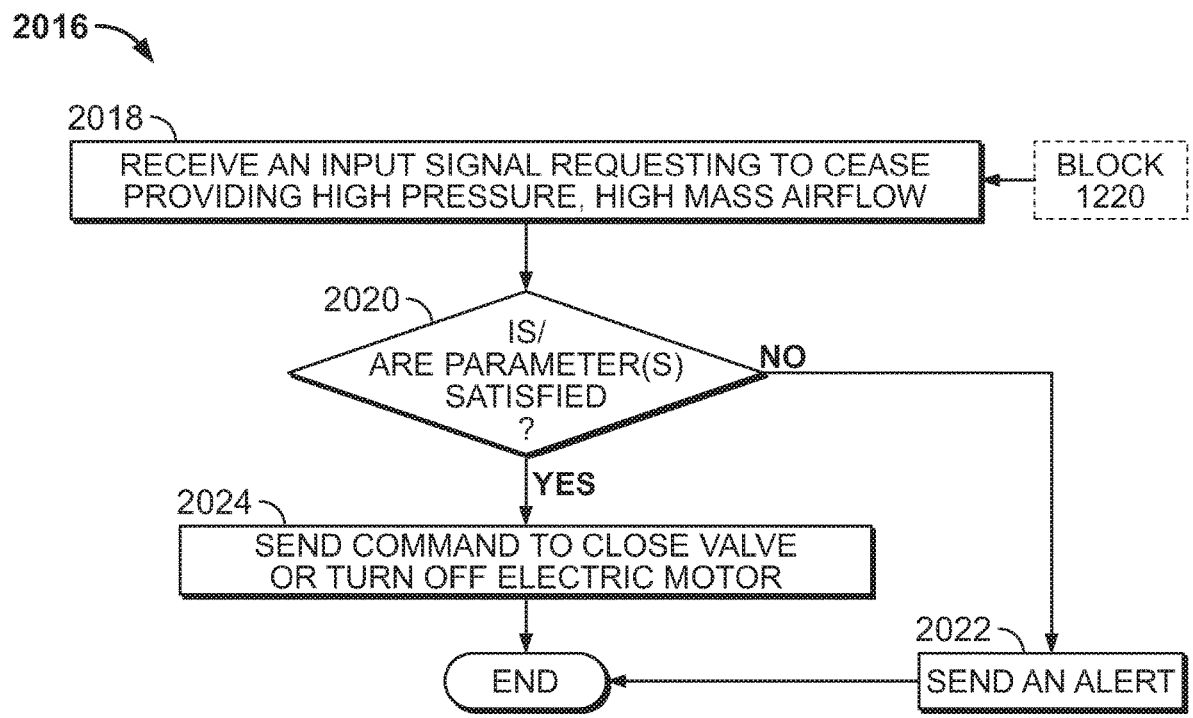
FIG. 20B is a flowchart representative of an example method of deactivating a flow multiplier system that can be implemented by the flow multiplier system of FIGS. 18 and 19.

FIG. 20B is a flowchart of an example method 2016 of deactivating the flow multiplier system 1800 to cease providing high pressure, high mass airflow. The method 2016 may be performed when it is no longer desired to increase the output power of a gas turbine engine, for example. The method 2016 is described in connection with the hybrid propulsion engine 400 of FIG. 18, which is a turbofan type of hybrid propulsion engine. However, it is understood that the method 2016 can be similarly implemented using other types of hybrid propulsion engines, such as the hybrid propulsion engine 500 of FIG. 19. Further, the method 2016 can be performed in connection with other types of non-hybrid engines. The method 2016 can be performed at least in part by the controller 208 (FIG. 2), the controller 902 (FIG. 13), and/or the controller 1828 (FIG. 18).

Assuming the turbo-compressor 1806 is producing high mass airflow (via pressurized air from the compressed air tank 1802 and/or the electric motor 1840), at block 2018, the controller 1828 receives the input signal 1850 requesting to deactivate the flow multiplier system 1800 and cease producing the high mass airflow. The input signal 1850 can be generated by a pilot in the cockpit 225, for example. For instance, if the high mass airflow is being used to supercharge the gas turbine engine 402, and the increased output power is no longer desired, the pilot can request to deactivate flow multiplier system 1800. As another example, if the AFC 1858 and/or the system(s) 1860 no longer desire the high mass airflow, the AFC 1858 and/or the system(s) 1860 can generate the input signal 1850. In other examples, the input signal 1850 can be generated by an auto-pilot program (e.g., after take-off, after a desired altitude is reached, etc).

In some examples, the request is generated after block 1220 from FIG. 12B. For example, assuming the high mass airflow was being used for supercharging the gas turbine engine 402 and the damper 900 was previously closed, the damper 900 may be opened first before deactivating the flow multiplier system 1800 to ensure no lapse in air supply occurs. Therefore, prior to ceasing the injection of the pressurized air, the controller 902 reopens the damper 900 to allow the air from the fan duct 412 to flow into the core air intake 424.

At block 2020, the controller 1828 determines whether one or more parameter(s) is/are satisfied. If the parameter(s) is/are not satisfied (determined at block 2020), the controller 1828 generates the alert signal 1852 at block 2022, and the example method 2016 ends. The alert signal 1852 can be sent back to the cockpit 225, for example, and displayed to the pilot or another aircraft personnel. The controller 1828 may re-check the parameter(s) after a period of time (e.g., 30 seconds). An example parameter may be the state or condition of the damper 900. For example, the controller 1828 can determine whether the damper has been opened (or at least partially opened). If the damper 900 is not opened (or at least partially opened), the controller 1828 can prohibit deactivation of the flow multiplier system 1800 so that air continues to be supplied to the gas turbine engine 402. Other example parameter(s) include the operating conditions (e.g., temperature) of the gas turbine engine 402, the current altitude of the aircraft 100, the desired altitude of the aircraft 100, the weather conditions, the speed of the aircraft 100, the atmospheric temperature and/or pressure, etc.

If the parameter(s) is/are satisfied, the controller 1828, at block 2024, sends the command signal 1854 (e.g., a second command signal) to close the valve 1826 or the command signal 1856 to stop the electric motor 1840, either of which stops the turbo-compressor 1806 from producing high mass airflow. After block 2024, the example flow multiplier system 1800 is deactivated and the example method 2016 ends. The example methods 2000 and 2016 can be repeated any number of times depending on the amount of airflow needed.

In some examples, when the flow multiplier system 1800 is being used to supercharge the gas turbine engine 402, after deactivation, the controller 1828 can send commands to start the electric motor 406 and shut down the gas turbine engine 402 to switch the hybrid propulsion engine 400 from the first mode of operation to the second mode of operation. For example, while the hybrid propulsion engine 400 is operating in the first mode of operation, the flow multiplier system 1800 can be used to produce increased thrust during a first segment of flight, such as during a climb from a first altitude (e.g., 20,000 ft) to a second altitude (e.g., 35,000 ft) where the boosted performance is desired. Then, the hybrid propulsion engine 400 can be switched to the second mode of operation, and the electric motor 406 is used to drive the fan 404 during a second segment of flight, such as cruise at the second altitude. The example flow multiplier system 1800 enables the user of smaller, less powerful gas turbine engines to be used in climbing to higher altitudes.

From the foregoing, it will be appreciated that example hybrid propulsion engines have been disclosed that enable the use of one or both of a gas turbine engine and an electric motor to produce more efficient flight. In particular, using an electric motor during certain flight segments can significantly increase the overall efficiency of a flight. Further, by using an electric motor during certain flight segments, such as cruise, smaller, lighter gas turbine engines can be implemented, which reduces the weight to the aircraft and, thus, increases the overall efficiency of the aircraft.

Example core dampers have also been disclosed that isolate the gas turbine engine while the electric motor is being used. Thus, more of the air accelerated by the propulsor is used to produce forward thrust, thereby increasing the efficiency of the engine.

Example supercharging systems have been disclosed that increase output power (e.g., thrust) of a gas turbine engine. This increased output power enables smaller gas turbine engines to be used for climbing to higher altitudes that may otherwise not be achievable. At these higher altitudes, the air pressure is lower, which decreases drag on the aircraft and enables more efficient use of an electric motor to produce thrust, for example.

Example flow multiplier systems have also been disclosed that can provide high pressure, high mass airflow to one or more system(s) of an aircraft. The flow multiplier systems can operate independently of the aircraft engine, unlike known systems that draw bleed air from the engines and, thus, require larger aircraft engines. As such, the example flow multiplier systems enable the use of smaller, lighter engines, which can increase the overall flight efficiency.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A method of increasing output power of a gas turbine engine of an aircraft, the method comprising:
   receiving, at a controller, an input signal requesting to increase output power of the gas turbine engine of the aircraft via a flow multiplier system, the flow multiplier system including:
   a compressed air tank containing pressurized air;
   a turbo-compressor including a compressor, a turbine, and a drive shaft coupled between the compressor and the turbine, the turbine having a turbine inlet and a turbine outlet, the compressor having a compressor inlet and a compressor outlet, the compressor outlet fluidly coupled to an ejector disposed in the gas turbine engine;
   a supply line fluidly coupling the compressed air tank to the turbine inlet; and
   a valve coupled to the supply line to control a flow of the pressurized air from the compressed air tank to the turbine inlet;
   sending, via the controller, a command signal to open the valve based on the input signal;
   routing a flow of the pressurized air from the compressed air tank to the turbine inlet via the opened valve to power the turbine and thereby drive the compressor to produce high pressure air at the compressor outlet; and
   injecting the high pressure air via the ejector into the gas turbine engine to increase the output power of the gas turbine engine.

2. The method of claim 1, further including operating, via the controller, the valve to reduce a pressure of the pressurized air to a target pressure value based on pressure measurements from one or more pressure sensors.

3. The method of claim 2, wherein the target pressure value is based on a mass airflow demand level received by the controller.

4. The method of claim 1, wherein the controller is configured to compare a mass airflow demand level to a threshold and send the command signal to open the valve if the mass airflow demand level satisfies the threshold, and wherein the controller is configured to send a command to start an electric motor to drive the compressor to produce the high pressure air at the compressor outlet if the mass airflow demand level does not satisfy the threshold.

5. The method of claim 1, wherein the controller is configured to determine whether one or more parameters are satisfied and send the command signal to open the valve based on the determination that the one or more parameters are satisfied.

6. The method of claim 1, wherein the input signal is a first input signal and the command signal is a first command signal, the method further including:
receiving, at the controller, a second input signal requesting to cease providing the high pressure air to the gas turbine engine; and
sending, via the controller, a second command signal to close the valve in response to the second input signal.

7. The method of claim 1, wherein the command signal is a first command signal, the method further including, after sending the first command signal to open the valve, sending, via the controller, a second command signal to a damper to change a state of the damper from an open state to a closed state, the damper disposed in a core air intake of the gas turbine engine upstream of the ejector.

8. A flow multiplier system for use in an aircraft, the flow multiplier system comprising:
a turbo-compressor including a compressor, a turbine, and a drive shaft coupled between the compressor and the turbine, the turbine having a turbine inlet and a turbine outlet, the compressor having a compressor inlet and a compressor outlet, the compressor outlet fluidly coupled to an ejector disposed in a gas turbine engine;
a supply line fluidly coupling a compressed air tank to the turbine inlet;
a valve coupled to the supply line to control a flow of pressurized air from the compressed air tank to the turbine inlet; and
a controller configured to, based on an input signal requesting to increase output power of the gas turbine engine, send a command signal to open the valve to enable the flow of the pressurized air from the compressed air tank to the turbine inlet, the turbine to drive the compressor to create high pressure air at the compressor outlet, and the ejector to provide the high pressure air into the gas turbine engine to increase the output power of the gas turbine engine.

9. The flow multiplier system of claim 8, wherein the valve is a pressure reducing shutoff valve, and wherein the controller is configured to, based on a mass airflow demand level, operate the valve to reduce a pressure of the pressurized air to a target pressure value.

10. The flow multiplier system of claim 8, wherein the supply line is a first supply line, and wherein the compressor inlet receives ambient air via a second supply line, wherein the compressor, when driven, is configured to increase a pressure of the ambient air between the compressor inlet and the compressor outlet.

11. The flow multiplier system of claim 10, wherein the compressor outlet is fluidly coupled to the ejector via a third supply line, and wherein the turbine outlet is fluidly coupled to the third supply line such that air exiting the turbine outlet mixes with air exiting the compressor outlet and is supplied to the ejector in the gas turbine engine.

12. The flow multiplier system of claim 8, further including an electric motor coupled to the drive shaft, and wherein the controller is configured to (1) control the valve to supply the pressurized air to the turbine to drive the compressor based on a higher mass airflow demand, and (2) control the electric motor to drive the compressor based on a lower mass airflow demand.

13. The flow multiplier system of claim 12, wherein the drive shaft includes a first drive shaft and a second drive shaft coupled via an overrunning clutch, the overrunning clutch disposed between the turbine and the electric motor to enable the electric motor to drive the compressor independent of the turbine.

14. The flow multiplier system of claim 13, wherein the overrunning clutch is a sprag clutch.

15. The flow multiplier system of claim 8, wherein the compressor outlet is further fluidly coupled to an active flow control (AFC) system of the aircraft, the high pressure air produced by the compressor to be used by the AFC system.

16. An aircraft comprising:
a hybrid propulsion engine having a gas turbine engine, an electric motor, and a propulsor, the gas turbine engine configured to drive the propulsor during a first mode of operation and the electric motor configured to drive the propulsor during a second mode of operation; and
a flow multiplier system configured to provide high pressure air into a core air intake of the gas turbine engine to increase output power of the gas turbine engine while the hybrid propulsion engine is operating in the first mode of operation, the flow multiplier system including:
a compressed air tank containing pressurized air;
a turbo-compressor including a compressor, a turbine, and a drive shaft coupled between the compressor and the turbine, the turbine having a turbine inlet and a turbine outlet, the compressor having a compressor inlet and a compressor outlet, the compressor outlet fluidly coupled to an ejector disposed in the core air intake of the gas turbine engine;
a supply line fluidly coupling the compressed air tank to the turbine inlet;
a valve coupled to the supply line to control a flow of the pressurized air from the compressed air tank to the turbine inlet; and
a controller configured to, based on an input signal requesting to increase the output power of the gas turbine engine, send a command signal to open the valve to enable the flow of the pressurized air from the compressed air tank to the turbine inlet, the turbine to drive the compressor to produce the high pressure air at the compressor outlet, and the ejector to provide the high pressure air into the core air intake of the gas turbine engine to increase the output power of the gas turbine engine.

17. The aircraft of claim 16, wherein the electric motor is a first electric motor, wherein the turbo-compressor includes a second electric motor coupled to the drive shaft of the turbo-compressor, and wherein the flow multiplier system is configured to selectively drive the compressor with either the turbine or the second electric motor based on a mass airflow demand level.

18. The aircraft of claim 17, wherein the turbo-compressor includes an overrunning clutch disposed between the turbine and the second electric motor to enable the second electric motor to drive the compressor independent of the turbine.

19. The aircraft of claim 16, wherein the controller is configured to:
activate the flow multiplier system to produce the high pressure air for a period of time;

deactivate the flow multiplier system to cease producing the high pressure air after the period of time; and after deactivation of the flow multiplier system, send command signals to start the electric motor and shut down the gas turbine engine to switch the hybrid propulsion engine from the first mode of operation to the second mode of operation.

20. The aircraft of claim 16, wherein the compressed air tank forms at least part of an aft pressure bulkhead in a fuselage of the aircraft.

* * * * *